(12) United States Patent
Huang

(10) Patent No.: US 12,132,607 B2
(45) Date of Patent: Oct. 29, 2024

(54) EQUIPMENT ACCESS METHOD, DATA EXCHANGE METHOD, NETWORKED DEVICE AND SERVER

(71) Applicant: Jianbang Huang, Guangzhou (CN)

(72) Inventor: Jianbang Huang, Guangzhou (CN)

( * ) Notice: Subject to any disclaimer, the term of this patent is extended or adjusted under 35 U.S.C. 154(b) by 0 days.

(21) Appl. No.: 18/560,875

(22) PCT Filed: Aug. 3, 2023

(86) PCT No.: PCT/CN2023/111107
§ 371 (c)(1),
(2) Date: Nov. 14, 2023

(87) PCT Pub. No.: WO2024/032474
PCT Pub. Date: Feb. 15, 2024

(65) Prior Publication Data
US 2024/0275668 A1 Aug. 15, 2024

(30) Foreign Application Priority Data
Aug. 8, 2022 (CN) .......................... 202210946796.4

(51) Int. Cl.
*H04L 41/08* (2022.01)

(52) U.S. Cl.
CPC .................................. *H04L 41/08* (2013.01)

(58) Field of Classification Search
CPC ....................................................... H04L 41/08
See application file for complete search history.

(56) References Cited

U.S. PATENT DOCUMENTS

| | | | | |
|---|---|---|---|---|
| 5,333,270 A | * | 7/1994 | Brief | H04L 12/433 709/227 |
| 10,929,147 B1 | * | 2/2021 | Pell | H04L 9/3247 |

(Continued)

FOREIGN PATENT DOCUMENTS

| | | | |
|---|---|---|---|
| CN | 102117251 | | 7/2011 |
| CN | 102117251 A | * | 7/2011 |

(Continued)

*Primary Examiner* — Richard G Keehn
(74) *Attorney, Agent, or Firm* — ScienBiziP, P.C.

(57) ABSTRACT

The present disclosure discloses an equipment access method, a data exchange method, and related devices. The equipment access method configures configuration information of the networked device based on a preset generation strategy. The configuration information includes scenario configuration information of the networked device in at least one application scenario, and the scenario configuration information includes at least one of a first descriptor set and a functional instruction set, and data source configuration information. By preloading the scenario configuration information, device functions of a networked device can be redefined based on the target configuration information, making the device functions more diverse. Based on loaded scenario configuration information, the networked device establishes a communication connection between the networked device and the target device, so that the networked device can be connected to the target device, therefore effectively avoiding being cracked by malicious programs, ensuring security of the networked device and data.

43 Claims, 18 Drawing Sheets

(56) References Cited

U.S. PATENT DOCUMENTS

| | | | | |
|---|---|---|---|---|
| 11,647,555 | B2* | 5/2023 | Tang | H04L 41/08 |
| | | | | 370/329 |
| 2018/0157385 | A1* | 6/2018 | Sirpal | H04N 5/445 |
| 2022/0075610 | A1* | 3/2022 | Wang | H04L 41/08 |
| 2022/0229468 | A1* | 7/2022 | Roose | G06F 1/1637 |

FOREIGN PATENT DOCUMENTS

| | | |
|---|---|---|
| CN | 110069288 | 7/2019 |
| CN | 115442083 | 12/2022 |

* cited by examiner

EQUIPMENT ACCESS METHOD, DATA EXCHANGE METHOD, NETWORKED DEVICE AND SERVER

CROSS-REFERENCE TO RELATED APPLICATIONS

The present disclosure claims priority to Chinese Patent Application No. 202210946796.4 with a title of "equipment access method, data exchange method, device, equipment, and storage medium" filed on Aug. 8, 2022, the entire contents of which are incorporated by reference herein.

FIELD

The subject matter herein generally relates to communication and data security, and a computer device for file control, and particularly relates to an equipment access method, a data exchange method, a device, an apparatus, and a computer readable storage medium.

BACKGROUND

At present, device functions of some access devices (such as universal serial bus USB devices) are fixed at the factory and cannot be changed or can only be changed by rewriting the software after leaving the factory. And when the access device requires application expansion, it is necessary to install control software such as drivers in the computer host, which can easily be caught by the computer host, exposing real data sources and network communication data, and may also lead to the access device being cracked by malicious programs, thus causing a high security risk.

DETAILED DESCRIPTION

Figure 1:
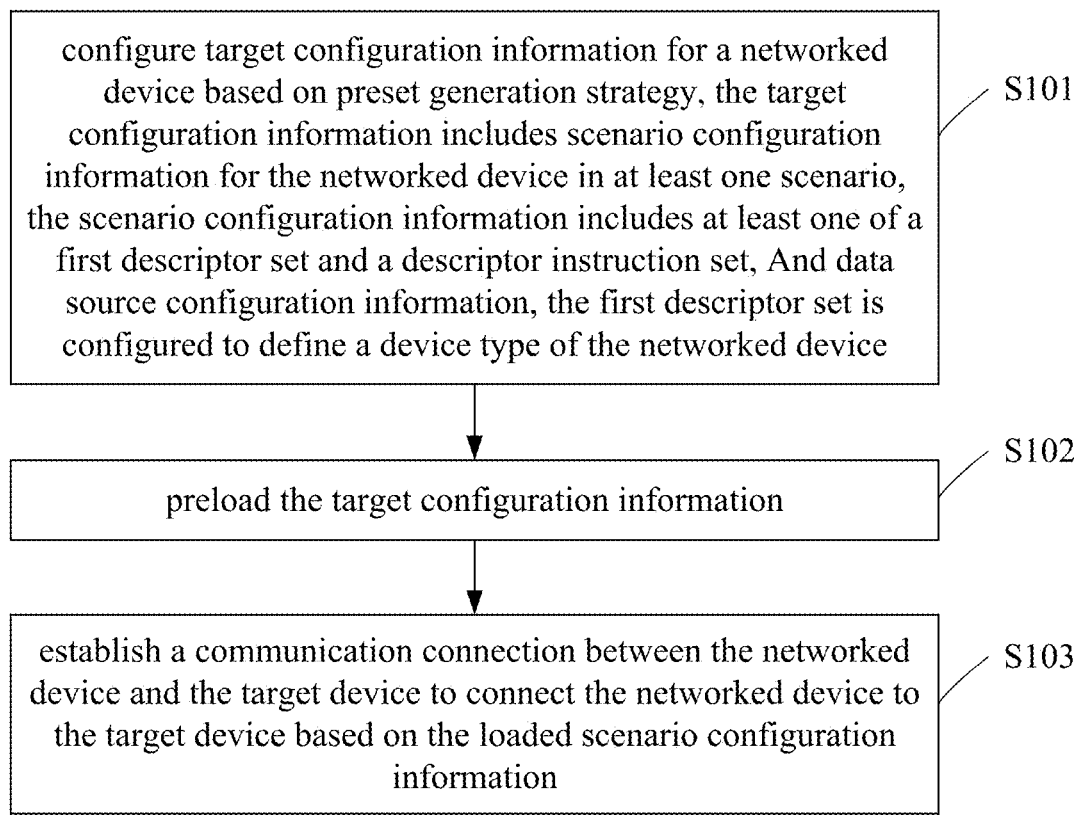
FIG. 1 is a schematic view of a flow chart of an equipment access method according to an embodiment of the present disclosure.

The following will provide a clear and complete description of technical solutions in the embodiments of the present disclosure in conjunction with the accompanying drawings. Obviously, described embodiments are only a part of the embodiments of the present disclosure, not all of them. Based on the embodiments in present disclosure, all other embodiments obtained by an ordinary person skilled in the art without creative labor fall within protection scope of the present disclosure.

According to relevant technical records, functions of some access devices are fixed at the factory and cannot be changed or can only be changed by rewriting software after leaving the factory. For example, a USB flash disk with a USB interface is specified to be used as a storage device only at the factory, and in subsequent applications, the USB flash disk can only store data locally. Some access devices have multiple device functions that can be switched, but these functions are pre-set before leaving the factory, so the access device can only switch between fixed functions and cannot be changed after leaving the factory. In addition, some access devices have relatively few access interfaces, making it difficult to meet needs of multiple functional scenarios. For example, the number of USB communication interfaces for on-board devices is limited (usually 1), and can only be used as a function for reading USB drives.

In addition, due to complexity of actual application of access devices, in the event of hardware incompatibilities such as new device models not being adapted or specific model adaptation data being omitted from the factory, it may occur that a target device cannot recognize access information of the access device, leading to access failure and an increase in error correction cost of the access device. For example, if the access device (the access device is a slave device at this time) fails to connect to a master device or the access device (the access device is a master device at this time) fails to connect to a slave device, the receiving device needs to be recycled and the hardware needs to be updated, which results in resource waste or cost increase.

In addition, the data related to the device's functions or applications is stored locally, which is not conducive to data confidentiality or protection. If the device is lost, the data in the device will also be lost. Due to the data being stored locally on the device, such as software with important functions, drivers, etc., even under protection of protective software, the data is prone to reverse cracking. And when the access device requires application expansion, it is necessary to install control software such as drivers in the computer host, which may cause that the access device easily be caught by the computer host, exposing real data sources and network communication data, and may also lead to the access device being cracked by malicious programs, posing a high security risk.

Above problems lead to single function of the device on the one hand, the increase in the cost of error correction on the other hand, and the inability to ensure data security of local data when connecting with the computer host.

Before introducing embodiments of the present disclosure, a brief explanation of some technical terms in the present disclosure is given:

1. Communication rules between a master device and a slave device. It is divided into a master mode and a slave mode, where the master device sends data interaction instructions to the slave device, and the slave device responds passively based on the data interaction instructions. Taking USB communication rules as an example, USB devices are divided into a master device (such as a computer host) and a slave device (such as a USB flash drive). The master device sends a token packet (or token packet+data packet) to an endpoint of the slave device, and the slave device responds based on the token packet (or token packet+data packet) received by the endpoint. The token pocket includes but is not limited to:

SETUP token pocket: used by the master device to obtain data packets from the slave device, execute settings, or send data packets to the slave device, etc.

IN token packet: used by the master device to obtain data packets from the slave device. The slave device returns data packets and ACK status packets. If the slave device is unable to return corresponding data packets, a NAK status packet is returned.

OUT token packet: used by the master device to send data packets to the slave device, accompanied by sent data packets. The slave device receives data packets and returns status packets such as ACK and NYET; If the slave device is unable to receive data packets, it returns NAK status packets or STALL status packets, etc. In some cases, before the master device sends the OUT token packet, it first sends a PING token packet to test whether the slave device has ability to receive data packets.

In addition, taking USB as an example, the token packets further include SOF token packets and other status packets, which will not be further elaborated.

2. The principle of enumerating (or establishing a handshake connection). For the master device, enumerating (or establishing a handshake connection) is a process of reading communication parameters of the slave device for further data exchange. Taking a type of USB mass storage device as an example: firstly, the master device reads basic parameters such as slave device descriptors, including hardware descriptors, configuration descriptors, port descriptors, and endpoint descriptors, and loads driver information according to different parameters to achieve hardware connectivity and communication, such as obtaining endpoint related information. Secondly, the master device reads parameters of a mobile storage device, such as capacity size, whether it is read-only, etc; Thirdly, the master device reads file system information, enabling it to display the drive letter on a computer operating system. However, during implementation of the embodiments of the present disclosure, the enumeration process of the computer operating system may not be strictly followed, but necessary data for enumerating mobile storage devices must have been read.

Therefore, an embodiment of the present disclosure provides an equipment access method, that configures configuration information of a networked device based on a preset generation strategy, the configuration information includes scenario configuration information of the networked device in at least one application scenario, and the scenario configuration information includes at least one of a first descriptor set and a functional instruction set, as well as data source configuration information, the first descriptor set is used to define a device type of the networked device and the functional instruction set includes descriptor instruction set; Preloads the scenario configuration information; Based on loaded scenario configuration information, establishes a communication connection between the networked device and the target device to connect the networked device to the target device.

Optionally, the configuration information is stored in networked devices, servers, or clients.

An embodiment of the present disclosure provides an equipment access method that configures target configuration information of a networked device based on a preset generation strategy. The target configuration information includes scenario configuration information of the networked device in at least one application scenario, scenario configuration information includes at least one of a first descriptor set and a function instruction set and data source configuration information, the first descriptor set is used to define a device type of the networked device, the functional instruction set includes a descriptor instruction set, which is used to control data exchange between the networked device and a target device; preloads the target configuration information when the networked device communicates with the server; At the same time, the target configuration information is stored on the server for real-time monitoring of the networked device. If the networked device is lost, the communication connection with the networked device can be cut off on the server to ensure security of the data source of the networked device; establish a communication connection between the networked device and the target device based on at least one of loaded first descriptor set and functional instruction set, as well as data source configuration information, to enable the networked device to be connected to the target device.

An embodiment of the present disclosure provides an equipment access method.

When an access device communicates with a server, target configuration information is preloaded. The server stores multiple preset configuration information. The target configuration information is one of the multiple preset configuration information, and the target configuration information includes scenario configuration information of the networked device in at least one application scenario. The scenario configuration information includes at least one of a first descriptor set and a descriptor instruction set. The first descriptor set is used to define a device type of the networked device. The access device establishes a communication connection with the target device based on the scenario configuration information, so that the networked device can access the target device. The target scenario configuration information is one of the scenario configuration information.

Referring to FIG. 1, which is a schematic view of a flow chart of an equipment access method provided by an embodiment of the present disclosure.

The method provided by the embodiment of the present disclosure can be used on a networked device. The networked device includes, but not limited to, a microcontroller or an embedded device with networking functions, a terminal device such as a smart phone or a laptop, a vehicle terminal device, a vehicle entertainment terminal, a network USBkey device (such as a bank U-shield, a digital certificate, an encryption dog, and etc.), a network proxy control device (such as a multi-port repeater), a Remote controller (including but not limited to a network read and write control device, a network controller (such as a router, a smart gateway, and etc.), a communication device (a Communication DeviceClass (CDC, such as a network card, a modem, an ISDN (Integrated Services Digital Network) terminal), a human interface device (HID), such as a keyboard or mice), a Mass Storage Device Class (MSC, such as a USB flash drive, a network USB flash drive, a card reader, a network card reader), a Printer device (such as a USB interface printer), a Still Imaging device, a Video device, an Audio/Video device, a Smart card device, a USB hub (Universal Serial Bus Hub) device and a custom device.

In an embodiment of the present disclosure, the networked device is connected to a server through wired or wireless networks (such as Ethernet interfaces including twisted pair or fiber optic, WIFI hotspots, ultra-wideband UWB, Bluetooth, 4G or 5G mobile cellular networks, LoRa long-distance radios, and etc.). The server includes but not limited to a personal computer, a mobile phone, a mobile terminal, a laptop, an embedded computer, a physical server, a virtual server, a Server cluster and a cloud server. During a networking process between the networked device and the server, network security can be enhanced by establishing a virtual private network or using a private network line.

In an embodiment of the present disclosure, the server serves as a control end. The control end includes the server or a client. The client communicates with the networked device, for example, the client directly connects to the networked device through P2P communication, and communication data between the client and the networked device is not forwarded by the server, which can improve transmission efficiency during a data exchange process.

In an embodiment of the present disclosure, the control end is located locally on the networked device and connected to the networked device through near-field communication methods such as Bluetooth. In an embodiment of the present disclosure, the control end is located locally on the networked device and connected to the networked device through near-field communication methods such as Bluetooth, and has functions such as creating scenarios, issuing scenarios, and data exchange control. In another embodiment of the present disclosure, the control end may be located at a remote end of the networked device and communicate remotely with the networked device through TCP/IP networks or the like. In another embodiment of the present disclosure, the control end can, on the one hand, serve as a client to be directly connected to the networked device; and on the other hand, the control end has server functions, such as creating scenarios, issuing scenarios, data exchange control, and so on.

In the embodiment of the present disclosure, scenarios can be created by the server or the networked device.

Figure 2:
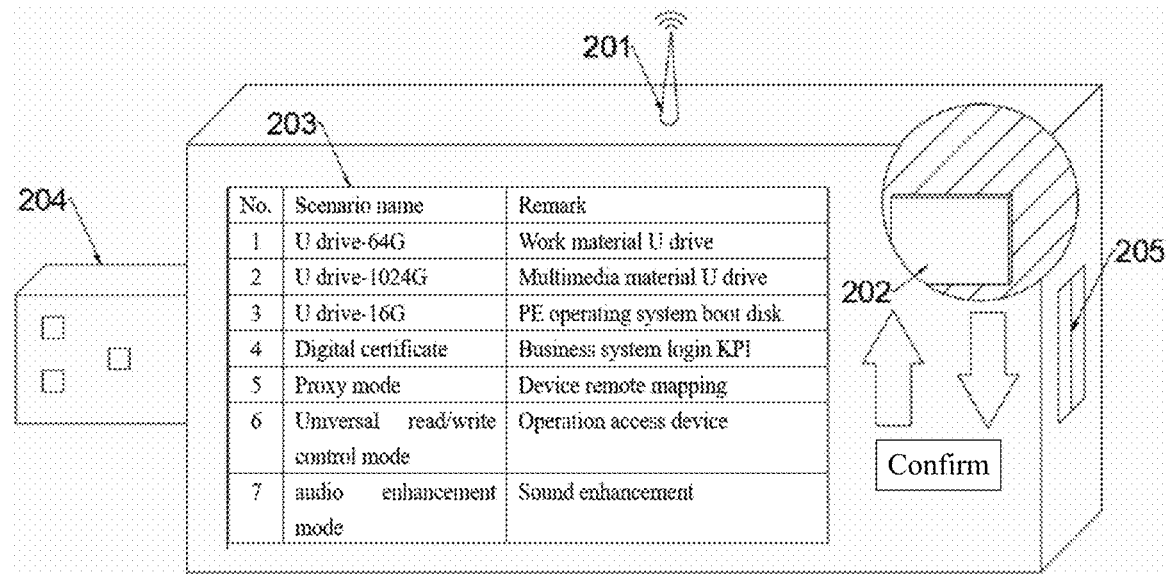
FIG. 2 is a structural diagram of a networked device according to an embodiment of the present disclosure.

Referring to FIG. 2, it is a structural diagram of the networked device in the embodiment of the present disclosure. The networked device includes but not limited to a networking unit 201, a storage unit 202, an interaction unit 203, a first interface 204, a second interface 205, and a main control module (not shown in the drawings). The networking unit 201 is configured to communicate with the server. The interaction unit 203 is configured to interact with a user. The first interface 204 and the second interface 205 are configured to establish a communication connection with a target device. The first interface 204 can enable the networked device to serve as a slave device to be connected separately to the target device (the master device); the second interface can enable the networked device to serve as a master device to be connected separately to the target device (the slave device); and the first and second interfaces can further enable the networked device to serve as both the master device and the slave device to be connected separately to an unused target device. For example, the first interface communicates with a computer device serving as the master device, and the second interface communicates with a storage device serving as the slave device, so as to achieve communication connections among the computer device, the networked device (and the server), and the storage device.

In an embodiment of the present disclosure, the networking unit 201 includes, but not limited to, an Ethernet interface unit such as twisted pair or fiber optic configured to achieve aforementioned wired connection, as well as a WIFI unit, a Bluetooth unit, a UWB unit, a 4G or 5G communication unit, a LoRa long-distance wireless communication unit, and etc. to achieve aforementioned wireless connection. The interaction unit 203 includes a display unit, a button, a switch or a sliding switch. The display unit can be a display screen or a touch screen. The main control module includes at least one of a microcontroller unit (MCU) chip and a host.

In an embodiment of the present disclosure, the first interface 204 or the second interface 205 may be at least one of a USB interface, a HDMI interface, a SCSI interface, an IEEE1394 interface, a SATA interface, an eMMC interface, a SDIO interface, a M.2 interface, a serial communication interface, etc.

It should be noted that each of devices connected to the "networked device" can serve as a "target device". Both the "networked device" and the "target device" can serve as a master device or a slave device, or can serve as a peer-to-peer communication device.

The peer-to-peer communication device refers to a communication device that do not distinguish between the master device and the slave device. If the networked device serves as a peer-to-peer communication device, it receives data sent by the target device at the first interface (the first interface serves as a receiving endpoint) and sends data to the target device at the second interface (the second interface serves as a sending endpoint). Similarly, if the target device serves as a peer-to-peer communication device, the target device receives data sent by the networked device at the receiving endpoint and sends data to the networked device at the sending endpoint.

In an embodiment of the present disclosure, the user or a device manufacturer may configure the scenario configuration information of the networked device on the server in advance. Before the networked device is connected to the target device, the first descriptor set corresponding to the scenario configuration information is read from the server. Based on the first descriptor set, the physical communication interfaces such as the first interface and second interface of the networked device are set to a master mode, a slave mode, or a peer-to-peer communication mode, and connected to the target device, thereby establishing a connection with the target device and performing data exchange.

In an embodiment of the present disclosure, when the networked device is in the slave mode, the data required for communication between the networked device (for example, the networked device is a USB flash drive) and the computer host can be stored in the server. When networked devices are in the master mode, data such as communication protocols between the networked device and the target device (such as the USB flash drive) can be stored on the server. After being powered on, the networked device obtains required access data such as the first descriptor set from the server to achieve data access and data exchange with the target device.

It should be noted that the "master device" or "master mode" described in the embodiment of present disclosure represents a relative identity relationship of a device A as the master device relative to another device B. This does not mean that device A can only be a "master device" or can only be in the "master mode", and it can be a "slave device" or in a "slave mode" relative to another device C. Similarly, the "slave device" or the "slave mode" described in the embodiment of the present disclosure represents a relative identity relationship between the one device A as a slave device and said another device B. It will not be repeated here.

In an embodiment of the present disclosure, the display unit displays multiple scenarios preset by the user and allows the user to switch between different equipment access scenarios, where "*" represents a currently selected scenario. The networked device receives scenarios selected by the user and send configuration requests to the server or a client connected to the server through communication. The configuration request includes selected scenario. The server or the client obtains scenario configuration information that matches the configuration request, and the scenario configuration information is transmitted to the networked device through the server communicated with the networked device or the client communicated with the server. The networked device configures device functions of the networked device based on the scenario configuration information.

For example, when selecting one of scenarios of USB drive-64G, USB drive-1024G, or USB drive-16G, the networked device is in a form of a network USB drive, and available storage space of the USB drive is 64G 1024G, and 16G, respectively. The stored data is different, and corresponding formatted file systems are FAT32, ExFat, or CDFS, which are used to store work materials, multimedia materials, or operating system boot programs, respectively.

In a case that a digital certificate scenario is selected, the networked device is in a USBkey form and is configured for identity authentication. For example, when communicating with a computer host, the USBkey is used to perform close or remote identity authentication on the computer host when the computer host needs to log in to the banking system.

In a case that a network proxy control scenario is selected, the networked device is in a form of network proxy control, which can virtualize devices connected to the interface to the server or the control end.

In a case that a universal read/write control mode is selected, the networked device is in the form of a network read/write control device, which can perform read/write control on devices connected to the second interface according to server instructions or preset rules.

In a case that an audio enhancement mode is selected, the networked device is in the form of a network intermediate control device. The first interface is connected to the computer host, and the second interface is connected to an audio playback device. The audio data sent by the computer host can be sent in real-time to the server for calculation, or an enhanced script model can be downloaded from the service for data processing on the networked device, and then processed audio data is transmitted to the audio playback device for audio playback.

Specifically, after the user selects one of the scenarios including "USB drive 64G, USB drive 1024G, USB drive 16G, digital certificate, universal read/write control mode, proxy mode, universal read/write control mode, and audio enhancement mode" through the display unit, the networked device receives selected scenario and sends a configuration request including the selected scenario to the server or the client connected to the server through communication. The server or the client obtains selected scenario configuration information and sends corresponding scenario configuration information to the networked device through the server communicated with the networked device or the client communicated with the server. The networked device configures device functions of the networked device to functions or data source corresponding to the selected scenario (such as different data sources in USB flash drive form) according to the scenario configuration information.

It should be understood that in other embodiments, the networked device may further include more or fewer components, such as in the case of a network USB drive with only the first interface and without the second interface. If the first interface is a male port and used as an interface for a slave device, when the networked device is needed to serve as a master device, the male port is converted to a female port through an interface converter to serve as an interface for the master device. For example, the networked device includes multiple first or second interfaces to simultaneously access multiple master or slave devices. The networked device may not include a display unit, and switching scenarios can be performed on the server, or the networked device can be controlled by other terminals through WiFi, Bluetooth, NFC, mobile cellular networks (such as 4G, 5G communication), or satellite networks. The display unit can also include more or fewer scenarios, which will not be repeated here.

In an embodiment of the present disclosure, the networked device is connected to a control end through the networking unit 201. The control end can serve as a server or a combination device of the server and the client. Exemplarily, FIGS. 3A to 3F show schematic diagrams of interaction between the networked device and the control end. The control end can be a mobile terminal, a desktop computer, or a server (cloud server), etc. The control end is based on the server (such as a cloud server) or the control end itself, and pre creates, edits, configures, or imports scenarios (or further selects scenarios). The control end can have full permissions or control permissions. For example, User A (desktop display) has scenario generation permissions including scenario creation/configuration/import and can create or edit scenarios; User B (mobile terminal) has authority to select scenarios and can select scenarios created or edited by User A. When the networked device obtains scenario information from a cloud server (such as through remote communication) or a control end (such as through near-field communication) (or further obtain information on selected scenarios), and enable corresponding scenarios of the networked device according to the configuration. The networked device can have authority to select scenarios; Alternatively, the networked device does not have authority to select scenarios, and preset selection of scenarios can be performed on the control end.

Figure 3A:
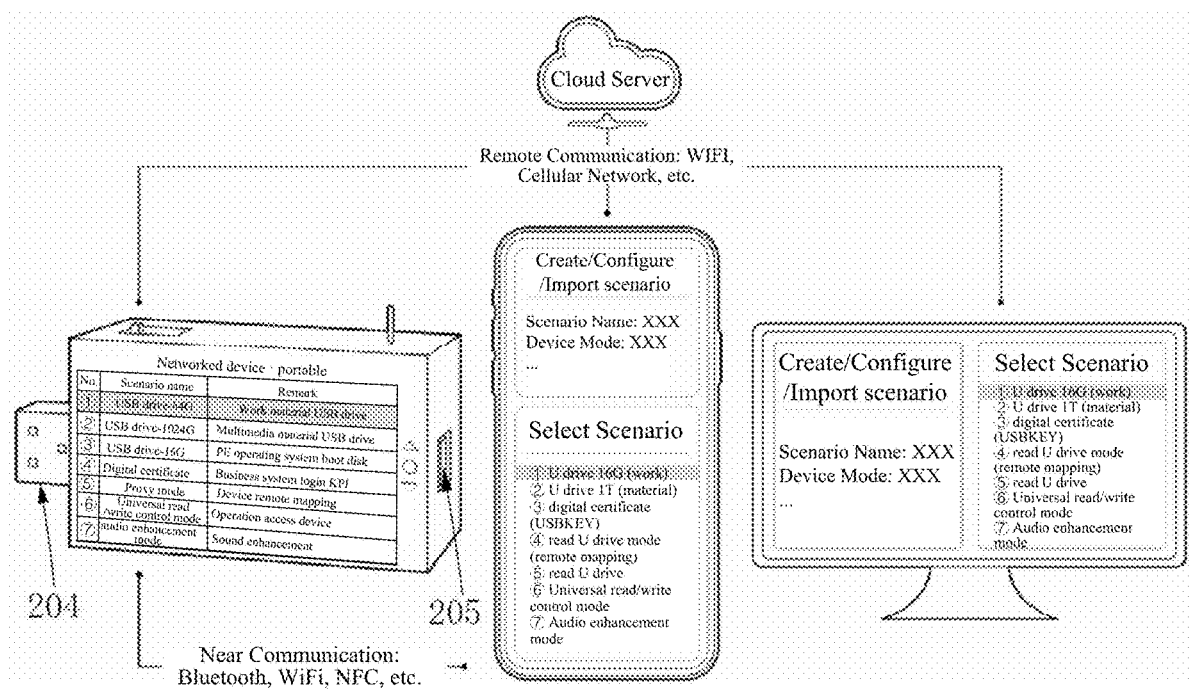
FIGS. 3A-3B are schematic diagrams illustrating interaction between the networked device as a portable device and a control end according to an embodiment of the present disclosure.
Figure 3B:
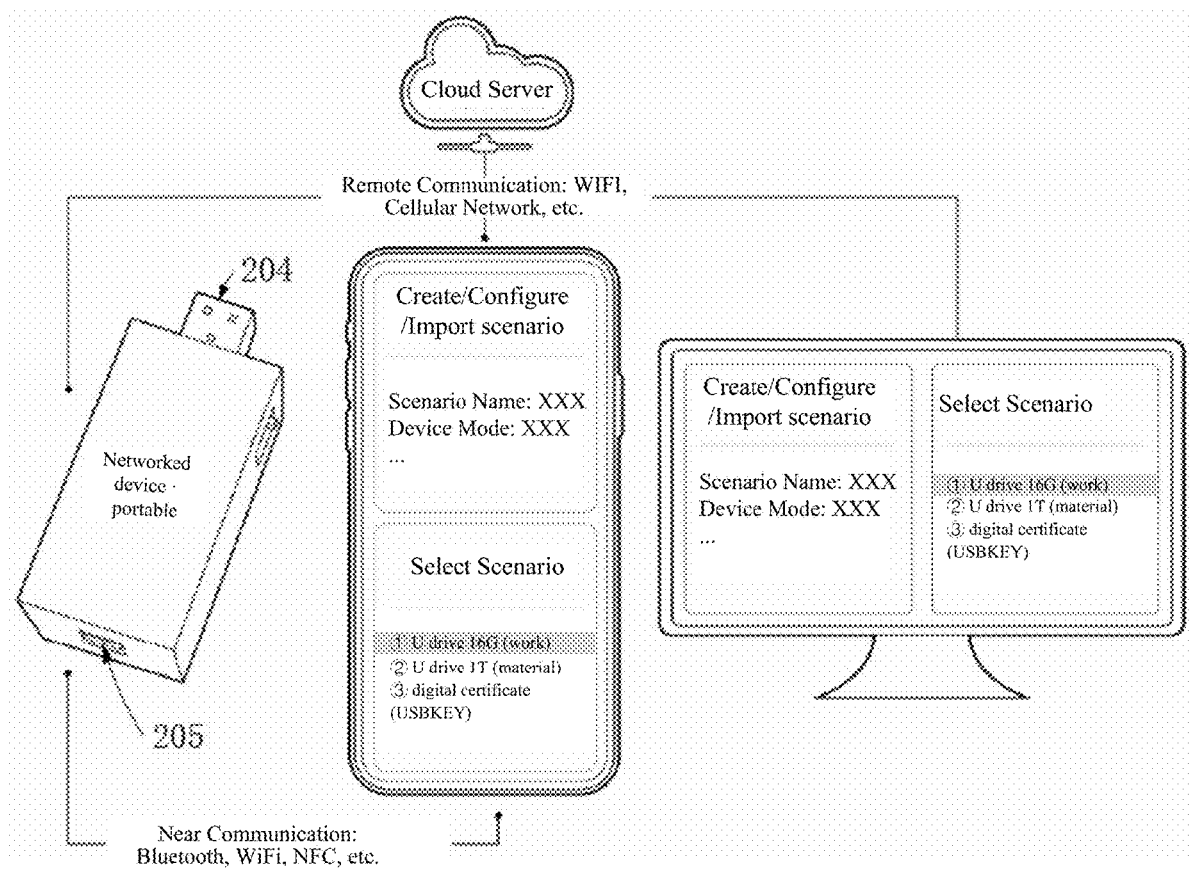
Figure 3C:
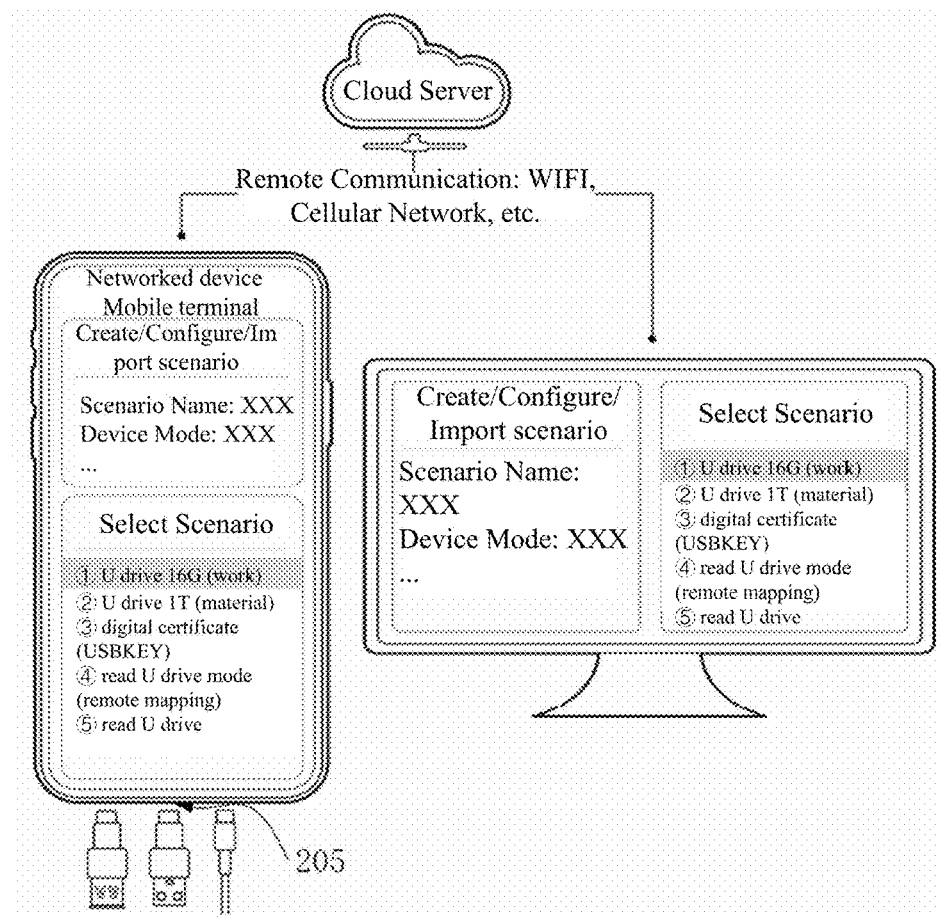
FIG. 3C is a schematic diagram illustrating interaction between the networked device as a mobile terminal and the control end according to an embodiment of the present disclosure.
Figure 3D:
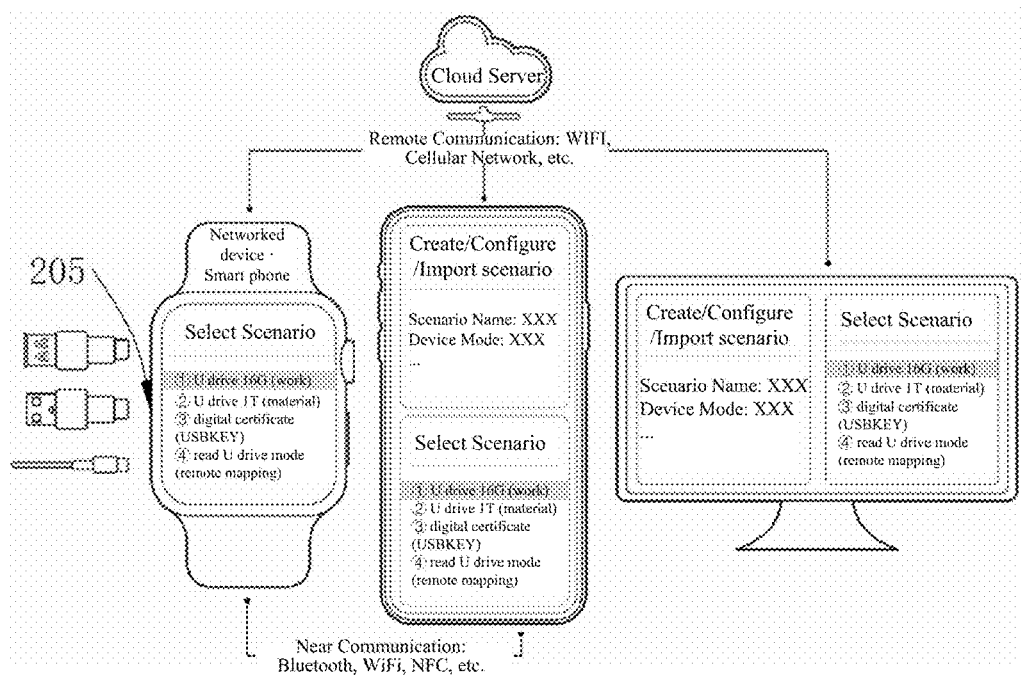
FIG. 3D is a schematic diagram illustrating interaction between the networked device as a smart watch and the control end according to an embodiment of the present disclosure.

Exemplarily, FIGS. 3A and 3B show schematic diagrams of interaction between the networked device as a portable device and the control end. The networked device in FIG. 3A is equipped with a display screen and a second interface 205. Scenarios information can be obtained from a cloud server (such as through a remote communication) or the control end (such as through a near-field communication) (or further obtaining the scenarios corresponding to a selected interface) and a scenario list is displayed on the display screen, a user can select one of the scenarios from the scenario list to be enabled. The networked device in FIG. 3B does not have a display screen, but has a second interface 205. A user can select one of the scenarios to be enabled by sliding the switch according to a numbering order of the scenarios. For a single device, switching among different scenarios (functions) can be easily achieved based on the numbering order of the scenarios. FIG. 3C shows a schematic diagram of interaction between the networked device as a mobile terminal and the control end. Scenarios information can be obtained or selected from the server, or can be created, edited, or imported locally on the mobile terminal. FIG. 3D shows a schematic diagram of interaction between the networked device as a smart wearable device (such as a smart watch) and the control end. Scenarios information can be obtained or selected from the server. The networked device shown in FIGS. 3C and 3D include a second interface 205. Furthermore, based on the second interface 205, the networked device can convert mobile phone ports (such as TYPE-C interfaces) to USB male ports (in a slave mode, male connectors) or female ports (in a master mode, female connectors) through data cables or interface conversion cables.

Figure 3E:
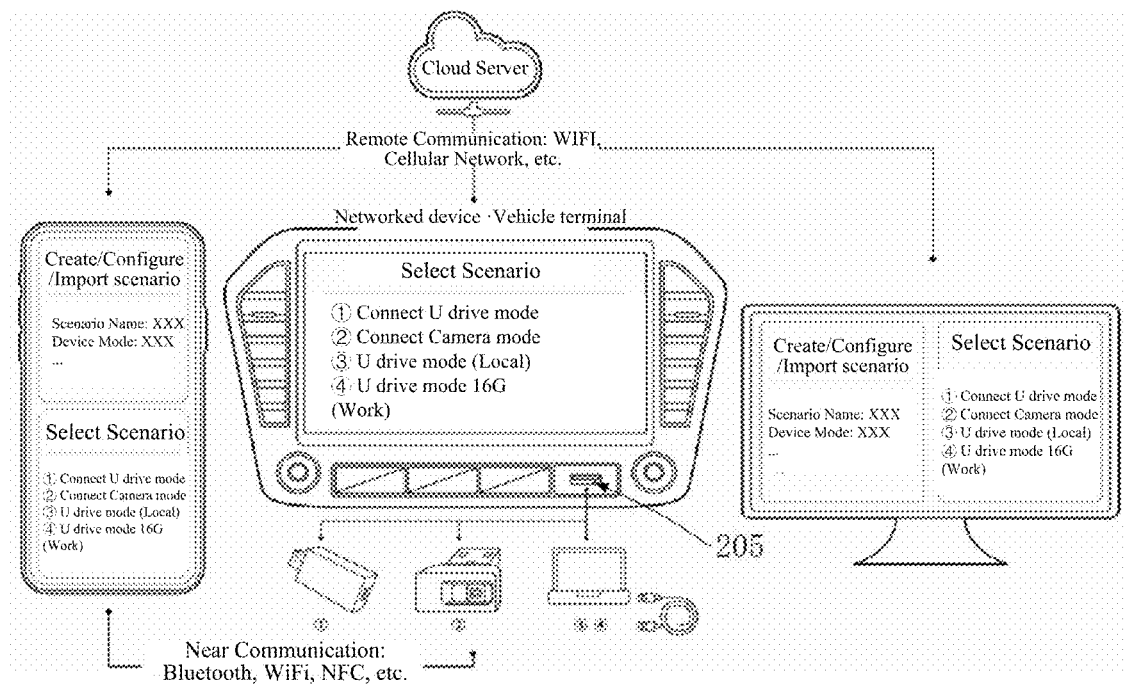
FIG. 3E is a schematic diagram illustrating interaction between the networked device as a vehicle terminal and the control end according to an embodiment of the present disclosure.

Exemplarily, FIG. 3E shows a schematic diagram of interaction between the networked device as a vehicle terminal and the control end. The networked device is equipped with a display screen and a second interface 205. Scenarios information can be obtained from a cloud server (such as through a remote communication) or the control end (such as through a near-field communication) (or further obtaining the scenarios corresponding to a selected interface) and a scenario list is displayed on the display screen, a user can select one of the scenarios from the scenario list to be enabled, thereby achieving function expansion, effectively solving a problem of functional expansion in a case of limited number of interfaces. For example, the USB interface of the vehicle terminal can be used as a master device to be connected to devices such as USB flash drives, cameras, etc., and store data locally or on the control end or on the cloud server; Alternatively, the USB interface of the vehicle terminal can be used as a slave device (such as a USB flash drive device) to be connected to a laptop, interactive data can be stored locally on the vehicle terminal or on networks.

Figure 3F:
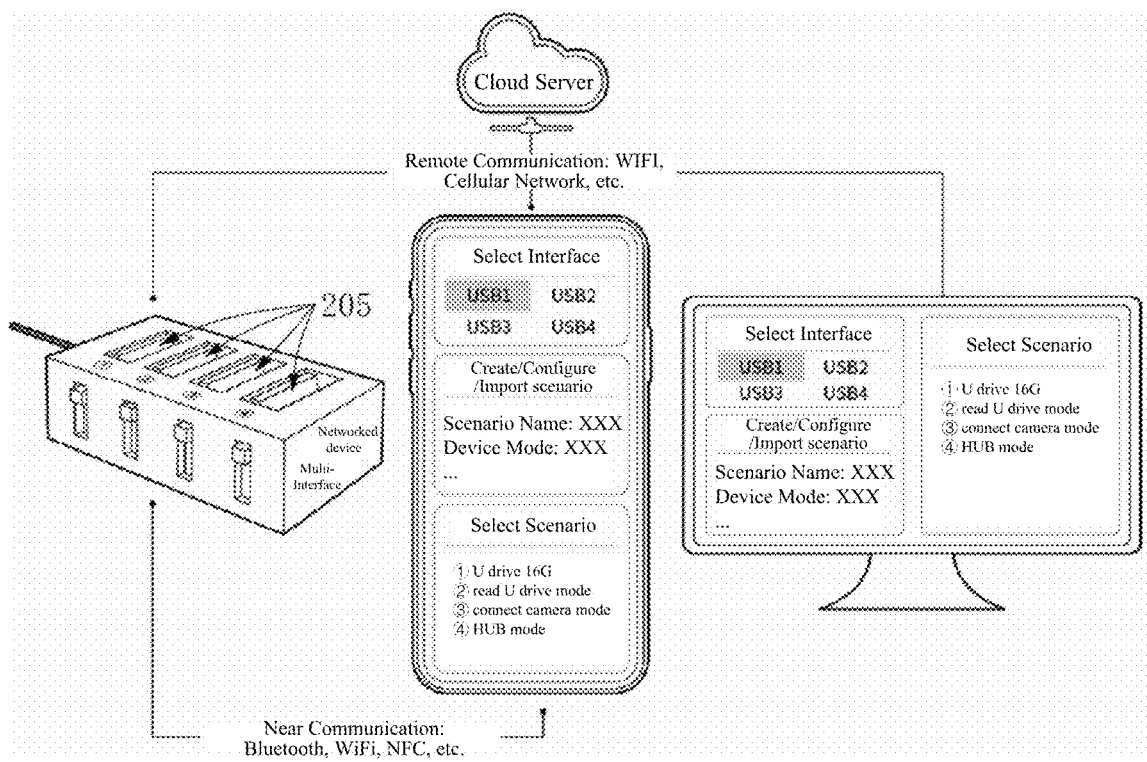
FIG. 3F is a schematic diagram illustrating interaction between the networked device as a device with multiple interfaces and the control end according to an embodiment of the present disclosure.

Exemplarily, FIG. 3F shows a schematic diagram of interaction between the networked device as a multi-interface device and the control end. The networked device is equipped with multiple second interfaces 205 configured to pre create, configure, import, or further select scenarios. The Networked device can obtain scenario information from a cloud server (such as through remote communication) or from a control end (such as through near-field communication), or further obtain scenarios corresponding to selected interfaces, and enable scenarios corresponding to the interfaces of the networked device according to configuration. In addition, for each interface, a user can select scenarios based on the numbering order of the scenarios by sliding the switch, thus achieving switching among different scenarios (functions) of multiple interfaces for a single device.

It should be noted that in above-mentioned FIGS. 3A-3F, networking units such as 201 in FIG. 2 can be included, which will not be repeated here.

Referring to FIG. 1, the equipment access method in an embodiment of the present disclosure includes following steps:

Step S101, configuring target configuration information for a networked device based on preset generation strategy. The target configuration information includes scenario configuration information for the networked device in at least one scenario. The scenario configuration information includes at least one of a first descriptor set and a descriptor instruction set, and data source configuration information. The first descriptor set is configured to define a device type of the networked device.

In this step, the scenario configuration information refers to configuration information that defines the device type (or device function) of the networked device, including but not limited to descriptor sets, descriptor instruction sets, data source configuration information, and device roles. The descriptor set includes but not limited to device descriptors, configuration descriptors, interface descriptors, endpoint descriptors, string descriptors, BOS descriptors, and custom descriptors. The descriptor instruction set is an instruction set that implements master device functions of the networked device, including various functional instruction sets. The functional instruction sets includes but not limited to an acquisition instruction set, a verification instruction set, a data source instruction set, an interactive instruction set, and a customized instruction set. The acquisition instruction set is configured to obtain descriptor sets, and the verification instruction set is configured to verify various descriptors in the descriptor sets. The data source instruction set is configured to obtain configuration parameters such as data source configuration information. The interaction instruction set is configured to achieve data interaction between the networked device and other devices, including but not limited to reading instructions, writing instructions, creating instructions, modifying instructions, deleting instructions, and configuring instructions. The customized instruction set is used to define expected function of the networked device. Device roles include a master role, a slave role, and/or a peer-to-peer role. When a networked device is a aster device, the device role is the master role. When a networked device is a slave device, the device role is the slave role. When a networked device is a peer-to-peer communication device, the device role is the peer-to-peer role.

Figure 4:
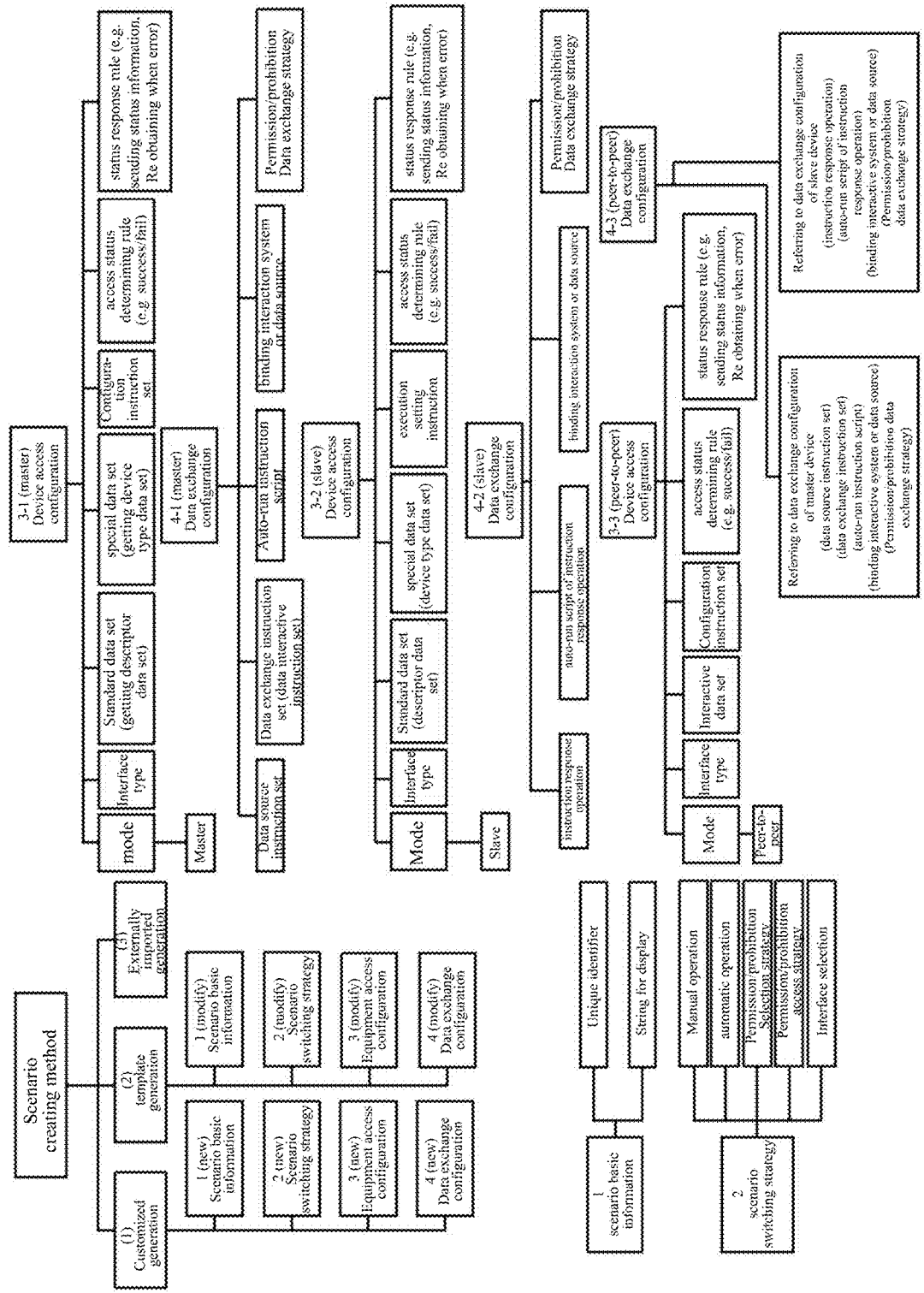
FIG. 4 is a schematic diagram illustrating configuring target configuration information of the networked device according to an embodiment of the present disclosure.

Referring to FIG. 4, a schematic view illustrating configuring the target configuration information of the networked device is shown.

In an embodiment of the present disclosure, scenario configuration information is configured through a server communicated with the networked device and a client communicated with the server. The preset generation strategy includes at least one of a customized generation strategy, a template generation strategy, or an imported creation strategy from outside.

In an embodiment of the present disclosure, when the preset generation strategy is a customized generation strategy, the client generates scenario configuration information and sends it to the server. The networked device determines a scenario and send a request to the server to obtain the scenario. The server sends scenario configuration information corresponding to the scenario to the networked device based on the request sent by the networked device.

Optionally, when the preset generation strategy is a customized generation strategy, configure the first descriptor set and data source configuration information of the networked device based on the device role selected by the user. For example, if the device role of the networked device is selected as the master role (i.e. as a master device communicating with the target device), configure the functional instruction set for enumeration of the master device, such as obtaining the acquisition instruction set, the verification instruction set, the configuration instruction set, the interactive instruction set, the data source instruction set, and the customized instruction set; and configure data source configuration information to bind data sources during data exchange between the networked device and the target device. The data sources include but are not limited to mirrored storage files, specific folders, databases, and data streams. If the device role of the networked device is selected as the slave role (i.e. as the slave device that communicates with the target device), configure the descriptor parameters, the device type parameters, and the data source configuration information used to reply to the master device. If the device role of the networked device is selected as the peer-to-peer role, configure device exchange configuration information. Configuring device exchange configuration information includes configuring a data sending end or a data receiving end of the networked device, such as configuring the interface 1 of the networked device as the data sending end and the interface 2 of the networked device as the data receiving end.

In an embodiment of the present disclosure, when the preset generation strategy is a template generation strategy, configure at least one of the first descriptor set and the descriptor instruction set of the networked device, and the data source configuration information based on a preset scenario template. For example, if an application scenario where the networked device serves as a slave device (such as a mass storage device, an audio and video device, etc.), then based on the preset scenario template corresponding to the application scenario, configure the manufacturer, identification information, string information, and etc. in the descriptor, as well as configure the data source configuration information.

In an embodiment of the present disclosure, when the preset generation strategy is an imported generation strategy from outside, configure at least one of the first descriptor set and the descriptor instruction set of the networked device, as well as the data source configuration information, based on an imported scenario template; or, based on the imported scenario information, configure the data source configuration information.

It should be noted that this embodiment generates configuration information corresponding to different application scenarios or device roles (device modes) to enable the networked device to be applied to multiple application scenarios and improve its applicability.

In an embodiment of the present disclosure, the user can select a scenario on the display unit of the networked device. The described scenarios include, but are not limited to, USB drive scenarios, USBkey scenarios, network proxy control scenarios, and network intermediate control scenarios.

In an embodiment of the present disclosure, a type of the scenario can be a single device, such as a large capacity storage device including a USB flash drive. The type of the scenario can be multi-scenario including a USB flash drive, a camera, and etc. Multiple scenarios including USB flash drives and cameras can be applied to the target device simultaneously. For example, a combination of multiple scenarios (USB flash drive+camera) is applied.

In an embodiment of the present disclosure, the device corresponding to a single scenario can be a single device, for example, used as a separate USB flash drive to be connected to the target device. The device may be a hybrid device including a USB flash drive and a camera to be connected to the target device. The device may be a multi-function device (e.g. having USB flash drive function and camera function). One of the above-mentioned types devices is selected to be connected to the target device.

In an embodiment of the present disclosure, when generating scenario configuration information, at least one of the first descriptor set and the descriptor instruction set of the networked device, and the data source configuration information, can be configured based on the device role of the networked device. For example, if the device role of the networked device is the master role (for example, as a master device communicating with the target device), configure a descriptor instruction set for the master device to enumerate slave devices, and/or configure data source configuration information for data exchange between the master device and slave devices. The data source configuration information is used to bind data sources during data exchange between the networked device and the target device. Data sources include but not limited to storage media, storage space address ranges (such as sector address ranges), mirrored storage files, specific folders, databases, and data streams.

In an embodiment of the present disclosure, the scenario configuration information further includes scenario basic information and a scenario switching strategy. The scenario basic information includes one or more of scenario identifiers and scenario names. The scenario identifier is used to represent a unique identity of the scenario, for example, the unique identity can be the unique ID value of the scenario. The scenario name is used to represent a name of the scenario, for example, the scenario name can be "USB drive (work)", "USB drive (life)", and so on. The scenario switching strategy is used to represent a strategy for selecting or switching scenarios for the networked device. The scenario switching strategy should at least include a manual operation selection strategy, an automatic operation selection strategy, an allowed or prohibited selection strategy, an allowed or prohibited access strategy, and an interface selection strategy.

In an embodiment of the present disclosure, the manual operation selection strategy indicates that the scenario where a user selects a networked device through an interaction interface or physical interaction control of a client, a server, a networked device, a control end, or a target device. For example, the user selects a scenario on the interface of a client's application or a web browser.

Optionally, after a connection between the networked device and the target device being established, the networked device can transmit scenario information to the target device through data exchange, and the target device selects a scenario for the networked device.

Optionally, after a connection between the networked device and the target device being established, the networked device can receive scenario information transmitted by the target device through data exchange. The scenario of the networked device is selected by the target device, or the networked device, or the server, or the client, and etc.

In another embodiment of the present disclosure, the manual operation selection strategy indicates user's selection of scenarios in the interaction space of the networked device. For example, a user can select a scenario through buttons, switches, or sliding switches of the networked device. Optionally, the scenario can be selected on the display unit of the networked device. For example, the networked device is equipped with a display unit that displays options for users to select application scenarios. Based on the user's selection operation, the application scenario is determined so as to preload scenario configuration information corresponding to the selected scenario by the user when the networked device communicates with the server. Similarly, the selection process on the networked device can be real-time or non-real-time. Optionally, preset application scenarios can be selected through a physical switch of the networked device. For example, the networked device is equipped with a physical switch, a scenario corresponding to a current switch pointer is selected by toggling the physical switch, so as to preload scenario configuration information based on user selection when communicating with the server.

The automatic operation selection strategy represents the rules for presetting selected scenarios, and automatically selecting scenarios when the client, the server, the networked device, or the target device meets a preset rules for the selected scenarios. The rule for presetting the selected scenarios is to select the scenarios based on a timing clock. For example, when a local or network timing clock of the client, the server, or the networked device matches a preset clock, select the corresponding scenario.

In an embodiment of the present disclosure, a scenario is selected based on data from peripheral modules of the client, the server, or the networked device. For example, when location information of a positioning module of the networked device (such as GPS positioning module or Beidou positioning module) meets a first preset position, or when signals from communication module of the networked device such as Wi Fi and Bluetooth meet a first preset condition (such as carrying or not carrying a preset MAC address in the signals), Or when data from a sensor module of the networked device meets a first preset value (for example, data from a temperature and humidity sensor meeting the corresponding first preset value), or when a near-field communication module of the networked device (such as the NFC communication module) receives a specific signal, the corresponding scenario is selected.

In an embodiment of the present disclosure, the networked device automatically selects the corresponding application scenario based on preset interaction data of the target device (such as descriptor content, descriptor instructions, or data communication (or data exchange) content).

The allowed or prohibited selection strategy represents allowing or prohibiting selection of a scenario according to scenario basic information, access configuration, or data exchange configuration of the scenario. A selection of scenarios corresponding to specific hardware type scenarios is allowed or prohibited according to preset rules of access configuration information (device descriptor, configuration descriptor, interface descriptor, endpoint descriptor, string descriptor, BOS descriptor, and etc.) and data exchange configuration information, for example, prohibiting to select scenarios of mass capacity device types (such as USB drives). According to preset rules of peripheral module data, it is prohibited or allowed to select specific scenarios, such as when the position information of the positioning module of the networked device (such as GPS, Beidou positioning, etc.) meets a second preset position, or when the signal of communication modules such as WIFI and Bluetooth meets a second preset condition (such as the presence or absence of a preset MAC address), or the data of the sensor module of the networked device meets a second preset value (such as data of the temperature and humidity sensor meeting the second preset value), or the NFC communication module of the networked device receives a specific signal, it is allowed or prohibited to select the corresponding scenario.

In an embodiment of the present disclosure, the networked device allows or prohibits corresponding application scenarios based on the preset interaction data of the target device (such as descriptor content, descriptor instructions, or data communication (or data exchange) content sent by the target device).

The allowed or prohibited access policy represents allowing or prohibiting to connect a target device to the interface of the networked device according to preset rules and data sent by the target device. When at least one of the descriptors (such as vendor ID, device ID, or device type (used class, subclass, interface command set, endpoint transfer mode), descriptor instructions, or data communication content sent by the target device meets preset requirements, access to the target device is allowed/or prohibited. For example, if the allowed or prohibited access strategy is to prohibit access of large capacity storage devices, when the networked device is in the master mode and sends descriptor instructions, response data of the target device meets characteristics of a mass capacity device type (such as USB flash drive), the networked device disconnects to protect security of the server or the control end. For example, if a networked device acting as a master role is the network proxy control device, based on a preset script, the vendor ID, device ID, or device type (used class, subclass, interface command set, endpoint transmission mode) of a connected target device are determined by reading the descriptor. Remote mapping is only allowed when vendor ID, device ID, or device type of the connected target device meets preset criteria, so as to protect security of the server or the control end.

The interface selection strategy represents that if a networked device has only one interface, the selected scenario is configured to be enabled by default on the unique interface (such as a unique interface for a USB device). If the networked device has multiple interfaces (such as multiple interfaces for a USBHUB device), the selected scenario is configured to be enabled on at least one interface selected from the multiple interfaces. For example, the networked device have two interfaces, an interface 1 is selected to enable scenario A and an interface 2 is selected to enable scenario B, or both the interface 1 and interface 2 are selected to enable the scenario A simultaneously. It should be understood that in other embodiments, the networked device further includes more or fewer components, such as in a case of only the first interface without a second interface. If the first interface is a male port and serves as an interface for a slave device (such as a network USB drive mode), then when needed to act as a master device (such as a read/write USB drive mode), the male port is converted to a female port through an interface converter (such as an OTG adapter) to act as an interface for the master device. For example, the networked device includes multiple first or second interfaces to simultaneously connect with multiple master devices or slave devices. The networked device can have no display unit and switching of scenarios can be performed on the server, or the networked device is controlled by other terminals through WiFi, Bluetooth, NFC, and other methods. The display unit can also include more or fewer scenarios, which will not be repeated here.

In an embodiment of the present disclosure, when generating scenario configuration information, if the device role of the networked device is the master role (i.e., as the master device communicating with the target device), first equipment access configuration information is configured. The first equipment access configuration information includes a first mode, a first interface type, a standard instruction set, a special instruction set, a configuration instruction set, a first connecting state determining rule, and a first state response rule.

The first mode configures the networked device to be the master mode. The first interface type is configured to set a physical interface type of the networked device, such as USB interface, HDMI interface, SCSI interface, IEEE1394 interface, SATA interface, eMMC interface, SDIO interface, M.2 interface, serial communication interface, and etc. The first interface type can further bind communication protocol instructions corresponding to the physical interface type, such as binding token packets (such as SETUP, IN, OUT, PING, and etc.), or status packets (such as ACK, NAK, NYET, etc.), or transmission methods (such as control transmission, batch transmission, interrupt transmission, synchronous transmission, and etc.), or standard communication protocols in USB. The first standard instruction set includes a descriptor instruction set, which is used to send instructions (such as getting device descriptors, getting configuration descriptors, getting interface descriptors, getting endpoint descriptors, getting string descriptors, getting BOS descriptors, and etc.) to the target device (slave device), requesting to obtain corresponding descriptor data of the slave device so as to connect the target device. The special instruction set includes the instruction set for getting device type data, which is used to get data of different device types. It should be noted that different networked devices correspond to different special instruction sets. For example, the special instruction set for USB related USB Mass Storage Class includes instructions for MAXLUN to get the maximum number of logical units descriptor, the special instruction set for Human Interface Device includes instructions for getting HID descriptor, and the special instruction set for camera (USB Video Class) includes instructions for GET_RES to get resolution attribute descriptors, and etc. The configuration instruction set, is used to send configuration instructions. The configuration instruction shall at least include one or more of the instructions such as setting address, enabling configuration (setting configuration), enabling endpoint, or starting peripheral module. The first access status determining rule is used to determine whether the connected device has been successfully connected/or failed to be connected based on the data or response status (responsive/unresponsive) returned by the target device. The data returned by the target device includes the data returned by the target device during the device access phase or data exchange phase of the networked device. The first state response rule is a rule used to respond based on the connecting status of the networked device. For example, when it is determined that the connected device has been successfully connected, the connected device sends a successful connection message to the server, and the server prompts the client to proceed to a next step; when it is determined that the network device has failed to connect with the target device, it sends information on connecting failure to the server, obtains a new instruction set, and resends the new instructions to the target device. It should be noted that the instruction set mentioned above can be at least one data exchange instruction or multiple data exchange instructions.

In an embodiment of the present disclosure, multiple pre-selected scenarios can be preset for automatic selection in the event of connecting failure. For example, when the selected scenario A (such as connecting a USB drive scenario) fails to connect, scenario B (such as connecting a camera device scenario) or scenario C (such as connecting a keyboard device scenario) can be switched to retry connecting until all pre-selected scenarios are selected or connecting is successful.

In an embodiment of the present disclosure, the server further retrieves, compares, analyzes, and determines the returned data based on the relevant connecting data submitted by the networking device when the connection fails (such as the data returned by the target device to the networking device (such as all or part of the descriptor or related handshake data), to confirm the device type of the target device. Therefore, a new set of acquisition descriptor instructions can be sent to the networked device or a new scenario can be selected to enable the networked device to attempt to connect the target device again.

In another embodiment of the present disclosure, when generating scenario configuration information, if the device role of the networked device is a slave role (i.e., as a slave device that communicates with the target device), a second equipment access configuration information is configured.

In an embodiment of the present disclosure, the second equipment access configuration information includes a second mode, a second interface type, a standard data set, a special data set, execution setting instructions, a second connecting state determining rule, and a second state response rule.

The second mode configures the networked device to be in the slave mode. The second interface type is used to set a physical interface type for the networked device, such as USB interface, HDMI interface, SCSI interface, IEEE1394 interface, SATA interface, eMMC interface, SDIO interface, M.2 interface, serial communication interface, and etc. The second interface type further can bind communication protocol instructions corresponding to the physical interface type, such as responding to token packets (such as SETUP, IN, OUT, PING, etc.), or status packets (such as ACK, NAK, NYET), or transmission methods (such as control transmission, batch transmission, interrupt transmission, synchronous transmission, etc.), or standard communication protocols in USB. The standard data set includes the first descriptor data set (such as device descriptor, configuration descriptor, interface descriptor, endpoint descriptor, string descriptor, BOS descriptor, and etc.), which is used to return corresponding descriptor data based on the type and parameters of the sending instruction when the target device (the target device is the master device) sends instructions, in order to establish communication connections with the networked device. The special data set includes a device type special data set (such as MAXLUN maximum number of logical units, GET_RES resolution attribute, and etc.), which are used to return corresponding data when the target device sends instructions, based on the type and parameters of the sent instruction, as well as the scenario configuration of the networked device or device types. The Execution setting instructions are used to perform operations such as configuring the networked device, physical communication interfaces, or peripheral modules of the networked device when the target device sends setting instructions, based on the type and parameters of the setting instructions sent to the target device (such as setting addresses, enabling configurations (setting configurations), enabling endpoints, or starting peripheral modules). The second connecting status determining rule is used to determine whether connection is success or failed based on data sent by the target device (including data sent by the target device during the device connecting stage or data exchange stage). For example, if the instructions for requesting a USB device are different from those for requesting a camera device. The second state response rule is a rule used to respond based on the connecting state of the networked device (i.e. handshake or enumeration). For example, when it is determined that the networked device is successfully connected (or handshake or enumeration is successful), a successful connection message is sent to the server, and the server prompts the client to proceed to a next step; when it is determined that the networked device failed to be connected, it sends information on connecting failure to the server, obtains a new dataset, and resends a signal (such as an enumerable signal) to establish a connection with the target device. It should be noted that the data set mentioned above can be return data of at least one data exchange instruction, or multiple return data of multiple data exchange instructions.

In an embodiment of the present disclosure, multiple pre-selected scenarios can be preset for automatic selection in case of connecting failure. For example, when the selected scenario A (as a USB flash drive scenario) fails to connect, scenario B (as a camera device scenario) or scenario C (as a keyboard device scenario) can be switched to retry connecting until all pre-selected scenarios are selected or connecting is successful.

In an embodiment of the present disclosure, the server further retrieves, compares, analyzes, and determines the sent instruction data based on relevant connecting data (such as the data sent by the target device to the network device (such as standard instructions, special instructions, or set instructions or other related handshake data) submitted by the networked device when the network device fails to be connected, confirms the type of device that the target device needs to connect with, and sends a new descriptor set to the networked device or select a new scenario, so that the networked device can try to connect to the target device again.

It should be noted that the interface of the networked device in the embodiment of the present disclosure can be switched between the master mode and the slave mode after leaving the factory (such as an interface with OTG function), or can be fixed as the master mode or fixed as the slave mode (such as an interface without OTG function, which is designed to be fixed as the master or slave interface on the hardware circuit). When the interface is fixed to the master or slave mode, the corresponding scenarios of the interface can only be different scenarios in the master or slave mode, and there is no need to configure them in the scenario configuration. At the same time, depending on different types of the interface, it can be fixed to a specific communication protocol and there is no need to configure in the scenario configuration, such as fixing to corresponding USB protocol when the interface is a USB interface.

In another embodiment of the present disclosure, when generating scenario configuration information, if the device role of the networked device is in peer-to-peer communication mode, configure a third equipment access configuration information. The third equipment access configuration information includes a third mode, a third interface type, an interactive data set, a setting instruction set, a third state determining rule, and a third state response rule.

The third mode is used to configure the networked device to be in the peer-to peer communication mode. The third interface type is configured to a physical interface type of the networked device. The interactive data set is configured to configure data transmitted to a target device when the target device is connected. The setting instruction set is used to perform operations such as configuring the networked device, interfaces or peripheral modules of the networked device when the target device sends setting instructions, based on the type and parameters of the setting instruction (such as setting addresses or starting peripheral modules). The third state determining rule is used to determine connecting success/failure of the network device based on the data sent by the target device (including the data sent by the target device during the data exchange stage). The third state response rule is used to make a response based on the connecting state. For example, when it is determined that the networked device is successfully connected, a message on successful connection is sent to the server, and the server prompts the client to proceed to the next step; when it is determined that the networked device failed to be connected, while sending information on connecting failure to the server, obtains new data sending instructions or response data set, and resend data to the target device or wait for receiving data from the target device.

In an embodiment of the present disclosure, the scenario configuration information further includes data exchange configuration information. If the device role of the networked device is the master role (for example, as the master device communicating with the target device), the data exchange configuration information includes a data source instruction set, a data exchange instruction set, an automatic execution instruction script, a first binding interaction system or a data source policy, and first permission/prohibition exchange policy.

The data source instruction set is used to send instructions to the target device to get and set the data source information of the target device, such as getting capacity information of the target device (such as the maximum number of logical units, the total number of formattable logical blocks, the last logical block address, block capacity, total capacity, available space capacity, and etc.) or read/write status (such as read-only status, write only status, read/write status). The data exchange instruction set is used to send instructions to the target device, causing the target device to execute preset instructions or to return data. For example, sending write instructions and data packets to the target device, causing the target device to write data packets at a specific location on its storage medium; Alternatively, sending read instructions to the target device, causing the target device to return data stored on specific location of its storage medium, or read specific data of a peripheral module of the target device, or specific data of a sensor. The write and read instructions should at least include the storage space address (such as the sector address) and the number of storage spaces (such as the number of sectors) of the storage medium to be read/write.

In an embodiment of the present disclosure, the data exchange instruction set may be a low-level instruction. The data exchange instructions include USB communication protocol instructions. The USB communication protocol instructions include: sending an IN token packet to a specific endpoint (such as endpoint 1) of the target device (such as a USB device) to obtain data returned by the target device (i.e., IN data instructions to endpoint 1); and/or send OUT token packets and data packets to specific endpoints (such as endpoint 2) of the target device (USB device) to send data to the target device (OUT data instructions to endpoint 2).

The data exchange instructions (such as low-level instructions) include Small Computer System Interface (SCSI) transparent command set instructions. The SCSI transparent command set instructions send read instructions to the target device (such as a USB storage device) to get data at a specific sector address of the target device's storage space; and/or send write instructions and data packets to the target device (such as a USB storage device), to write data to a specific sector address in the storage space of the target device.

In another embodiment of the present disclosure, the data exchange instruction set includes an automatic execution instruction script. The automatic execution instruction script represents automatically sending interactive instructions (including low-level or high-level instructions) to the target device according to preset script rules, thus achieving automatic operations. The automatic execution instruction script includes an automatic execution read file directory script. For example, after the target device (such as a storage device) is successfully connected, an automatic running rule is triggered, which automatically executes the script to read the file directory to read file information. The data of the read file information is converted and displayed in the interactive system (such as the client interface). Specifically, the automatic execution read file directory script automatically reads all file directory data according to file system protocol rules. The reading rules include: first read data stored in boot sector (usually the sector address 0x00) to analyze the address of the boot sector of the file system; read the data stored in boot sector of the file system again to analyze the sector address and cluster (block) size of the root folder (or first directory), and then read data stored in the sector address of the root folder to analyze file information; based on the file information, sub directories, sub files, and etc. can be analyzed.

Furthermore, the automatic execution instruction script can further include high-level instructions, which are operation script instructions based on multiple low-level instructions (such as read/write of USB communication protocol and/or SCSI transparent command set instructions), and executed according to user actions or timing conditions. For example, file operation instructions developed for different file system protocols (such as exfat, fat32, and etc.) can automatically send multiple interaction instructions (including references between multiple low-level instructions and high-level instructions) to the target device based on parameters of high-level instructions (such as file path, file name, and etc.), and analyze context of read and write data of the interaction instructions, read/write data from/to specific storage space (such as data stored in sector address) of the target device file system to achieve specific file operation functions, such as "create file instruction", "delete file instruction", "modify file attribute instruction", "read file content instruction", "modify file content instruction", and etc. The high-level instructions can be issued to the networked device by operators through triggering commands on clients, servers, or networked devices; or through triggering commands on peripheral modules such as timing devices and GPS. The high-level instructions can be referenced to each other, for example, "high-level instructions for creating and generating content", first executing creating file instructions (file name is the parameter of the create file instructions), and then execute modify file content instructions (file name, file content are parameters of the modify file content instruction), such as creating a text file with a file name of test.txt and file data of the "test" string.

In an embodiment of the present disclosure, the high-level instructions can be file operation instructions developed based on different file system protocols, such as create file instructions, delete file instructions, modify file attributes instructions, read file content instructions, modify file content instructions, and etc.

In an embodiment of the present disclosure, the automatic execution instruction script includes a data listening script. The data listening script is used to automatically respond to the server and the client when preset rules are met. For example, the networked device sends IN token packets to the IN endpoint of the target device (such as a USB video source device, a USB camera, and etc.) to detect whether the target device has sent data packets (non NAK status packets) to the networked device through the IN endpoint. When there are data packets sent through the IN endpoint, the target device forwards the data packets received from the IN endpoint to the client or the server.

In an embodiment of the present disclosure, the automatic execution instruction script includes automatically executing preset scripts (such as high-level or low-level instructions) based on data from peripheral modules (such as positioning modules GPS, sensors, and etc.), timing devices, or network modules. For example, when the GPS positioning device detects a location that is not at preset location or the local IP address of the networked device is not at a specific address, execute a command to delete file data, to start data listening scripts, and etc.

The first binding interaction system or data source strategy is used by the networked device to automatically convert instructions issued by the client and the server into a preset data exchange instruction set (at least one instruction) and send the converted data exchange instruction set to the target device for execution. For example, the issued instructions can read/write a file, read/write a specific sector address, and other operations for the client.

In another embodiment of the present disclosure, the first binding interaction system or data source strategy is further used to automatically store the data after the networked device operates on the target device to any one of a storage media (such as storage chips, hard disks, and etc.), storage space (such as sector intervals), specific databases/or folders/or files (such as mirror files), storage space or structured data strings in the networked device, the client, and the server.

The first permission/prohibition exchange policy represents permission/prohibition of the client or the server to perform operations including sending specific instructions to the target device through the networked device, such as prohibiting sending instructions to write data to the target device.

In an embodiment of the present disclosure, the first permission/prohibition exchange strategy may include low-level instructions. The first permission/prohibition exchange policy can be a USB communication protocol instruction, for example, the first permission/prohibition exchange policy can permit/prohibit to send IN/or OUT token packet instructions to specific endpoints. The first permission/prohibition exchange policy can also be a SCSI transparent command set instruction, for example, the first permission/prohibition exchange policy can only permit/prohibit to send read/write instructions to specific sector positions.

In another embodiment of the present disclosure, the first permission/prohibition exchange policy may include high-level instructions, for example, the first permission/prohibition exchange policy may be a file operation instruction, such as only permit/prohibit to send delete file instructions.

The first permission/prohibition exchange strategy can further represent control based on data packets corresponding to instructions, permitting/prohibiting the target device to send specific data (such as data packets with specific characteristics) to the networked device. For example, the data packet accompanying permission/prohibition write instructions conforms to specific characteristics, and the write instructions are sent to the target device. Alternatively, data packets returned by the target device in the permission/prohibition read instructions conforms to specific characteristics, and the read instructions are sent to the server or the client. The first permission/prohibition exchange policy can further represent a policy of permitting/prohibiting data exchange based on data of peripheral modules (such as positioning modules, sensors, network modules, etc.).

In an embodiment of the present disclosure, if the device role of the networked device is a slave role (for example, as a slave device communicating with the target device), the data exchange configuration information includes instruction response operations, automatic execution of instruction response operation scripts, a second binding interaction system or data source strategy, and a second permission/prohibition exchange strategy.

The command response operations are used to respond to data exchange instructions sent by the target device, such as performing preset operations or returning data.

In an embodiment of the present disclosure, the data exchange instruction set sent by the target device to the networked device may be low-level instructions, such as USB communication protocol instructions. The data exchange instruction set includes: when the target device (such as a USB master device) sends an IN token packet to a specific endpoint of the networked device (such as endpoint 1), responding to the packet to endpoint 1; when a specific endpoint of the target device (such as endpoint 2) sends OUT token packets and data packets, receiving the OUT token packets and the data packets sent by the target device to endpoint 2.

In an embodiment of the present disclosure, the data exchange instruction set sent by the target device to the networked device can be a SCSI transparent command set instruction. The data exchange instruction set includes: when the target device (as the master device) sends a read instruction to read data at a specific sector address, returning data at a specific sector address in the data storage space to the target device; when sending write instructions (including specific sector addresses and data packets) to the target device, the data packet is written to a specific sector address in the data storage space.

In an embodiment of the present disclosure, the data exchange instruction set sent by the target device to the networked device can be high-level instructions, such as file operation instructions developed based on different file system protocols. The data exchange instruction set includes at least one of a create file instruction, a delete file instruction, a modify file attribute instruction, a read file content instruction, and a modify file content instruction. The data exchange instruction set can also be an operation based on multiple low-level instructions (such as the read/write of USB communication protocol and SCSI transparent command set instructions), or it can be an automatic script that operates according to specific rules.

In an embodiment of the present disclosure, the objects operated by instructions of the data exchange instruction set of the networked device include storage class objects and peripheral module class objects. The storage class objects include at least one of the local storage chips of the networked device, databases/or folders/or files (such as mirror files)/or storage spaces (such as sector intervals) in clients and servers. The peripheral module objects include at least one of positioning modules, sensor modules, audio and video source modules, human-machine interacting modules, and encryption modules.

The automatically execute command response operation script represents that according to rules of the preset scripts the networked device automatically returns data to the target device, or performs data related read/write operations, or controls peripheral modules to achieve automatic operations. For example, when there is a backup requirement and data at a specific sector address is protected by default, when the target device sends data to be written to a specific sector address, it automatically reads the data at that sector address and writes it to the backup storage space before executing the target device's write data operation.

In an embodiment of the present disclosure, the networked device automatically executes an instruction response operation script, including a data listening script. The data listening script includes low-level instructions.

When preset rules are met, the data listening script automatically responds to the server, the client, the control end, or electronic devices connected to the networked device. For example, the target device sends OUT token packets and data packets to the OUT endpoint of the networked device. When the networked device detects that the endpoint number or data packet content meets preset rules, it forwards the data packet or sends a reminder to the client or the server.

In an embodiment of the present disclosure, the automatic execution command response operation script includes: automatically executing a preset script (such as high-level instructions or low-level instructions) based on data from peripheral modules (such as positioning modules, GPS, sensors, and etc.), timing devices, or network modules. For example, when the GPS positioning device detects a location that is not at a preset location or the local IP address of the networked device is not at a specific address, executing the command to delete file data, and starting data listening scripts, and etc.

The second binding interaction system/or data source is used to automatically convert instructions issued by the target device into preset instruction response operations and to execute them. For example, instructions issued by the target device can read/write a file, read/write specific sector addresses, and other operation instructions for the target device. The networked device performs corresponding operations according to instructions and return data packets or status packets. At the same time, the networked device further responds to capacity information (such as maximum number of logical units, total number of formattable logical blocks, last logical block address, block capacity, total capacity, available space capacity, etc.) or read/write status (such as read-only state, write only state, read/write state) based on instructions.

In another embodiment of the present disclosure, the second binding interaction system or data source strategy is further used to automatically associate the data source of the instruction response operation with any position of storage medium (such as storage chip, hard disk, etc.), storage space (such as sector interval), specific database/or folder/or file (such as mirror file), storage space, or structured data string in the networked device, the client, or the server.

The second permission/prohibition data exchange strategy represents control based on instructions and permitting/prohibiting the client, the server, or the networked device from operation (or response) to specific instructions issued by the target device, such as prohibiting operation or response to write data instructions sent by the target device.

In an embodiment of the present disclosure, the second permission/prohibition data exchange strategy includes low-level instructions. The second permission/prohibition data exchange strategy can be a USB communication protocol instruction, such as a token packet instruction sent by the target device to the endpoint IN/or OUT of the networked device to permit/prohibit operation (or response). The second permission/prohibition exchange policy can also be a transparent command set instruction for SCSI, such as permitting/prohibiting operation (or response) to instructions of read/write at specific sector positions sent by the target device to the networked device.

In another embodiment of the present disclosure, the second permission/prohibition exchange policy may include high-level instructions. For example, the second permission/prohibition exchange policy may be a file operation instruction, such as a delete file instruction sent by the target device to the networked device to permit/prohibit operation (or response). The second permission/prohibition exchange strategy can also represent control of specific data packets based on instructions, allowing/prohibiting operations (or responses) on specific data sent by the target device to the networked device.

In another embodiment of the present disclosure, when generating scenario configuration information, if the device role of the networked device is a peer-to-peer communication device, configuring device exchanges configuration information. The configuring device exchange configuration information includes configuring a data sending end or a data receiving end of the networked device, such as configuring interface 1 of the networked device as the data sending end and sending data to the receiving end of the target device through interface 1; configuring interface 2 of the networked device as the receiving end and receive data sent by the target device through interface 2. In an embodiment of the present disclosure, configuring specific content of the data sending end of the networked device can refer to configuring data exchange configuration information for the master device, and configuring specific content of the data receiving end of the networked device can refer to configuring data exchange configuration information for the slave device.

Step S102, preloading the target configuration information.

Optionally, in a case that the scenario configuration information is generated locally on the networked device, when the networked device is powered on (or being connected), preloading the scenario configuration information.

Optionally, in a case that the scenario configuration information is generated on the server, and the networked device preload the scenario configuration information obtained from the server.

Optionally, the scenario configuration information is preset on the server, and the networked device preload the scenario configuration information obtained from the server.

Optionally, the step S102 further includes preloading target configuration information when communicating with the server. The server stores multiple preset configuration information, and the target configuration information is one of the multiple preset configuration information, and the target configuration information includes scenario configuration information of the networked device in at least one application scenario. The scenario configuration information includes at least one of a first descriptor set and a descriptor instruction set, and the first descriptor set is used to define the device type of the networked device.

Optionally, the step S102 further includes: creating the scenario configuration information stored on the server by configuring at least one of the first descriptor set and descriptor instruction set of the networked device, and data source configuration information, based on a preset generation strategy before preloading the target configuration information.

Optionally, before step S102, configure the first descriptor set and data source configuration information of the networked device based on a preset generation strategy to generate the scenario configuration information. The preset generation strategy includes at least one of a customized generation strategy, a template generation strategy, or an externally imported generation strategy.

In an embodiment of the present disclosure, when the networked device is started (or before being connected), a communication connection is established between the networked device and the server, and the scenario configuration information stored by the server is preloaded. It can be understood that in other embodiments, the preloading process can be carried out at other times after the communication connection between the networked device and the server is established, and the communication establishment process of the communication connection can also be carried out at other times after the networked device is started.

In an embodiment of the present disclosure, the scenario configuration information is associated with the identification information of the networked device. For example, the identification information of the networked device can be S123456. Users or manufacturers can associate scenario configuration information corresponding to a single scenario or scenario configuration information corresponding to multiple scenarios with the identification information of the networked device S123456 on the server in advance. The networked device initiates a connection request to the server, which carries the identification information of the networked device. The server sends scenario configuration information corresponding to the identification information of the networked device to the networked device based on the connection request sent by the networked device. The identification information of the networked device can be data fixed within the main control chip of the networked device, data from peripheral modules (such as encryption chips) of the networked device, or user identification information, such as the unique identification information retained by the networked device after the user is bound with the networked device. The identification information of the networked device can be strings, binary data, and etc. In addition, the user identification information can also be associated with scenario configuration information. The scenario configuration information associated with the user identification information can be used for permission control or multi-user sharing of scenarios.

In an embodiment of the present disclosure, all scenario configuration information stored on the server that corresponds to the networked device is preloaded, or only scenario configuration information corresponding to the current application scenario of the networked device is preloaded. For example, based on a preset application scenario, preload scenario configuration information corresponding to the preset application scenario to the server.

In an embodiment of the present disclosure, the networked device is preset with a fixed scenario configuration template, and specific information in the scenario configuration is obtained from the server. Then, the specific information is combined with the preset scenario configuration template to generate scenario configuration information and the scenario configuration information is loaded. For example, the networked device are preset with scenario templates for USB drives at factory. When switching scenarios, the scenario configuration information obtained from the server only includes storage capacity information, read/write status, relevant strings, vendor ID, product ID, and other configurations related to the data source, in order to switch between different USB drive data sources and achieve functional changes.

In an embodiment of the present disclosure, the power supply method of the networked device includes but not limited to: 1. when the networked device is connected to the target device, the power supply of the target device is supplied to the networked device. For example, when the networked device serves as a slave device, it is connected to the target device (such as a computer host) to obtain power supply of the computer host; 2. the networked device is equipped with a built-in power supply for power supply; 3. The networked device is powered by external power sources. For example, when the networked device is used as a master device, it is connected to a mobile power source or a charging head through the first interface to obtain electrical energy. The second interface is connected to the target device (such as a slave device). When the networked device is used as a slave device, it is connected to a mobile power source or a charging head through the second interface to obtain electrical energy, and the first interface is connected to the master device.

Optionally, the communication establishment process between the networked device and the server includes sending communication connection requests to the server based on preset server configuration information. The preset server configuration information can be stored on the networked device, including but not limited to the server's communication address (IP address or domain name address, and etc.), port, username, and access password. For example, when a networked device is powered on and started, it reads local preset server configuration information and sends a communication connection request to the server based on the preset server configuration information to establish a communication connection.

Optionally, the networked devices is connected to the server through wired or wireless networks (such as twisted pair or fiber optic Ethernet interfaces, WIFI hotspots, ultra wideband UWB, Bluetooth, mobile cellular networks (such as 4G or 5G), satellite communication, and LoRa long-distance radios). The server includes but not limited to devices with network service functions such as personal computers, laptops, embedded computers, physical servers, and cloud servers, or electronic products such as mobile phones and mobile terminals. During the networking process, network security can be enhanced by setting virtual private networks or using private network lines.

In an embodiment of the present disclosure, the preset application scenario can be selected on the server. For example, by accessing the server through a client (such as an application or a web browser), the user selects scenario configuration information to be sent to the networked device on the client, and preloads the scenario configuration information based on the user's selection when the networked device communicates with the server.

It can be understood that the selection process on the server can be a real-time process or a non-real-time process, that is, when the scenario configuration information needs to be preloaded, the application scenario corresponding to the scenario configuration information can be selected in real-time on the server, or the application scenario corresponding to the scenario configuration information can be preselected. When the scenario configuration information needs to be preloaded, the scenario configuration information can be preloaded based on the preselected application scenario.

In an embodiment of the present disclosure, the preset application scenario can be selected on the interaction module of the networked device. For example, the interaction module of the networked device is equipped with a display unit that displays options for users to choose application scenarios. Based on the user's selection operation, the application scenario is determined, and thus, when the networked device communicates and connects with the server, the scenario configuration information based on the user's selection is preloaded. Similarly, the selection process on the networked device can be real-time or non-real-time.

In an embodiment of the present disclosure, the preset application scenario can also be selected through the physical switch of the networked device. For example, the networked device is equipped with a physical switch and an application scenario corresponding the current switch pointer is selected by toggling the physical switch, thereby preloading scenario configuration information based on user selection when the networked device communicates with the server.

In an embodiment of the present disclosure, the preset application scenario can also be automatically selected on the networked device. For example, the networked device automatically selects corresponding application scenarios based on preset interaction data of the target device (such as descriptor content, descriptor instructions, or data communication content). Alternatively, based on location information of the GPS module of the networked device, select a application scenario corresponding to a specific location; alternatively, the application scenario can be automatically selected based on a local or network timing clock of the networked device.

After obtaining scenario information, the networked device can save it locally and use it directly in next operation without a need to obtain it from the server. You can also delete scenario information when the networked device fails to connect to the server, or when the server issues a command to delete scenario data. It should be noted that the target configuration information of the present disclosure can be stored on the server to prevent malicious reverse cracking after the loss of the networked device. At the same time, the server is conducive to achieving real-time hot update of the target configuration information.

In an embodiment of the present disclosure, a carrier of scenario information includes but not limited to at least one of the following: (1) transmitted binary data stream, such as a network data stream, which can be strings, structures, and etc. The networked device can directly read and configure usage scenario information from the server; (2) Binary files, such as "Network USB drive. txt" (single scenario) or "USER123456. txt" (user scenario set), where the networked device import and configure usage scenario information by downloading the Binary file; (3) link library files, link library files may be dynamic link libraries such as "Network USB drive. so" (single scenario) or "USER123456. so" (user scenario set), where the networked device downloads the link library file and call functions, variables, literals, and other configuration usage scenario information through programs. In another example, link library files may be static link libraries such as "network USB drive. a" (single scenario) or "USER123456. a" (user scenario set), Among them, the networked device can configure usage scenario information by downloading link library files and further compiling, or directly calling functions, variables, literal values, and other configurations.

In an embodiment of the present disclosure, the networked device enables the scenario information to be displayed on the first or second interface of the networked device after obtaining the scenario information. If the networked device has only one interface, the scenario defaults to enabling a unique communication interface, such as the first or second interface. If the networked device has multiple interfaces (as shown in FIG. 4), enable it based on the interface number in the scenario configuration information. The selected enabling method can be selected on the client or the server, on the interaction module of the networked device, or by the data packet sent by the target device. For the networked device with more than 2 interfaces, scenario information can be enabled on the multiple interfaces, and data source can be shared and collaboratively operated among the multiple interfaces.

Figure 5A:
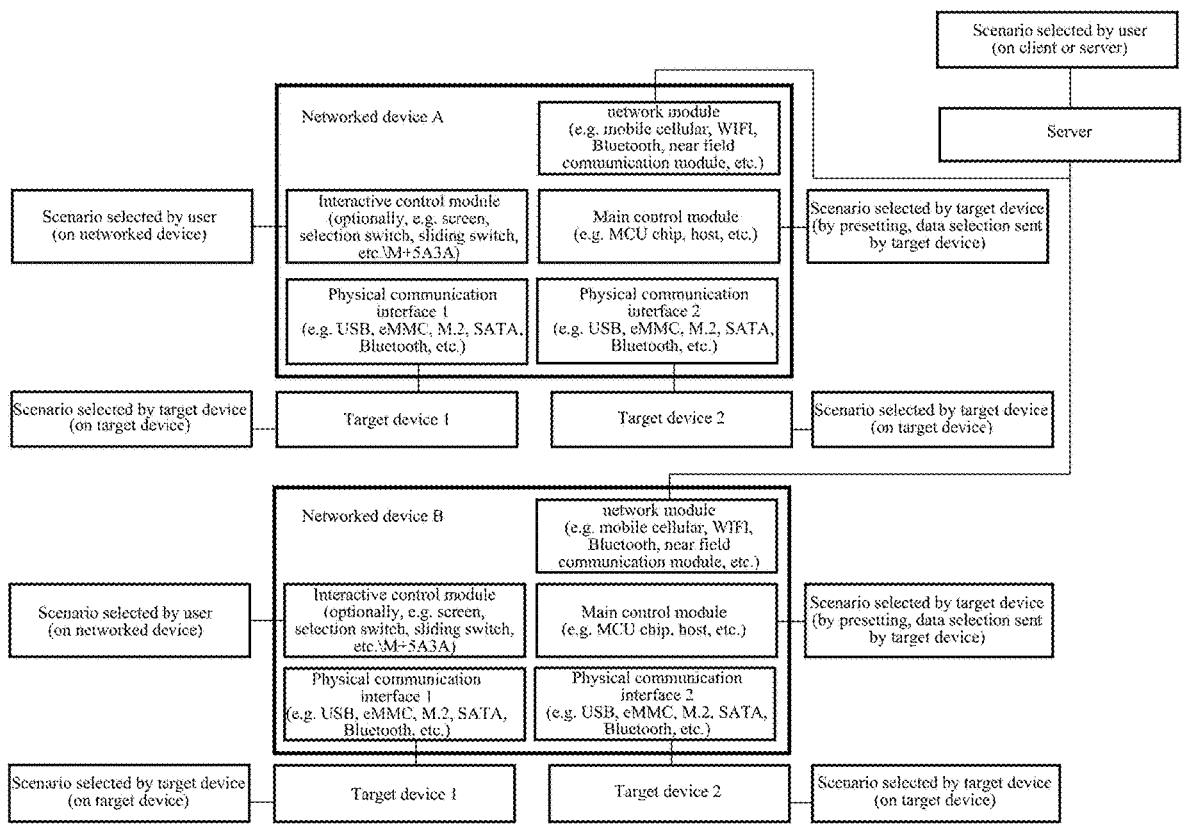
FIG. 5A is a structural diagram of a networked device according to another embodiment of the present disclosure.
Figure 5B:
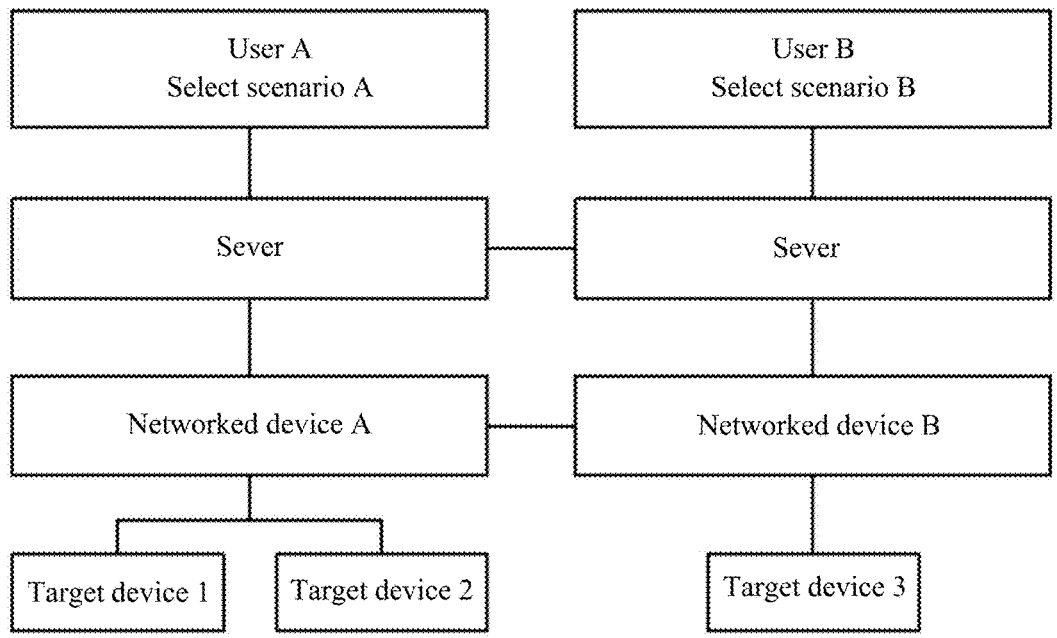
FIG. 5B is a structural diagram of a networked device according to another embodiment of the present disclosure.

Scenarios corresponding to interfaces of the networked device may include:

1. Multiple scenarios or scenario device types can be the same, such as interfaces for a same scenario device type (such as scenarios where the device type of a mass storage device is multiple USB drives), can be connected to different target devices respectively.
2. Multiple scenarios or scenario device types use the same scenario device type and data source (such as scenarios where the networked device of a mass storage device type has multiple USB drives, and multiple USB drives share the same data source), interfaces of the networked device can be connected to different target devices respectively to achieve data sharing and collaborative operation.
3. Multiple scenarios or scenario device types are different. For example, if Interface 1 is a scenario device type in a slave mode (such as USB flash drive mode), Interface 1 can be connected to target device 1 in USB flash drive mode (the target device 1 is a computer host). If Interface 2 is a scenario device type in a master mode (for example, the networked device with an instruction set for reading mass storage device types, target device 2 can be read), it can be connected to target device 2 (target device 2 is in USB flash drive mode).
4. There is only one scenario, but the scenario consists of multiple interfaces, and data can be shared and cooperatively operated among the multiple interfaces. For example, in a scenario that the networked device are in both the master mode and the slave mode, interface 1 of the networked device is in the master mode, the target device connected to the interface 1 is in the slave mode (such as a USB flash drive); interface 2 is in the slave mode, and the target device connected to the interface 2 is in the master mode (computer host). Furthermore, the data sent by the master device (computer host) through interface 2 is forwarded by the networked device to the slave device (such as the USB flash drive) through interface 1. The data responded by the slave device (such as the USB flash drive) is sent through interface 1, and then forwarded by the networked device to the master device (computer host) through interface 2. Since the data of the computer host and the USB flash drive is controlled by the networked device, a scenario that the networked device serves as an intermediate control device is achieved. The server or the client can control data exchange instructions between the computer host and the USB flash drive. For example, in peer-to-peer communication mode, interface 1 of the networked device is the sending end (TX), and interface 1 is connected to a receiving end (RX) of the target device; Interface 2 of the networked device is the receiving end (RX), which is connected to a sending end (TX) of the target device. Interface 1 of the networked device sends data to the target device, and interface 2 receives data sent by the target device.
5. There is only one scenario, but the scenario is composed of multiple networked devices. Data can be divided and cooperatively operated among the multiple networked devices. For example, taking FIG. 5A as an example, a user selects Scenario A, which sets the interface 1 and physical communication interface 2 of networked device A and interface 1 and interface 2 of networked device B respectively, achieving division, cooperation, and collaboration between two networked devices and four interfaces.
6. Division, cooperation, and collaboration among multiple scenarios, as shown in FIG. 5B, involves data sharing, division, cooperation, and collaboration among multiple networked devices and multiple target devices under control of multiple scenarios.

Step S103, establishing a communication connection between the networked device and the target device to connect the networked device to the target device based on the loaded scenario configuration information.

In an embodiment of the present disclosure, the networked device establishes a handshake connection with the target device through an interface based on scenario configuration information. When the networked device is in the master mode, it identifies the type of the target device connected to the networked device (where the target device is a slave device) to load a driver (such as an instruction set) of the target device and further operates the target device. When the networked device is in the slave mode, it responds data such as descriptors to the target device based on instructions sent by the target device, which is used for the target device to load a driver of the networked device and further to operate the networked device.

In this step, the target device can be a computer device that serves as the master device, such as a laptop, a desktop computer, an embedded host, an industrial control device, an onboard device, a mobile terminal, and a physical server. The target device may also be an electronic device that serve as the slave device, such as a USB flash drive, a mobile hard drive, a hard drive, a flash device reader, a SD card, a TF card, and an external optical drive. When the target device serves as the master device, the networked device serves as the slave device to communicate and connect with the target device; When the target device acts as the slave device, the networked device serves as the master device to communicate and connect with the target device.

Optionally, when the preloaded target configuration information includes scenario configuration information for all application scenarios, based on the current application scenario selected by the user on the networked device, determine the target scenario configuration information corresponding to the current application scenario from multiple scenario configuration information; based on the target scenario configuration information, define device functions of the networked device and establish communication connections with the target device.

Optionally, when the preloaded target configuration information only includes scenario configuration information corresponding to the current application scenario, based on the scenario configuration information, define the device functions of the networked device and establish a communication connection with the target device.

Optionally, communication between the networked device and the target device can be established based on handshake communication. When the target device acts the master device and the networked device acts the slave device, the target device sends a handshake request to the networked device. In response to the handshake request, the networked device returns communication parameters (such as descriptors including device descriptors) in the target scenario configuration information to the target device to reach a handshake protocol and establish a communication connection. When the target device acts as a slave device and the networked device acts as a master device, the networked device initiates a handshake request. Optionally, during the process of reaching the handshake protocol, communication parameters can be verified through enumeration.

It should be noted that the embodiment defines the device type of the networked device to make it suitable for more application scenarios as a master device or a slave device, thus expanding application of the networked device. Communication data cannot pass through the computer host, which can effectively avoid being caught by the computer host and leaking real data sources and network communication data, and effectively avoid being cracked by malicious programs on the computer host, thus ensuring device security and data security of the networked device. When the networked device is sold or lost, the server can authorize or terminate the communication relationship with the networked device to further ensure data source security of the networked device.

It should be noted that the process of establishing a handshake connection between the networked device and the target device is essentially data exchange. The modes of the networked device (such as master mode, slave mode, and peer-to-peer communication mode) are different, and the way in which the networked device establish handshake connections with the target device is also different.

In an embodiment of the present disclosure, if the device role of the networked device is selected as the master mode (i.e. as the master device communicating with the target device), the networked device configures the functional instruction set in the descriptor instruction set configured for the master device to enumerate, such as acquisition instruction set, verification instruction set, configuration instruction set, interactive instruction set, data source instruction set, and customized instruction set, and configures data source configuration information to bind a data source used in the data exchange process between the networked device and the target device. The data source includes but not limited to storage media, storage space address ranges (such as sector address ranges), mirrored storage files, specific folders, databases, and data streams. If the device role of the networked device is selected as the slave role (i.e. as the slave device that communicates with the target device), the networked device configures descriptor parameters, device type parameters, and data source configuration information used to respond to the master device.

In some embodiments, based on the embodiment shown in FIG. 1, the step S102 includes:

Sending a configuration acquisition request to the server when communicating and connecting with the server. The configuration acquisition request carries identification information of the networked device; and Receiving target configuration information corresponding to the identification information returned by the server.

In an embodiment of the present disclosure, since there are multiple networked devices connected to the server simultaneously, the correspondence between the identification information of the networked devices and the target configuration information ensures that the networked device accurately obtain the target configuration information.

In an embodiment of the present disclosure, the identification information represents the identification information of the networked device, such as the device number of the networked device, the user name (or user number, user session ID) of the user to whom the networked device belongs, and etc. Optionally, establish a correspondence between the identification information and the target configuration information in advance, which can be fixed or changed at the factory of the networked device. It can be understood that all configuration information of the networked device can be accessed by the user on the server so that the user can configure the configuration information of the networked device on the user's page, hereinafter will not repeat.

In an embodiment of the present disclosure, the configuration acquisition request further carries current application scenario parameters of the networked device to accurately obtain the target scenario configuration information corresponding to the current application scenario parameters based on the identification information and current application scenario parameters.

It should be noted that when establishing communication connections between devices, the master device performs timeout determination (usually at millisecond or microsecond level) based on communication protocols (such as handshake protocols or control transmission protocols). Therefore, in order to ensure establishment of communication connections within the preset time, the functional instruction set and descriptor set are preloaded onto the networked device. It should be understood that in the process of data transmission between devices, the transmission protocol is a batch transmission protocol, an isochronous transmission protocol, or an interrupt transmission protocol, which allows a long timeout. Therefore, for data transmission during device interaction, there is no need to preload relevant data. In addition, in some scenarios with long timeout, the functional instruction set and the descriptor set can be obtained from the server in real-time.

In some embodiments, the networked device serves as a master device that communicates with the target device, and the descriptor instruction set includes multiple functional instruction sets used to control data exchange between the networked device and the target device.

On the basis of the embodiment shown in FIG. 1, the step S103 includes:

Enumerating multiple descriptors in the second descriptor set of the target device based on the functional instruction set in the descriptor instruction set;

Configuring the target data source when the networked device communicates with the target device if the enumeration is successful, the target data source is set on the target device; and Submitting obtained descriptor set to the server for recognition if the enumeration is unsuccessful, downloading corresponding descriptor set or functional instruction set from the server after being recognized by the server, and performing enumeration again.

In the present disclosure, the networked device acting as the master device needs to initiate a request, in order to make the networked device have functions of the master device, a developed driver (i.e. functional instruction set) is pre-set and stored on the server to protect security of the functional instruction set data of the networked device and prevent malicious use of device functions or data leakage or reverse cracking after loss of the networked device.

In some embodiments, the enumeration process includes:
Read the second descriptor set of the target device based on the acquisition instruction set;
Verify multiple descriptors in the second descriptor set based on the verification instruction set;
Determine that the enumeration is successful if multiple descriptors meet the preset device requirements.

In an embodiment of the present disclosure, if the networked device is in a master mode or a master role, it reads first equipment access configuration information from the scenario configuration information after the networked device is started and the scenario is selected. The networking device configures the interface of the networking device (such as the first interface or the second interface) to the master mode according to the first mode in the first equipment access configuration information. For example, the networking device configures communication protocol of the interface to the USB communication protocol according to the interface type. When the target device (slave device) sends an electrical signal that indicates enumeration (connection) can be performed, the networked device sends an enumeration request (establishing a handshake connection request) to the target device.

The networked device sends at least one data interaction instruction (such as sending a standard request to a default endpoint 0 of the target device) to the target device through a configured (default) interface in accordance with the communication protocol of the interface (such as USB communication protocol) according to standard instruction set (such as acquisition descriptor data instruction set), special instruction set (such as acquisition device type instruction set), and configuration instruction set in the first equipment access configuration information, and receive data returned by the target device. The networked device determines that the handshake connection is successful if the data returned by the target device meets access success criteria specified in a first access status judgment rule, and sends a successful connection packet to the server according to a first status response rule; determines that the handshake connection is failed if the data returned by the target device meets access fail criteria specified in the first access status judgment rule, and sends a failure connection packet to the server according to the first status response rule and requests a new instruction set data from the server to reconnect to the target device.

The following is an example of the equipment access method in an embodiment, using a scenario where the networked device reads and writes a USB drive. The step S101 includes: configuring the first equipment access configuration information. Specifically, configuring the first mode as the master mode; configuring the first interface type as USB interface; configuring one or more of the following standard instruction sets: acquisition hardware descriptor, acquisition configuration descriptors, acquisition interface descriptors, acquisition endpoint descriptors, acquisition string descriptor; configuring one or more of following special instruction sets: acquisition total number of formattable logical blocks and acquisition last logical block address; configuring one or more of following configuration instruction set: configuring device address, configuring device configuration (configuring enablement configuration), and configuring Bulk Only Mass Storage Restore command; configuring the first access status judgment rule to determine whether parameters including returned interface descriptor, endpoint descriptor data, and capacity information match parameters of a mass capacity device type, if they do not match the parameters of the mass capacity device type, connection is determined to be failed; if they match the parameters of the mass capacity device type, connection is determined to be successful; and configuring the first state response rule as follows: use the "second descriptor set" for reconnection (enumeration) if the connection is determined to be failed, and send the status data packet of access failure to the server If the reconnection still fails, and send the status data packet of access success to the server if the connection is determined to be successful.

The step S102 includes: preloading the first equipment access configuration information.

The step S103 includes: connecting the USB flash drive based on the first equipment access configuration information when the interface of the networked device detects there is a device is connected. Specifically, configuring the interface of the networking device to the master mode according to the first mode in the first equipment access configuration information; configuring the communication protocol of the interface to USB communication protocol according to the first interface type; configuring the communication address of the USB drive according to "Set Device Address"; getting descriptors of the USB drive based on at least one instruction of "Get Hardware Descriptor", "Get Configuration Descriptor", "Get Interface Descriptor", "Get Endpoint Descriptor", and "Get String Descriptor"; getting capacity information of the USB drive based on at least one instruction of "Get Total Number of Formattable Logical Blocks" and "Get Last Logical Block Address", enabling configurations of the USB drive according to "Set Device Configuration" command (such as enable an endpoint of the USB drive for response), and enabling mass storage function of the USB drive according to "Bulk Only Mass Storage Reset" command. Based on the descriptors of the USB drive, at least one of capacity information of the USB drive, endpoint information of the USB drive, and mass storage function of the USB drive, determine successful or failed connection status of the USB drive based on the first access status judgment rule. According to the first state response rule, use the second descriptor set for reconnection or reselect a preset alternative scenario to reconnect if it is determined that the connection is failed; send the status data packet of access failure to the server if the reconnection still fails; and send a successful connection status packet to the server if the connection is determined successful.

It should be noted that each step in the process of connecting the USB flash drive based on the first device configuration information is not one-to-one corresponded or is not necessary in actual implementation process.

In an optional embodiment, the descriptor set includes but not limited to device descriptors, configuration descriptors, interface descriptors, endpoint descriptors, string descriptors, BOS descriptors, and preset customized descriptors. The preset device requirements are protocol requirements specified in the communication protocol. By way of example, Table 1 below shows an example of descriptors got through descriptor instructions and configuring through setting instructions when the networked device is used as the master device. It should be understood that the get descriptor instructions and set instructions shown in Table 1 are only used as examples, and in other embodiments, more or fewer descriptors can be included, which will not be further elaborated here.

As an example, Table 1 below shows the descriptor instructions sent by the networked device as the master device or in the host mode.

TABLE 1

| Instruction type | descriptor instruction (master device) | descriptor description (from left to right) |
|---|---|---|
| Get device descriptor | 0x80 0x06 0x00 0x01 0x00 0x00 0x12 0x00 | 0x80 indicates a communication direction from the target device to the master device, the request is a standard request, the receipt of the request is the target device; 0x06 indicates instruction type of requested instruction is a get descriptor type; 0x00 and 0x01 indicates instruction parameters, where 01 indicates a device descriptor; 0x00 and 0x00 indicates language, default to 0; 0x12 and 0x00 indicate that the number of the descriptor bytes required to be transmitted is 12. |
| Get configuration descriptor | 0x80 0x06 0x00 0x02 0x00 0x00 0x20 0x00 | 0x80 indicates a communication direction from the target device to the master device, the request is a standard request, the receipt of the request is the target device; 0x06 indicates that instruction type of requested instruction is a get descriptor type; 0x00 and 0x02 indicates instruction parameters, where 02 indicates a configuration descriptor; 0x00 and 0x00 indicates language, default to 0; 0x20 and 0x00 indicates that the number of the descriptor bytes required to be transmitted is 20. |
| Get string descriptor | 0x80 0x06 0x00 0x03 0x00 0x00 0xFF 0x00 | 0x80 indicates a communication direction from the target device to the master device, the request is a standard request, the receipt of the request is the target device; 0x06 indicates instruction type of requested instruction is acquisition descriptor instruction; 0x00 and 0x03 indicates instruction parameters, where 03 indicates a string descriptor; 0x00 and 0x00 indicates language, default to 0; 0xFF and 0x00 indicates that the number of the descriptor bytes required to be transmitted is FF. |
| Set address instruction | 0x00 0x05 0x08 0x00 0x00 0x00 0x00 0x00 | 0x00 indicates a communication direction from the master device to the target device; 0x05 indicates setting address instruction; 0x08 indicates the master device configures bus address of the slave device. |
| Set configuration instruction (enable configuration | 0x00 0x09 0x01 0x00 0x00 0x00 0x00 0x00 | 0x00 indicates a communication direction from the master device to the target device; 0x09 indicates setting configuration instruction; 0x01 indicates setting the serial |

TABLE 1-continued

| Instruction type | descriptor instruction (master device) | descriptor description (from left to right) |
|---|---|---|
| instruction) | | number of configuration. |
| Get maximum number of logical units | 0xa1 0xfe 0x00 0x00 0x00 0x00 0x01 0x00 | Instructions for getting maximum number of logical units |

For example, the networked device reads following information from device descriptors, configuration descriptors, and string descriptors based on the descriptor instruction set: 1. manufacturer, identification information, and string; 2. Classes used for interfaces, such as mass storage class; 3. Transmission endpoint, such as endpoint 1 representing IN and endpoint 2 representing OUT; 4. Endpoint transmission mode, such as batch transmission mode. Based on the verification instruction set, verify whether the class, endpoint, and endpoint transmission mode used by the interface meet the application scenario requirements of the networked device. If it matches, it is determined that the enumeration was successful (or the handshake connection was established successfully). If it does not match, it is determined that the enumeration failed (or the handshake connection was failed) and the connection failure information is returned to the server.

Optionally, the functional instruction set further includes a configuration instruction set for sending configuration instructions to the target device. For example, the networked device sends a configuration instruction to a slave device, requiring the slave device to perform at least one of: enable at least one of corresponding endpoints, set bus addresses, and enable configurations. It should be noted that when the networked device is used as the master device, it allows connection of multiple slave devices and enumerating multiple slave devices.

It should be noted that in this embodiment, the networked device is used as the master device to communicate and connect with target device. For an unknown access device (target device), data such as descriptors sent by the target device can be obtained and submitted to the server for recognition, in order to download corresponding descriptor set or functional instruction set from the server, or to automatically select alternative scenarios, which can fully expand access capabilities of the networked device to cope with different types of target devices.

In some embodiments, the configuration process of the target data source includes:

Determine the target data source of the networked device based on the data source configuration information according to the data source instruction set.

In an optional embodiment, configure the data source instruction set of the networked device based on the application scenario of the networked device so as to operate the data source of the target device. For example, in the application scenario where the networked device is connected to a mass storage device, configure corresponding data source instruction set of the networked device so as to operate on data storage space of the target device. For example, in the application scenario of connecting the networked device to a keyboard device, configure corresponding data source instruction set of the networked device to read key value inputted by the keyboard. The interactive data for the networked device operating on the data source of the target device can be synchronized in real-time with the server, or can be filtered (or converted) through preset scripts or set rules before being synchronized with the server.

Optionally, for application scenarios where the networked device is connected to a mass storage device, the data source configuration information includes but not limited to capacity information of the data source. The capacity information includes the last logical block address of the data source, (the last logical block address+1)× Block capacity=capacity information; Total number of formatted logical blocks and block capacity (total number of formatted logical blocks)× Block capacity-capacity information. The data source configuration information further includes the maximum number of logical units, where the maximum number of logical units represents the number of partitions; and a read/write state (such as read-only state, write only state, readable and writable state).

For example, in the master mode, in the scenario of reading the slave device (such as reading a USB flash drive), before or after the networked device is powered on, set the networked device to a network read/write control device mode on the server or on the networked device locally. Specifically, it includes: powering on the networked device, inserting a USB flash drive, detecting a target equipment access through the interface of the networked device, enumerating through the preset descriptor instruction. If the enumeration is successful, get the device type, and send successful enumeration information (including the device type) to the server to establish a communication connection; If the enumeration fails, send the descriptor information that can be read by the networked device to the server, and request the server to send a new functional instruction set (such as getting descriptor instruction set or data exchange instruction set) or new scenario information, and re enumerate after receiving the new descriptor instruction or new scenario information. The server loads corresponding driver or operating software based on the device type. The driver or the operating software sends relevant instructions (data source instruction set) to the networked device through the server and performs calculations to get the maximum number of logical units, total space capacity, read/write status, available space capacity, relevant character strings, vendor ID, product ID, and etc. of the target device (such as a USB flash drive), to complete preparation for enumeration and operation. The server or the client performs read and write operations through software. Users can operate on the target device such as the USB drive through server software, client apps, web browsers, and other applications. For example, users can write files from the client to a USB drive, save files read from the USB drive to the client, read data from a specified sector position on the USB drive, or write data to a specified sector position on the USB drive.

It should be noted that for a scenario where data from storage device A needs to be copied to storage device B (or data from the server is downloaded to storage device A or B, or data from storage device A or B is uploaded to the server), current technology requires connecting storage device A and storage device B to a computer for data copy (or installing application software on the computer device to connect to the server for operation), Causing data leakage due to packet grabbing by the computer device during the data copying process. However, in this embodiment, using the networked device as the master device to communicate and connect with the target device can effectively solve aforementioned scenario problems. Due to a fact that this embodiment does not require use of the computer device (with an operating system) to prevent data from being stolen by malicious programs during the copying process; Upload data and store it directly on the server to prevent data loss or leakage caused by device loss; Directly connecting the network device to the server eliminates the need for network traffic data to pass through the computer device and the target device, thereby reducing possibility of being caught by the network data and ensuring data security.

In some embodiments, the networked device is in a network read/write control device scenario, which establishes a communication connection with the target device based on the target scenario descriptor information, including:

Enumerate multiple descriptors in the second descriptor set of the target device based on the functional instruction set in the descriptor instruction set; and Send a request to the server to issue a driver instruction set corresponding to the target device in order for communication connection if the enumeration is successful. The driver instruction set is used for data exchange with the target device.

In this embodiment, the driver instruction set is developed separately for different devices, including but not limited to interactive instruction sets and customized instruction sets. Please refer to relevant descriptions when the networked device is used as the master device for the enumeration process such as getting descriptors, which will not be repeated here.

In this embodiment, by requesting the server to issue the driver instruction set corresponding to the target device, the device type of the target device can be identified based on the second descriptor set of the target device. Therefore, the corresponding driver instruction set can be loaded from the server for target devices of different device types, which is used for data exchange between the networked device and the target device, achieving connection and data exchange of multiple device types.

It should be noted that for a network read and write control device, the target data source can be configured according to actual application needs, or it can be left unconfigured.

In some embodiments, the networked device is in a network proxy control device scenario, and the step S103 includes:

Enumerating multiple descriptors in the second descriptor set of the target device based on the functional instruction set in the descriptor instruction set; and Sending the second descriptor set to the server to virtualize the target device if the enumeration is successful, so as to generate a virtual device corresponding to the target device, and to establish a communication connection with the target device.

In this embodiment, the descriptor enumeration process can refer to relevant description of the networked device acting as the master device, and will not be repeated here. Optionally, the virtualization process can be executed internally on the server or by a computer front-end that controls the server. It should be noted that for a network proxy control device, the target data source can be configured according to actual application needs or can be left unconfigured.

As an example rather than a limitation, here are several application scenarios where the networked device acts as the master device:

1. The networked device acts as a remote controller. Using customized drivers for direct control programs on the server without a need to virtualize the USB device (it should be understood that the USB device can also be virtualized). Develop driver programs for control through customizing drivers, that is, do not use the universal drivers of the operating system, and self-develop them.

For example, a network read and write control device acting as a host role (which can perform protocol conversion based on customized interaction instructions and scripts), reads and writes handshake protocol data (such as descriptor sets) of interface devices such as USB interface, HDMI interface, SCSI interface, IEEE1394 interface, SATA interface, eMMC interface, SDIO interface, M.2 interface, serial communication interface, and etc., to enumerate the target device based on above-mentioned enumeration process, thus establishing a communication connection between the network read/write control device and the storage device. Based on the driver instruction set installed on the server for read and write operations, interactive instructions are sent to the network read and write control device through control of the server by the client or through preset instructions from the server. The network read and write control device converts the interactive instructions and sends them to the storage device to write data from the server to the storage device or upload data from the storage device to the server.

Similarly, the network read and write control device further can establish a communication connection with a sensor device such as a camera and a microphone, and read the data collected by sensor device to upload to the server. They further can control the direction and angle of the camera or control the microphone to adjust power according to control commands (i.e. commands in the customized command set) sent by the server.

2. As a network proxy control device, by taking the networked device as a proxy device and together with local drivers, the target device is virtualized into a local USB device through software (such as registering got descriptor and other information on the USB bus), so that the server or the computer front-end controlling the server may identify the target device as a local USB device. Therefore, without developing the driver program again, the target device can be recognized and normally used. Optionally, in a case where the master device is connected to multiple target devices simultaneously, it supports network mapping all target device to the computer front-end or the server to virtualize the target device as a local USB device on the computer front-end or the server.

It should be noted that data implementation in existing technologies is: USB device-computer host 1-network sharing-computer host 2-virtual USB device, which has the following problems: 1. The data needs to pass through computer host 1, and computer host 1 has unknown risks; 2. Data passing through computer host 1 is prone to packet capture, resulting in exposure of data source addresses and data interaction logic, posing a security risk; 3. Computer host 1 is generally in a form of a PC, personal laptop, and etc., and requires installation of an operating system and software; 4. The above data is implemented in pure software form. The network proxy control device of the present disclosure can be in a form of independent hardware, which can reduce security risks without passing through a computer host.

For example, the networked device uses a USB interface as the master device interface, reads a basic descriptor set from a connected printer (target device), and enumerates the target device based on the above-mentioned enumeration process. After successful enumeration, the networked device sends the printer's descriptor set to the server. The server generates a virtual USB device on the local computer based on the received descriptor set by virtualizing bus or other methods. The local driver program (i.e. functional instruction set) of the printer remotely controls the mapped printer for printing by operating the virtual USB device. The communication relationship is: server (printer driver-virtual USB device)-networked USB device (master device)-printer. In other embodiments, the server can be controlled by the front-end of the computer to visualize the virtualization process of the server, as well as the data to be printed and printing progress of the printer, which will not elaborate here.

It can be understood that after the networked device is inserted into the printer on site, the remote server connected to the networked device directly recognizes the printer using the local printer driver to control the printer for printing, thereby avoiding data leakage due to important files from being copied to computers with unknown risks.

It can be understood that the above application scenarios are only used as examples rather than limitations. In other scenarios, they can be a combination of multiple application scenarios, such as developing and implementing scenarios 1 and 2 simultaneously, which will not be elaborated here.

In some embodiments, based on the embodiment shown in FIG. 1, the networked device serves as a slave device in communication with the target device, and the step S103 includes:

Receiving enumeration requests sent by the target device; and

Returning the first descriptor set to the target device in response to the enumeration request, to enable the target device to enumerate the first descriptor set. After successful enumeration, the target data source for communication between the networked device and the target device is configured based on the data source configuration information, and the target data source is set on the server.

In this embodiment, similar to the communication connection process where the networked device is used as a master device, when the networked device in this embodiment is used as a slave device, the target device serves as the initiator of the enumeration request, and the networked device serves as the responder of the enumeration request. The target device executes the enumeration action which is performed by the networked device acting as the master device, and the networked device responds to the enumeration action of the target device. When the networked device is used as the slave device, it supports connecting multiple master devices and responding to enumeration requests from the multiple master devices. The specific enumeration process can be seen in the embodiments when a networked device is used as a master device, which will not be repeated here.

In an embodiment of the present disclosure, if the networked device is in the slave mode, the second equipment access configuration information is read from the scenario configuration information after the networked device selects the scenario. The networked device configures the interface of the networking device (such as the first interface or the second interface) to the slave mode according to the first mode in the second equipment access configuration information; and configures the communication protocol of the interface to USB communication protocol based on the interface type. When the target device (master device) is connected, it responds and sends electrical signals that indication enumeration (connection) can be performed.

The networked device receives data interaction instructions sent by the target device through a set (or default) interface (for example, the target device sends a standard request to endpoint 0 of the networked device). When the data interaction instructions comply with data corresponding to at least one of the standard dataset (such as getting descriptor dataset), special dataset (such as device type dataset), execution setting instruction set, the second access status judgment rules, and the second status response rule in the second equipment access configuration information or meets matching rules, the networked device return data to the target device. When data exchange instructions include data content in the execution setting instruction set, the networked device performs preset operations. When the data sent by the networked device meets the access success criteria specified in the second access status judgment rule, the networked device determines that the handshake connection has been established successfully, and sends a successful connection packet to the server according to the first status response rule. When the data returned by the target device meets the access failure criteria specified in the first access status judgment rule, the networked device determines that the handshake connection is failed, sends the connection failure packet to the server and requests new descriptor data from the server to reconnect to the target device according to the first status response rule.

The following will illustrate the equipment access method in this embodiment using a USB flash drive scenario as an example.

The step S101 includes: configuring the second equipment access configuration information. Specifically, configuring the second mode as slave mode; configuring the second interface type as USB interface, and configuring one or more of the following standard data sets: the first hardware descriptor, the second hardware descriptor, the first descriptor, the second descriptor, the first interface descriptor, the second interface descriptor, the first endpoint descriptor, the second endpoint descriptor, the first string descriptor, the second string descriptor; configuring one or more of the following special datasets: total number of formatted logical blocks, last logical block address, maximum number of logical units, read/write status, and etc.; configuring one or more of the following execution setting instructions: execute setting device address, execute setting device configuration, and execute Bulk Only Mass Storage Reset instruction; configuring the second access status judgement rule to: determine whether the instructions sent by the networked device to get the first hardware descriptor, get the first configuration descriptor, get the first interface descriptor, get the first endpoint descriptor, get the first string descriptor, get the total number of formattable logical blocks, get the last logical block address, and to get instructions read/write status meet the parameters for reading a mass storage device type. If they do not meet the parameters for reading the mass storage device type, it is determined that the connection is failed; if they do not meet the parameters for reading the mass storage device type, it is determined that the connection is successful, set the second state response rule to: if the connection is failed, use the second hardware descriptor, second configuration descriptor, second interface descriptor, second endpoint descriptor, and second string descriptor in the descriptor set for reconnection (enumeration). If the reconnection is failed, send access failure status data packet to the server; If the connection is successful, send a successful connection status packet to the server.

The step S102 includes preloading the second equipment access configuration information.

The step S103 includes: connecting the networked device (USB flash drive scenario) to the target device based on the second equipment access configuration information. Specifically, sending an electrical signal indicating enumeration can be performed to the target device through the interface; receiving the data interaction instruction returned by the target device in response to the electrical signal; configuring the interface of the networked device to the slave mode according to the second mode in the second equipment access configuration information; configuring the communication protocol of the interface to USB communication protocol according to the second interface type; configuring the device address according to the execution, and configuring the USB communication address of the networked device according to the execution setting device address; responding to at least one of the instructions such as getting the first hardware descriptor instruction, getting the first configuration descriptor instruction, getting the first interface descriptor instruction, getting the first endpoint descriptor instruction, and getting the first string descriptor instruction; enabling the endpoints and functions corresponding to the interfaces of the networked device according to the execution setting device configuration instructions; performing a functional self-check of the mass storage device based on the execution of Bulk Only Mass Storage Reset instructions, and returning an execution status packet; determining whether the instructions such as getting the first hardware descriptor instruction, getting the first configuration descriptor instruction, getting the first interface descriptor instruction, getting the first endpoint descriptor instruction, getting the first string descriptor instruction, getting the total number of formattable logical blocks instruction, getting the last logical block address instruction, and getting read/write status instruction comply with the instructions of the mass capacity device type according to the second access status judgment rule; determining that the connection is failed if the instructions do not comply; determine that the connection is successful if the instructions comply; using the second hardware descriptor, second configuration descriptor, second interface descriptor, second endpoint descriptor, and second string descriptor in the descriptor set to reconnect if the connection is failed; sending access failure status data packet to the server, or switch to alternative scenarios such as camera scenarios; and sending access success status information to the server if the connection is successful.

As an example, Table 2 below shows the descriptors that are responded by the networked device as the slave device or in the slave mode.

TABLE 2

| Descriptor type | Responded descriptor (slave device) | descriptor description (from left to right) |
|---|---|---|
| Device descriptor | 0x12 0x01 0x00 0x02 0x00 0x00 0x00 0x40 0xff 0xff 0x78 0x56 0x00 0x02 0x01 0x02 0x03 0x01 | 0x12 represents a length of the descriptor; 0x01 represents device descriptor; 0x00 and 0x02 represents version of USB protocol; 0x00 represents class number; 0x00 represents sub-class number; 0x00 represents protocol used by the device; 0x40 represents maximum length of packet at endpoint 0; 0xff and 0xff represents Vendor ID; 0x78 and 0x56 represents product ID; 0x00 and 0x02 represents version of the device; 0x01 represents index of manufacture string; 0x02 represents index of product string; 0x03 represents index of product serial number string; 0x01 represents possible number of configuration. |
| Configuration descriptor | 0x09 0x02 0x20 0x00 0x01 0x01 0x00 0x80 0x32 0x09 0x04 0x00 0x00 0x02 0x08 0x06 0x50 0x00 0x07 0x05 0x81 0x02 0x00 0x02 0x00 0x07 0x05 0x02 0x02 0x00 0x02 0x00 | 0x09 represents a length of the descriptor; 0x02 represents configuration descriptor; 0x20 and 0x00 represents total length of configuration descriptor set; 0x01 represents the number of the configuration; 0x01 represents value of the configuration; 0x00 represents index of string of the configuration; 0x80 represents attribute of the device; 0x32 represents current needed; 0x09 represents a length of the descriptor; 0x04 represents interface descriptor; 0x00 represents number of the interface (start from 0); 0x00 represents alternative number of the interface; 0x02 represents number of endpoints used by the interface; 0x08 represents class used by the interface; 0x06 represents sub-class used by the interface; 0x50 represents protocol used by the interface; 0x00 represents index of string of the interface; 0x07 represents a length of the descriptor; 0x05 represents endpoint descriptor; 0x81 represents address and transmission direction of the endpoint; 0x02 represents attribute of the endpoint; 0x00 and 0x02 |

TABLE 2-continued

| Descriptor type | Responded descriptor (slave device) | descriptor description (from left to right) |
|---|---|---|
| | | represents maximum packet length supported by the endpoint; 0x00 represents access time of the endpoint; 0x07 represents a length of the descriptor; 0x05 represents endpoint descriptor; 0x02 represents address and transmission direction of the endpoint; 0x02 represents attribute of the endpoint; 0x00 and 0x02 represents maximum packet length supported by the endpoint; 0x00 represents access time of the endpoint; |
| String descriptor | 0x12 0x03 0x55 0x00 0x53 0x00 0x42 0x00 0x20 0x00 0x44 0x00 0x49 0x00 0x53 0x00 0x4b 0x00 | 0x12 represents a length of descriptor; 0x03 represents string descriptor; 0x55 0x00 0x53 0x00 0x42 0x00 0x20 0x00 0x44 0x00 0x49 0x00 0x53 0x00 0x4b 0x00 represents string data; decoded string is "USBDISK" |
| Configure related status | (optinal) | In general, responding only blank packet represents configuration is completed. |
| MAXLUN maximum logical units | 0x00 | maximum number of logical units. 0x00 represents only one logical unit |

In some embodiments, the target device includes at least one first target device and at least one second target device. The networked device serves as a master device in communication with the first target device and serves as a slave device in communication with the second target device. Establishing a communication connection with the target device based on the target scenario descriptor information, including:

Enumerating multiple descriptors in the second descriptor set of the first target device based on the functional instruction set in the descriptor instruction set;

Configuring a first target data source when the networked device communicates with the first target device to complete the communication connection with the first target device if the enumeration is successful. The first target data source is set on the first target device.

Receiving an enumeration request sent by the second target device;

Returning the first descriptor set in response to the enumeration request, to enable the second target device to enumerate the first descriptor set, and configuring a second target data source for communication between the networked device and the second target device based on data source configuration information after successful enumeration. The second target data source is located on the server or the first target device.

In this embodiment, the descriptor enumeration process and the configuration process of the target data source can refer to relevant descriptions when the networked device is used as a master or slave device, which will not be repeated here. The networked device in this embodiment has at least two physical interfaces, which act as "master device+slave device" and simultaneously. The networked device gets the second descriptor set of the first target device (slave) to complete enumeration of the first target device; When the networked device initiates an enumeration request on the second target device (master), it forwards the first descriptor set to the second target device to complete the enumeration in the second target device, in order to achieve multi-device interaction between the first target device, the networked device (and the server), and the second target device.

Optionally, the networked device can also directly forward the descriptor instructions sent by the second target device to the first target device, and directly forward response data of the first target device to the second target device to complete enumeration.

Optionally, the server logs the data exchange between the first and second target devices for auditing purposes; In the case of data exchange, the networked device or server can also perform operations like modify and replace on data to protect data security of the first and second target devices.

As an example rather than a limitation, the networked device serves as a network USB hub (such as USBHUB), and this embodiment can monitor the first target device connected, and detect descriptor parameters and communication data. Specifically, when the first target device is connected to the networked device, the descriptor set of the first target device (such as vendor ID, product ID, or device type (used class, subclass, interface command set, endpoint transmission mode) is uploaded to the server, and only when the server determines the vendor ID, device ID, or device type of the first target device is qualified, the first target device is allowed to exchange data with the networked device or the second target device.

Optionally, if the networked device as a slave device of a mass storage device, the data source configuration information includes but not limited to capacity information of the data source. The capacity information includes the last logical block address and block capacity of the data source, (the last logical block address+1)× Block capacity=capacity information. The data source configuration information includes data source configuration information further includes the maximum number of logical units, where the maximum number of logical units represents the number of partitions. In another embodiment of the present disclosure, the capacity information includes the total number of formattable logical blocks and block capacity of the data source, (total number of formattable logical blocks)× Block capacity=capacity information.

It should be noted that a current access device is a storage device with single function or an external device, and when used as storage devices, data can only be stored locally on the storage device. Its storage capacity is limited by hardware, and the data storage space can be easily recognized by a computer device, posing a risk of data capture. In this embodiment, the networked device is used as a slave device to communicate and connect with the target device. Based on scenario switching, multiple different function of a device can be achieved, and the risks of limited storage capacity and easy identification of data storage space can be effectively solved, improving security of data sources.

As an example rather than a limitation, the following provides several application scenarios for the networked device as a slave device.

1. The networked device acts as a network USB drive or other storage media. The networked device is configured to be in USB flash drive form (such as mass storage device type, batch transmission endpoint, etc.), or SD card form, TF card form, or hard disk form. The computer host obtains the descriptor set of the networked device and enumerates the descriptor set to establish a communication connection between the networked device and the computer host. In one embodiment, the computer host sends read or write instructions to the networked device, and the networked device sends read or write instructions to the server, the client, or the control end. The following will be explained using only the server as an example. The networked device establishes an association relationship with the computer hosts based on mirror files (such as disk mirror files of partition.dd or disk mirror files of partition.ISO) established on the server, the client, or the control end to read or write the target data source of the networked device. In the scenario of data writing, when the computer host writes interactive data to a network USB drive, a network SD card, a network TF card, or a network hard drive, the network USB drive, the network SD card, the network TF card, or the network hard drive uploads the interactive data to the server, and the server writes the interactive data to a specified offset position of the mirror file. In the scenario of reading, the data at the specified offset position of the mirror file is read out on the server and returned to the computer host.

It should be noted that the data of the mirrored file is stored in storage space in order. For example, according to parsing of the file system, the mirror file A.dd is assigned a sector area of 0x1000 to 0x1007 sector addresses. In addition, the size of the sector area of 0x1000 to 0x1007 sector addresses of the mirror file is only an example, and the sector area of an actual storage medium may be larger than aforementioned sector area.

Taking a FAT32 file system as an example, the file information of the mirror file contains a first cluster address. The FAT32 file system can find all cluster addresses based on the first cluster address and FAT (File Allocation Table), and convert them to all sector addresses. For example, converting the A.dd file to sectors 0x1000 to 0x1007 mentioned above. A specified offset represents an offset of an operation address of the mirror file corresponding to a read/write instruction. For example, using the aforementioned mirror file A.dd as the data source, if a sector address (i.e. the specified offset) read/wrote by the target device is 0, the sector address read/wrote by the target device is converted to the 0 sector address (first sector address) of the mirror file A.dd, which is 0x1000. If the sector address read/wrote by the target device is 1, it is converted to the (0+1) sector address of the mirror file A.dd, and so on. It maps a specified offset to a specific sector address. Different data sources correspond to different sector addresses. For example, the sectors stored in mirror file A.dd are sectors 0x1000 to 0x1007, while the sectors stored in mirror file B.dd are sectors 0x2000 to 0x2007. If you switch the data source from the mirror file A.dd to the mirror file B.dd, you only need to convert the address of the read and write operations to sectors 0x2000 to 0x2007. Due to different sector addresses corresponding to different data sources, the data source can be changed by changing sector addresses, which can achieve data source switching. Alternatively, different data sources can be directly physically isolated by using different physical storage media.

TABLE 3

| | Bit of byte | | | | | | | | | | |
|---|---|---|---|---|---|---|---|---|---|---|---|
| 0-7 | 8-10 | 11 | 12 | 13-15 | 16-17 | 18-19 | 20-21 | 22-23 | 24-25 | 26-27 | 28-31 |
| | | | | | Parameter | | | | | | |
| File name | File extension | reserved | File attribute | Create time | Create date | Last access date | Starting cluster high byte | Last-modified time | Last-modified date | starting cluster low byte | File size |
| Exemplary data 0x  41 20 20 20 20 20 20 20 | 54 58 54 | 20 | 10 | a4 0a b4 | a8 56 | a8 56 | 00 00 | c8 b3 | a8 56 | 1d 00 | 06 00 00 00 |

Referring to Table 3, taking the FAT32 file system as an example (A.txt file information, mirror file information is the same): the starting cluster number is 0x1d, and based on calculation of the file system, the first sector (starting sector) address can be got; In the FAT table, corresponding cluster chains can be got and calculated based on the cluster chains to get a sector address set for file content data. The data in the sector address set is the content data of the A.txt file, such as binary data 123456 string. If it is a mirror file, it is corresponding sector data.

It can be understood that the capacity information (including the last logical block address, total formattable block capacity, block capacity, total space capacity, available space capacity, maximum number of logical units), read/write status (such as read-only status, write only status, read/write status, and etc.), relevant strings, vendor ID, product ID, and etc. of different data sources can also be different. So, although the device types in multiple different scenarios are consistent (like USB flash drives for mass storage devices), switching between different data source configurations and data sources actually modifies the device's functionality.

In addition, the networked device can directly manage storage space area (sector address area) without using files when interacting with a computer host. For example, the sector area 0x1000 to 0x1007 mentioned above are the sector area assigned to a USB drive (such as the first USB drive), and sectors 0x2000 to 0x2007 are the sector area assigned to another USB drive (the second USB drive).

For a USB drive (USB interface), a SD card (interface such as emmc), a TF card (interface such as emmc), or a hard drive (interface such as SATA or M.2), essentially only the data source (sector address) or capacity information (optional) is different. The networked device actually serves as a remote mapper for read/write instructions (converting data from the server to a USB drive with a USB interface, a SD card or a TF card with an eMMC interface or a SDIO interface, or a hard drive with a SATA interface or a M.2 interface hard drive, etc.).

In an embodiment of the present disclosure, the data source includes but not limited to storage media, storage space address area (such as sector address area), mirrored storage files, specific folders, databases, and data streams. A specific file is a file that is pre-selected by the user to allow a computer device to read and write, and can be displayed to the user on the computer device. Mapping a specific file to a target address refers to mapping the sector address of the specific file in a storage device to the target address. Mirror files as a storage data source can be connected to the computer host. The networked device communicates with the server through wired or wireless means, and the server contains multiple mirror files. Optionally, based on distributed storage technology, optimized storage, and CDN network acceleration, the mirror file can be data from a database, or a combination, concatenation, and mapping of multiple files.

In an embodiment of the present disclosure, the networked device connects to the server and sends an identification number to the server. The server associates corresponding mirror file with the identification number of the networked device. The networked device forwards read and write requirements of the data interaction instruction to the server when the computer host sends a data interaction instruction (such as read or write operations, the address of the sector where the operation starts, and the length of the operation sector). After the server receives the read and write requirements sent by the networked device, it returns sector file data block address corresponding to the mirror file to achieve data space expansion for the networked device. In an embodiment of the present disclosure, based on the identification number of the networked device, the target mirror file corresponding to the networked device is switched and controlled on the server to connect the target mirror file to the computer host. For example, bind mirror files "Partition 1. dd", "Partition 2. dd", and "Partition 3. dd" based on the identification number of the networked device (or the user's identification number (bound through account login) to switch the data source of the computer host in these three mirror files.

In an embodiment of the present disclosure, the target device connects to the server and connects the mirror file of "partition 1. dd" stored on the server to the computer host. The computer host sends data interaction instructions in a single sector size of 512 bytes. If the data interaction instruction is used to read data from the address of the 0th sector and write data to the address of the $1^{st}$ sector, a request is sent to the server through the networked device. The server converts $0^{th}$ sector to the first address of "partition 1. dd" and converts $1^{st}$ sector to the 512th byte offset address of "partition 1. dd". The server returns 0-511 bytes of data from the first address of the mirror file "partition 1. dd" based on the converted address; write data to 511 bytes following the $512^{th}$ byte of "partition 1. dd" as the offset address. And then the networked device will return the result returned by the server to the computer host. The above-mentioned single sector size of 512 bytes is only an example and not a limitation on the embodiments of the present disclosure. For example, the single sector size can also be 1024, 2048, 4096 bytes, and etc.

In an embodiment of the present disclosure, the networked device can freely switch between different storage data sources without the need to install software tools (such as through the operating system's built-in USB drive) on the computer host. The true address of the data source is not visible to the computer host, and the data source is saved in the cloud. When the networked device is lost, the data source can be remotely cancelled, which improves data security of the data storage device. At the same time, in this embodiment, the networked device directly reads and writes specific offset address data (or sector address data corresponding to the file) of the associated file on the server, and forwards the data directly to the server or the computer host in a forwarding manner, thereby not being limited by the storage space of the storage device itself, improving efficiency and expanding applicable scenarios.

The embodiment of the present disclosure is different from the existing network USB drive. The related technology is to first download files of the server to the network USB drive storage device, and then read the files of the storage device's file system through a computer for download; Alternatively, the computer first writes the files to the file system of the storage device on the USB drive, and then uploads them to the server through the network USB drive. In this case, it needs to occupy the capacity of the network USB drive's own storage space. For example, a 16 GB network USB drive cannot transfer 32 GB of files, or a network USB drive with less than 4G of remaining space cannot transfer files larger than 4G. The present disclosure forwards data in a buffer (such as using a single sector 512 bytes as the buffer), without the problem of file size restrictions. On the other hand, it is not possible to switch the data of the entire storage partition in related technologies. In the present disclosure, reading and writing are based on sector address, partition 1. dd can be formatted as a FAT32 file system, with files such as A.txt and B.txt; Partition 2. dd can be formatted as an ExFAT file system, with files such as C.txt and D.txt, and can be directly connected to the computer for display. However, existing network USB drives can only select specific files for copying. In addition, the mapped mirror files such as "partition 1. dd" on the server can be database data or the combination, concatenation, mapping, and etc. of multiple files based on distributed storage technology, optimized storage, and CDN network acceleration.

In an embodiment of the present disclosure, if the networked device is an SD card or a TF card, the networked device can send or receive data packets through the Emmc interface or SDIO interface and corresponding communication protocols. For example, sending read/write instructions through SDIO_CMD line, and sending or receiving data packet through SDIO_D-line.

In an embodiment of the present disclosure, if the networked device is a hard disk, the networked device can send or receive data packets through the SATA interface or M.2 interface and corresponding communication protocols.

2. The networked device serves as a network USBkey device (such as a bank U-shield, a digital certificate, a dongle, and etc.). The networked device is set to in a USBkey mode and is connected to the computer host. The internal components of the network USBkey device include: 1. PIN password (password input by the user or data collected and converted by sensors), 2. algorithm, and 3. key. For PIN passwords, it can be input by users or collected and converted by sensors and then sent to the server for PIN verification through networking; For algorithms, they can be remotely downloaded from the server through scripts, that is, they can be updated or selected at any time; For keys, the key or its constituent parts (such as a combination of local and server encryption) can be stored on the server to improve security. Optionally, during the interaction process of the networked device and the server, the server performs log recording and behavior analysis, timely blocking suspicious behavior and warning, to prevent abuse of the USBkey device.

It should be noted that 1. USBkey itself does not store important data, such as PIN, algorithm, and key. Its important data is downloaded from the server to USBkey's memory during operation, and is eliminated after USBkey being power off to improve security; 2. Every time a user uses the USBkey, the server can record usage logs to prevent abuse. For example, the technology of virtualizing USB devices can share USB key data across multiple computers; 3. For lost USB keys, they can be remotely locked to prevent theft. 4. It is possible to install satellite positioning modules such as GPS and Beidou. When a request is sent to the server, a geographical location of the USBkey can be submitted. Only when a preset geographical location condition is met, can the USBkey be used. 5. The data source of USBkey is stored on the server, and the network communication link don't need to pass through the computer host, which ensure the data security of the data source. 5. For USBKEY password, it can be remotely verified through the client or the server only when the USBKEY is used.

3. The networked device serves as an intermediate device (such as a storage device with networking capabilities). The computer host sends read and write interactive instructions to the intermediate device, such as sending read instructions to read address 0 data with a data length of 512 bytes; sending write instructions to write address 1 data, write data as 0x1212 . . . (512 bytes), write data length of 512 bytes. After the intermediate device receives the read and write instructions, it calculates based on the address, number of bytes in a single sector (such as 512 bytes), and data length to convert the sector address of the data interaction instruction operation into an address corresponding to the server data (or the server converts it according to preset rules based on forwarded data interaction instruction), for example, to read and write the data in the U.dd file of the server. For example, address 0 is converted to the sector 0 address of the server's U.dd file data, and address 1 is converted to the sector 1 address of the server's U.dd file data. After conversion, operations are performed on the server's U.dd file data, such as returning data from the server's U.dd file data address 0 and writing data 0x1212 . . . (512 bytes) to the service's U.dd file data sector address 1.

It can be understood that above-mentioned application scenarios are only used as examples and not limited. In other scenarios, they can be in other hardware forms, such as keyboards and other input devices, which will not be elaborated here.

Figure 6:
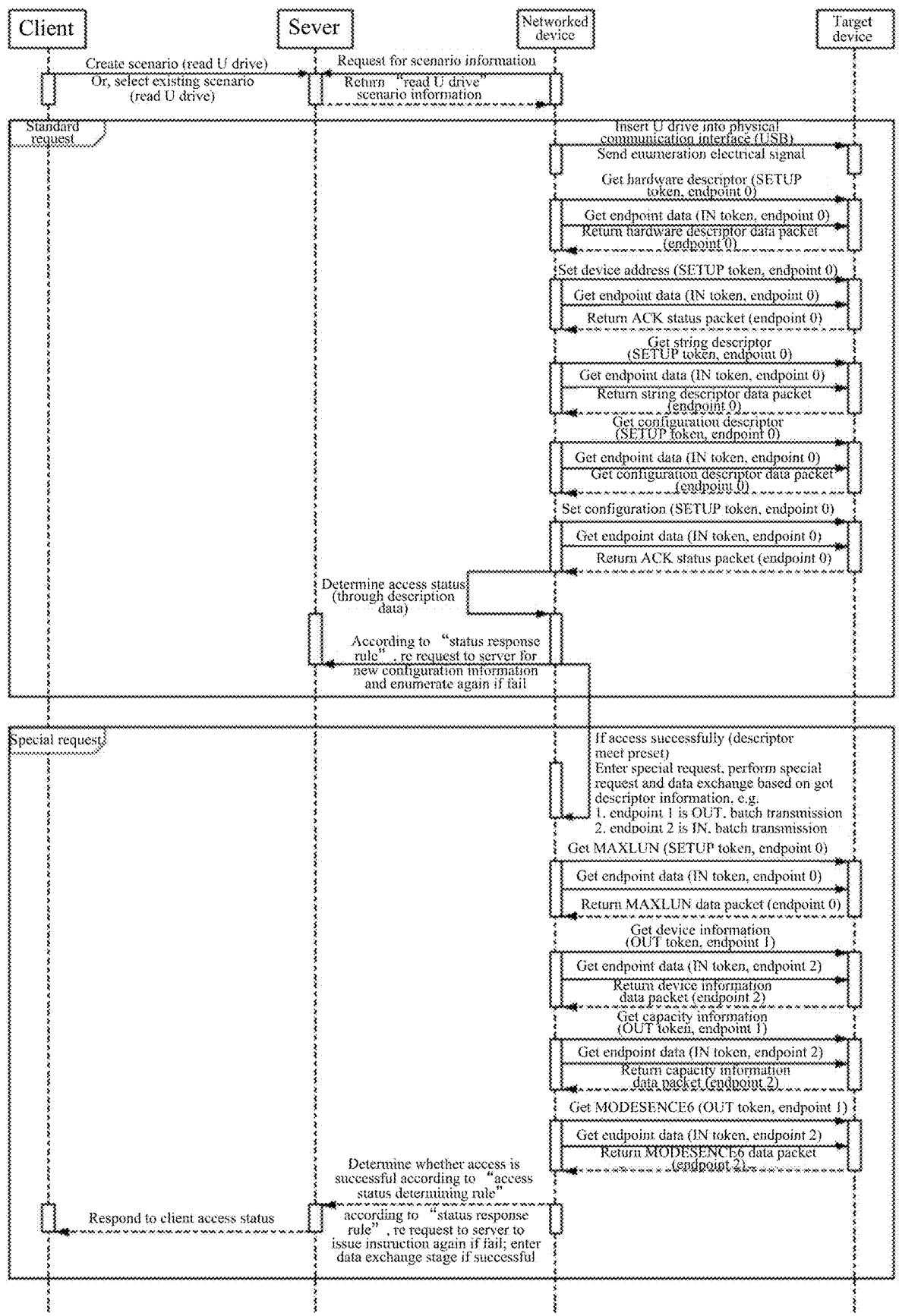
FIG. 6 is a schematic view of a flow chart of an equipment access method according to another embodiment of the present disclosure.

Referring to FIG. 6, it is a flowchart of an equipment access method provided in an embodiment of the present disclosure, wherein the communication between the networked device and the slave device adopts a USB communication protocol, and the equipment access method in the present embodiment is explained by reading the slave device data (using a USB drive as an example) through a USB interface through the networked device (master mode). It should be noted that this embodiment and related data are not limited, for example, other target devices (slave devices) can be other device types such as USB cameras, which will not be repeated here.

The client creates through the server (or stored) scenario configuration information for "read USB flash drive scenarios", or selects existing scenario configuration information for "read USB flash drive scenarios". When a networked device requests from the server, the server sends the configuration information corresponding to the "read USB flash drive scenario" to the networked device.

In another embodiment of present disclosure, scenario configuration information can also be created on the server. The networked device sends a configuration acquisition request to the server, and the server reads the scenario configuration information corresponding to the read USB drive scenario from the server based on the configuration acquisition request, and sends obtained scenario configuration information corresponding to the read USB drive scenario to the networked device.

After the target device (i.e. USB flash drive) is inserted into the interface of the networked device, the USB flash drive sends an enumeration request (such as an electrical signal indicating enumeration can be performed) to the networked device. The networked device sends a hardware descriptor instruction to the USB drive and an IN token packet to a specific endpoint of the USB drive for query data to return. For example, the networked device sends a hardware descriptor instruction to endpoint 0 of the USB drive through the SETUP token packet.

It should be noted that in this embodiment, the networked device, as the master device, actively sends data interaction instructions to the slave (such as the USB flash drive), and the slave device responds passively based on the data interaction instructions. For example, taking USB communication rules as an example, if the networked device sends a token packet (or token packet+data packet) to an endpoint of the slave device, the slave device responds based on the token packet (or token packet+data packet) received by the endpoint (such as respond a data packet or a status packet to the master device). If the networked device serves as a slave device, it receives the token packet (or token packet+data packet) sent by the master device and responds based on the received token packet (or token packet+data packet). The token packet includes but not limited to at least one of a SETUP token packet, an IN token packet, an OUT token packet, a PING token packet, and a SOF token packet. The status package includes but not limited to at least one of ACK, NAK, NYET, and STALL status packages. The handshake package includes a token package and a status package.

Table 4 shows a parameter table of an instruction format for the SETUP token packet, where 0x in the present disclosure represents a hexadecimal encoding value.

TABLE 4

| SETUP | ADDR | ENDP | DATA0 | DATA (8 bytes) | ACK |
|---|---|---|---|---|---|
| 0x2D | 0x25 | 0x00 | 0xC3 | 0x80 06 00 01 00 00 12 00 | |

Referring to Table 4, in an embodiment of the present disclosure, the instruction format for the SETUP token packet includes a first instruction type field (SETUP), a first address field (ADDR), a first endpoint field (ENDP), a first data field (DATA) and a first status field (ACK or NAK). The first instruction type field is configured to record the SETUP instruction identifier to indicate that the first instruction type is a SETUP token packet, and 0x2D represents the identifier value. The first address field is configured to record address information of the receiver (i.e. USB drive) of the SETUP token packet, for example, recorded USB bus address information of the USB drive is 0x25. The first endpoint field is configured to record endpoint information of the receiver of the SETUP token packet, for example, the endpoint information of the recorded USB flash drive is 0x00. The first data field (DATA) is configured to record packet data of the SETUP token packet, for example, the data in the DTAT field is the instruction to get the device descriptor. The first status field is configured to record the status of the receiver (i.e. USB flash drive) of the SETUP token packet. The status field include ACK status packets and NAK status packets, where the ACK status packet represents a successful status of the recipient and the NAK status packet represents a failed status of the recipient.

Referring to Tables 5 and 6, in an embodiment of the present disclosure, the networked device receives the ACK status packet sent by the USB flash drive in response to the SETUP token packet and continues to send the IN token packet to the USB flash drive. The USB drive returns the hardware descriptor data packet of the USB drive to the networked device based on the IN token packet.

It should be noted that if the networked device sends an IN token packet to a specific endpoint of the slave device (USB flash drive) and receives a NAK status packet (0x5A) returned by the USB flash drive, it indicates that the slave device (USB flash drive) cannot provide data, as shown in Table 5. The networked device repeatedly sends (within the timeout) the IN token packet to the USB drive until the USB drive returns the first ACK status packet, as shown in Table 6. it will not be repeated here.

TABLE 5

| IN | ADDR | ENDP | NAK |
|---|---|---|---|
| 0x69 | 0x25 | 0x00 | 0x5A |

TABLE 6

| IN | ADDR | ENDP | DATA1 | DATA (18 bytes) | ACK |
|---|---|---|---|---|---|
| 0x69 | 0x25 | 0x00 | 0x4B | 0x12 01 00 02 00 00 00 40 ff ff 78 56 00 02 01 02 03 01 | 0xD2 |

Referring to Table 6, in an embodiment of the present disclosure, the instruction format of the IN token packet includes a second instruction type field (IN), a second address field (ADDR), a second endpoint field (ENDP), a second data field (DATA), and a second status field (ACK or NAK, etc.). The second instruction type field is configured to record the IN instruction identifier, which can take a value of 0x69 to indicate that the instruction type is an IN token packet. The second address field is configured to record the address information of the receiver of the IN token packet, for example, the recorded USB bus address information of the USB flash drive is 0x25. The second endpoint field is configured to record the endpoint information of the receiver of the IN token packet, for example, the endpoint information of the recorded USB flash drive is 0x00. The second data field is used to record the data returned by the receiver (i.e. USB flash drive) of the IN token packet, such as the data in the DTAT field being the device descriptor. The second status field is configured to record the status of the receiver of the IN token packet. The second status field includes an ACK status packet and a NAK status packet, where the ACK status packet represents the successful status of the recipient and the NAK status packet represents the failed status of the recipient. In an embodiment of the present disclosure, the hardware descriptor data of the target device (slave device, such as a USB flash drive, and etc.) at least includes: indicating the descriptor length (such as 0x12); indicating a device descriptor (such as 0x01); indicating the USB protocol version used (such as 0x00 0x02); indicating the class code (such as 0x00); indicating subclass code (such as 0x00); indicating the protocol used by the device (such as 0x00); indicating the maximum packet length of endpoint 0 (such as 0x40); indicating the vendor ID (such as 0xff 0xff); indicating the product ID (such as 0x78 0x56); indicating the device version number (such as 0x00 0x02); indicating the vendor string index (such as 0x01); indicating the product string index (such as 0x02); indicating index of the product serial number string (such as 0x03); and indicating the number of configurations (such as 0x01).

It should be noted that after receiving hardware descriptor data from the target device (slave device, such as USB flash drive, etc.), the networked device needs to send an OUT token packet to the target device according to the rules corresponding to the SETUP token packet (such as the rules for controlling transmission), accompanied by an empty data packet (refer to Table 7) to notify the target device (slave device) of successful data reception. The present disclosure will not repeated here.

TABLE 7

| OUT | ADDR | ENDP | DATA1 | DATA (0 bytes) | ACK |
|---|---|---|---|---|---|
| 0xE1 | 0x25 | 0x00 | 0x4B | | 0xD2 |

Referring to Table 7, the instruction format of the OUT token packet includes a third instruction type field (OUT), a third address field (ADDR), a third endpoint field (ENDP), a third data field (DATA0 or DATA1), and a third status field (ACK, NAK, or NETY). The third instruction type field is configured to record the OUT instruction identifier, which can take the value 0xE1 to indicate that the instruction type is an OUT token packet. The third address field is configured to record the address information of the recipient of the OUT token packet, for example, the recorded USB bus address information of the USB flash drive is 0x25. The third endpoint field is configured to record the endpoint information of the recipient of the OUT token packet, for example, recording the endpoint information of the USB flash drive as 0x00. The third data field is configured to record the data returned by the receiver of the OUT token packet, for example, the recorded data is empty. The third status field is configured to record the status of the recipient of the OUT token packet. The third status field includes an ACK status packet and an NAK status packet, where the ACK status packet represents the successful status of the recipient and the NAK status packet represents the failed status of the recipient.

Referring to Table 8, the networked device sends setting device address instructions to USB drives to assign addresses to the slave device (such as the USB drive), and sends the IN token packet to a specific endpoint of the slave device (such as the USB drive) for query data to return. For example, the networked device sends setting device address instructions to endpoint 0 of the USB drive through SETUP token packet. The USB flash drive returns the first ACK status packet of the USB flash drive to the networked device based on the device address instruction and IN token packet. For example, the USB flash drive returns the first ACK status packet to the networked device through endpoint 0. For example, the networked device sends the SETUP token packet to the endpoint 0 of the USB flash drive, and the data in the SETUP token packet (refer to the data in the DATA field in Table 9) is used to set the address. The networked device receives the first ACK status packet returned by the USB flash drive to indicate that the address of the USB flash drive has been successfully set.

TABLE 8

| SETUP | ADDR | ENDP | DATA0 | DATA (8 bytes) | ACK |
|-------|------|------|-------|----------------|-----|
| 0x2D  | 0x00 | 0x00 | 0xC3  | 0x00 05 19 00 00 00 00 00 | 0xD2 |

The networked device sends an instruction to get a string descriptor to the USB flash drive, and sends an IN token packet to a specific endpoint of the USB flash drive for query data to return. For example, the networked device sends the instruction to get a string descriptor to endpoint 0 of the USB flash drive through the SETUP token packet. The USB drive returns the string descriptor data packet of the USB drive to the networked device based on the command to get the string descriptor and the IN token packet.

It should be noted that the exemplary data of handshake packets and data packets related to getting descriptor instructions, setting instructions, descriptors, token packets, status packets, and etc., can refer to Table 1, Table 2, or other examples in addition to the above tables, which will not be elaborated here.

The networked device sends an instruction to get the configuration descriptor to the USB flash drive, and sends an IN token packet to a specific endpoint of the USB flash drive for query data to return. For example, the networked device sends the instruction to get the configuration descriptor to endpoint 0 of the USB flash drive through the SETUP token packet. The USB drive returns the configuration descriptor data packet of the USB drive to the networked device based on the instruction to get the configuration descriptor and IN token packet. For example, the USB drive returns the configuration descriptor data packet to the networked device through endpoint 0 (typically, the configuration descriptor data packet contains the configuration descriptor, interface descriptor, and endpoint descriptor).

The Networked device sends configuration instructions to the USB drive to set the configuration information of the USB drive, and send the IN token packet to a specific endpoint of the USB drive for query data to return. For example, the networked device sends configuration instructions to endpoint 0 of the USB drive through the SETUP token packet. The USB drive returns the second ACK status packet of the USB drive to the networked device based on the configuration instructions and IN token packet.

The networked device determines whether the connection (or access) between the networked device and the target device is successful based on the descriptor data returned by the USB flash drive mentioned above. If the networked device determines that the USB drive connection is failed based on the first state response rule and the descriptor data returned by the USB drive, it requests a new scenario configuration or new instruction set from the server to reconnect; If the connection is successful, enter a special request and proceed with the special request and data exchange according to the information got from the descriptor. Furthermore, the networked device analyzes and obtains the descriptor information of the USB drive (such as interface descriptors and endpoint descriptors), determines the specific endpoint number and transmission method for USB drive data transmission, and continues to send instructions to the USB drive. For example, based on obtained endpoint descriptor analysis, endpoint 1 is the OUT endpoint, and the transmission method of endpoint 1 is batch transmission. Set endpoint 2 of the networked device as the IN endpoint, and the transmission method is batch transmission. It should be noted that the endpoint number and endpoint function of each device are different and are generally got through endpoint descriptors. The above endpoints 1 and 2 are examples and do not constitute a limitation on the target device.

It should be noted that the successful connection (or access, or handshake) between the networked device (as the master device) and the target device (as the slave device), or between the networked device (as the slave device) and the target device (as the master device), can be determined during the handshake phase (such as getting descriptor instructions, setting configurations, and etc.), or during the data exchange phase (such as reading and writing sector address instructions that meet preset rules, sending TEST detection instructions, and etc.), which will not be repeated here.

The networked device sends an instruction to get the MAXLUN descriptor (special instruction set) to the USB flash drive, and sends an IN token packet to a specific endpoint of the USB flash drive for query data to return. For example, the networked device sends the instruction to get the MAXLUN descriptor to endpoint 0 of the USB flash drive through the SETUP token packet. The USB flash drive returns the MAXLUN data packet of the USB flash drive to the networked device based on the instruction to get the MAXLUN descriptor and the IN token packet. The USB flash drive returns MAXLUN data, such as 0x00, to the networked device based on the IN token packet. For example, a USB flash drive returns MAXLUN data to the networked device through endpoint 0, where MAXLUN data includes the maximum number of logical units.

The networked device sends an INquiry instruction to the USB flash drive and an IN token packet to a specific endpoint of the USB flash drive for query data to return. For example, the networked device sends an OUT token packet to endpoint 1 of the USB flash drive to get device information descriptor instruction, and the IN token packet to endpoint 2. The USB drive returns the device information data packet of the USB drive to the networked device based on the instruction to get the device information descriptor and the IN token packet.

For example, the networked device sends instructions (such as SCSI, SATA instructions, such as CBW packets) to endpoint 1 of the target device based on preset scenario configurations to request to get device information (INquiry) data for the target device. The target device responds to the request to read "INquiry" and returns the first data packet (INquiry packet) and status packet (such as CSW packet for SCSI and SATA instructions) to the networked device.

Referring to Table 9, the CBW packet includes following information: identifier of the CBW packet, serial number of the CBW packet, number of bytes transmitted, transmission direction, logical unit of operation, instruction block length, operation instruction code, and operation instruction parameters. Among them, when the operation instruction code is 0x12, it represents that the networked device (master mode) sends a request instruction to get "INquiry" data to the target device (slave device).

TABLE 9

| CBW identifier | Serial number | Transmitted byte | Transmission direction | Logic unit | Instruction length | Operation Instruction code | Instruction parameter |
|---|---|---|---|---|---|---|---|
| 0x55534243 | 0x06 | 0x08 | 0x80 | 0x00 | 0x06 | 0x12 | 0x00 ... 0x24 ... |

Referring to Table 10, the first data packet (Inquiry data) includes following information:

TABLE 10

| byte | bit 7 | 6 | 5 | 4 | 3 | 2 | 1 | 0 |
|---|---|---|---|---|---|---|---|---|
| 0 | Reserved | | | | | Peripheral type | | |
| 1 | RMB | | | reserved | | | | |
| 2 | ISO version number | | | ECMA version number | | ANSI version number | | |
| 3 | Reserved | | | | | | Data format | |
| 4 | Data length (reserved data, vendor string, product string, product version information) | | | | | | | |
| 05--07 | Reserved data | | | | | | | |
| 08--15 | Vendor information (string) | | | | | | | |
| 16--31 | Product information (string) | | | | | | | |
| 32--35 | Product version information (string) | | | | | | | |
| Exemplary data | 0x008004021f000000FFFFFFFFFFFFFFFFFFFFFFFFFFFFFFFFFFFFFFFFFFFFFFFFFFFF | | | | | | | |

Referring to Table 11, CSW status includes: CSW identifier, serial number of CBW packet, remaining bytes, and error code.

TABLE 11

| CSW identifier | Serial number | Remaining bytes | Error code |
|---|---|---|---|
| 0x55534253 | 0x06 | 0x00 | 0x00 |

It should be noted that the data structure of the CBW instruction package and CSW status package mentioned above is explained based on the SCSI communication protocol, and other relevant contents of the present disclosure will not be elaborated in detail here.

The networked device sends capacity information (such as maximum number of logical units, total number of formattable logical blocks, last logical block address, block capacity, and etc.) or read/write status (MODESENCE6) instructions to a specific OUT endpoint of the USB flash drive, and send the IN token packet to a specific IN endpoint of the USB flash drive for query data to return. For example, the networked device sends an out token packet to endpoint 1 of the USB flash drive to get capacity information or read/write status instructions, and sends the IN token packet to endpoint 2. The USB flash drive returns capacity information or the read/write status data packet to endpoint 2.

In an embodiment of the present disclosure, the networked device sends a request to read the "total number of formattable logical blocks" (READ-FORMAT_CAPACITIES) to a specific OUT endpoint of the target device. For example, the networked device sends a CBW packet to the target device (such as the USB drive), where the operation instruction code is 0x23, requesting to get the "total number of formattable logical blocks" of the target device (such as the USB drive). The target device (such as the USB flash drive) responds to the request to read the "total number of formatted logical blocks" and returns the first data packet (as shown in Table 12) and the CSW status packet to the networked device.

Referring to Table 12, the first data packet (total number of formattable logical blocks) includes following information:

TABLE 12

| byte | bit 7 | 6 | 5 | 4 | 3 | 2 | 1 | 0 |
|---|---|---|---|---|---|---|---|---|
| 0 | Reserved | | | | | | | |
| 1 | Reserved | | | | | | | |
| 2 | Reserved | | | | | | | |
| 3 | Length of capacity information | | | | | | | |
| 4 | Total number of formattable logical blocks | | | | | | | |
| 5 | | | | | | | | |
| 6 | | | | | | | | |
| 7 | | | | | | | | |
| 8 | Reserved | | | | | Descriptor code | | |
| 9 | Block capacity (bytes in a single block) | | | | | | | |
| 10 | | | | | | | | |
| 11 | | | | | | | | |
| Exemplary data | 0x01de1fff00000200 | | | | | | | |

In an embodiment of the present disclosure, the networked device sends a request to read the "last logical block address" (READ_CAPACITY) to a specific OUT endpoint of the target device. For example, the networked device sends a CBW packet to the target device (such as the USB flash drive), with an operation instruction code of 0x25, requesting to get the "last logical block address" data of the target device (such as the USB flash drive). The target device (such as the USB flash drive) responds to the request to read the "last logical block address" and returns the first data packet (as shown in Table 13) and the CSW status packet to the networked device.

Referring to Table 13, the first data packet (last logical block address) includes following information:

TABLE 13

| byte | bit | | | | | | | |
|---|---|---|---|---|---|---|---|---|
| | 7 | 6 | 5 | 4 | 3 | 2 | 1 | 0 |
| 0 | last logical block address | | | | | | | |
| 1 | | | | | | | | |
| 2 | | | | | | | | |
| 3 | | | | | | | | |
| 4 | Total number of formattable logical blocks | | | | | | | |
| 5 | | | | | | | | |
| 6 | | | | | | | | |
| 7 | | | | | | | | |
| Exemplary data | 0x01de200000000200 | | | | | | | |

It should be noted that the networked device (in master mode) can calculate capacity information separately through both the "total number of formattable logical blocks" and the "last logical address block", and do not require simultaneous data acquisition of both.

In an embodiment of the present disclosure, the networked device sends a request to read "read write status" (MODESENCE6) to a specific OUT endpoint of the target device. For example, the networked device sends a CBW packet to the target device (such as the USB flash drive) with an operation instruction code of 0x2A to request acquisition of "MODESENCE6" data from the target device (such as the USB flash drive). The target device (such as the USB flash drive) responds to the request to read "MODESENCE6" and returns 10 the first data packet (as shown in Table 14) and the CSW status packet to the networked device.

Referring to Table 14, the first data packet (MODESENCE6) includes following information:

TABLE 14

| byte | bit | | | | | | | |
|---|---|---|---|---|---|---|---|---|
| | 7 | 6 | 5 | 4 | 3 | 2 | 1 | 0 |
| 0 | Data length | | | | | | | |
| 1 | Reserved | | | | | | | |
| 2 | Read/write status (For example, 0x00 represents readable and writable; 0x80 represents read only) | | | | | | | |
| 3 | Reserved | | | | | | | |
| Exemplary data | 0x03000000 | | | | | | | |

The networked device determines whether the connection (or access) between the networked device and the target device is successful based on at least one of the MAXLUN data packet, the device information data packet, the capacity information data packet, and the read/write status (MODESENCE6) data packet returned by the aforementioned USB flash drive. According to the first state response rule, the networked device determines that the USB drive connection is failed and requests a new instruction set from the server to reconnect; if the connection is successful, send a successful connection status packet to the server and send the successful connection status packet to the client through the server.

Figure 7:
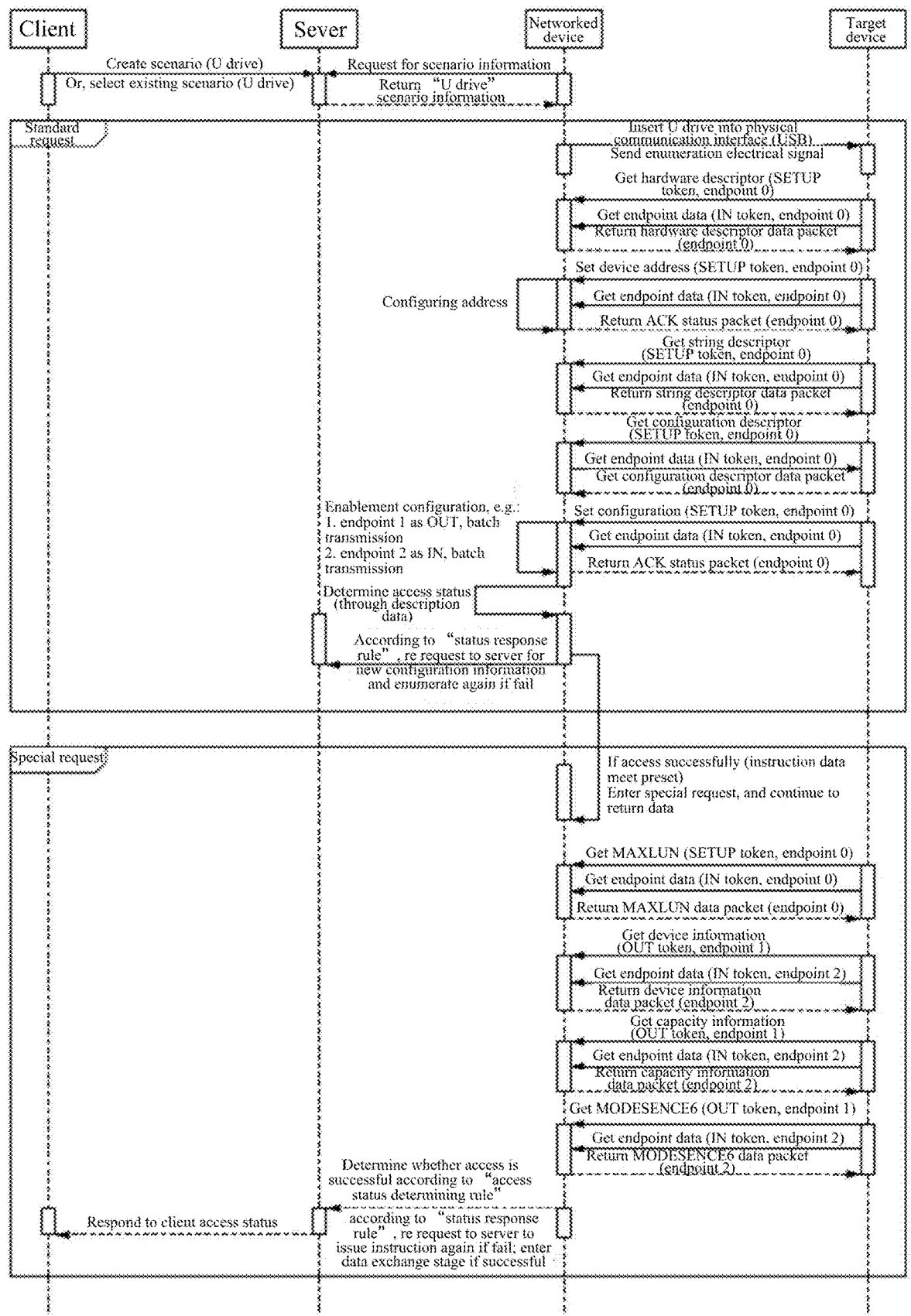
FIG. 7 is a schematic view of a flow chart of an equipment access method according to another embodiment of the present disclosure.

Referring to FIG. 7, it is a flowchart of an equipment access method provided in another embodiment of the present disclosure. The communication between the networked device and the slave device adopts the USB communication protocol, and the networked device (slave mode) uses a USB drive scenario as an example to illustrate the equipment access method in the embodiment.

It should be noted that this example and related data are not limited, and other networked devices (slave devices, slave mode) can be other device types such as USB camera scenarios, which will not be repeated here. In addition, the data content related to token packets, CBW packets, CSW packets, operation instructions, data packets, and etc. in this embodiment is similar to aforementioned embodiments of the networked device (master mode) reading USB flash drive, that is, the configuration of the master and slave roles, as well as the exchange of instruction data and response data, and the response in the scenario configuration, will not be repeated in this embodiment.

The client can create scenario configuration information for USB flash drive scenarios, or select scenario configuration information for existing USB flash drive scenarios. The networked device sends a configuration acquisition request to the server, which includes a USB flash drive scenario. The server obtains the scenario configuration information of the USB flash drive scenario from the client based on the configuration acquisition request, and sends the obtained scenario configuration information of the USB flash drive scenario to the networked device (i.e. USB flash drive).

The networked device is set to slave mode based on the scenario configuration information, starts the default endpoint 0, and set it to control transmission.

After inserting the target device (master device) into the interface of the networked device (such as a USB flash drive), send an enumeration request (such as an electrical signal for enumeration) to the target device.

The target device sends a hardware descriptor acquisition instruction to a specific endpoint of the networked device, and sends an IN token packet to the specific endpoint of the networked device for query data to return. For example, the target device sends hardware descriptor instructions to the endpoint 0 of the networked device through a SETUP token packet. The networked device returns the hardware descriptor data packet of the USB drive to the specific endpoint of the target device based on the hardware descriptor instruction and IN token packet. For example, the networked device returns the hardware descriptor data packet of the networked device (such as the USB drive) to the target device through the endpoint 0. The hardware descriptor data packet of the networked device (such as the USB flash drive) should at least include the device type and device function of the USB flash drive.

The target device sends a device address setting instruction to a specific endpoint of the networked device to assign an address to the networked device, and sends an IN token packet to the specific endpoint of the networked device for query data to return. For example, the target device sends a device address setting instruction to the endpoint 0 of the networked device through the SETUP token packet. The networked device perform address setting operations based on the device address setting instruction, and return the third ACK status packet of the USB flash drive to the target device based on the IN token packet. For example, the networked device returns the first ACK status packet to the target device through the endpoint 0. The first ACK status packet is used to indicate whether the address of the networked device has been successfully assigned.

The target device sends an instruction to get a string descriptor to a specific endpoint of the networked device, and sends an IN token packet to the specific endpoint of the networked device for query data to return. For example, the target device sends the instruction to get a string descriptor to the endpoint 0 of the networked device through the SETUP token packet. The networked device returns the string descriptor data packet of the USB flash drive to the target device based on the instruction to get the string descriptor and the IN token packet. For example, the networked device returns the string descriptor data packet to the networked device through the endpoint 0.

The target device sends the instruction to get a configuration descriptor to a specific endpoint of the networked device, and sends an IN token packet to the specific endpoint of the networked device for query data to return. For example, the target device sends the instruction to get the configuration descriptor to the endpoint 0 of the networked device through the SETUP token packet. The networked device returns the configuration descriptor data packet of the USB drive to the target device based on the instruction to get the configuration descriptor and the IN token packet. For example, the networked device returns the configuration descriptor data packet to the target device through the endpoint 0.

The target device sends configuration instructions to a specific endpoint of the networked device to set the configuration information of the networked device, and sends an IN token packet to the specific endpoint of the networked device for query data to return. For example, the target device sends configuration instructions to the endpoint 0 of the networked device through a SETUP token packet. The networked device performs setting operations based on the configuration instructions, such as starting the corresponding transmission endpoint according to the descriptor data selected by the setting instructions, and returning the second ACK status packet of the USB flash drive to the target device based on the IN token packet. For example, the networked device returns the second ACK status packet to the networked device through the endpoint 0. Enable and configure the networked device according to the above instructions or scenario configurations. For example, the networked device can start a specific endpoint (such as endpoint 1) and set it as the OUT endpoint, and set the transmission method of the OUT endpoint 1 to batch transmission; the networked device can start a specific endpoint (such as endpoint 2) of the networked device, set it as the In endpoint, and set the transmission method of the IN endpoint 2 to batch transmission.

The networked device determines whether the connection (or access) between the networked device and the target device is successful based on the instructions returned by the target device and the second state response rules. If the instructions sent by the target device do not meet the preset device requirements specified in the second state response rule, it is determined that the connection of the network device to the target device is failed, and the networked device requests a new descriptor set from the server to reconnect; If the instruction returned by the target device meets the preset device requirements specified in the second state response rule, it is determined that the connection is successful and enters specially requested data exchange process.

In the specially requested data exchange process, the target device sends an instruction to get the MAXLUN descriptor to a specific endpoint of the networked device, and sends an IN token packet to the specific endpoint of the networked device for query data to return. For example, the target device sends the instruction to get the MAXLUN descriptor to the endpoint 0 of the networked device through the SETUP token packet. The networked device returns the MAXLUN data packet of the networked device (such as the USB flash drive) to the target device based on the MAXLUN descriptor instruction and the IN token packet.

The target device sends an instruction to get device information descriptor to the networked device, and sends an IN token packet to a specific endpoint of the networked device for query data to return. For example, the target device sends an instruction to get capacity information descriptor to the endpoint 1 of the USB flash drive through the OUT token packet. The networked device returns the capacity information data packet of the USB flash drive through the endpoint 2 based on the instruction to get the capacity information descriptor and the IN token packet. The target device sends a command to get capacity information descriptor to a specific endpoint of the networked device, and sends an IN token packet to a specific endpoint of the networked device (such as endpoint 2) for query data to return. For example, the target device sends a command to get capacity information (get the maximum number of logical units, total number of formatted logical blocks, last logical block address, block capacity, and etc.) or read/write status to endpoint 1 of the USB flash drive through the OUT token packet. The networked device returns the capacity information or read/write status data packet of the networked USB drive through the endpoint 2 based on the capacity information instruction and the IN token packet.

The target device sends an getting read/write status (MODESENCE6) instruction to the networked device, and sends an IN token packet to a specific endpoint of the networked device for query data to return. For example, the target device sends a MODESENCE6 instruction to the endpoint 1 of the networked device through an OUT token packet. The networked device returns the MODESENCE6 data packet of the networked device (USB flash drive) through the endpoint 2 based on the MODESENCE6 instruction and the IN token packet.

The networked device determines whether the connection (or access) between the networked device and the target device is successful based on the instructions sent by the target device and the second interface status rules. According to the first state response rule, the networked device determines that the target device is failed to be connected to the networked device (USB flash drive), and requests a new descriptor set from the server to reconnect; If the connection is successful, the networked device sends a successful connection status packet to the server and sends the successful connection status packet to the client through the server.

It should be noted that, as descriptors, capacity information, read/write status, and other data returned from above networked devices as the slave device to the target device (master device), are pre-set through scenario configuration (USB flash drive scenario).

In an embodiment of the present disclosure, if the networked device is used as a peer-to-peer communication mode, after the networked device is activated and a scenario is selected, the third equipment access configuration information is read from the scenario configuration information.

After the networked device is started and the scenario is selected, the networked device gets a third mode, a third interface type, an interactive data set, a third state judgment rule and a third state response rule in the third equipment access configuration information. According to the third mode, the networked device sets the working mode of the networking device to a peer communication mode; according to the third interface type, the physical communication interfaces of the networked device are selected as two interfaces, namely a data sending interface and a data receiving interface. The data sending interface of the networked device is connected to the data receiving interface of the target device, and the data receiving interface of the networked device is connected to the data sending interface of the target device.

The networked device sends data to the target device through the Send Data Interface (TX) under rules based on interactive datasets, and receives data returned by the target device through the data receiving interface. The networked device receives data sent by the target device through the data receiving interface (RX) under rules based on interactive datasets, and returns data to the target device through the sending data interface.

When the data sent by the target device meets the preset access success conditions specified in the third access status judgment rule, the networked device determines that the establishment of a handshake connection is successful; and send a successful connection packet to the server according to the third state response rule; When the data returned by the target device meets the preset access failure conditions specified in the third access status judgment rule, the networked device determines that the establishment of a handshake connection is failed; sends a connection failure packet to the server according to the third state response rule, requests a new interactive dataset and other data to reconnect/or wait for the connection of the target device.

Figure 8:
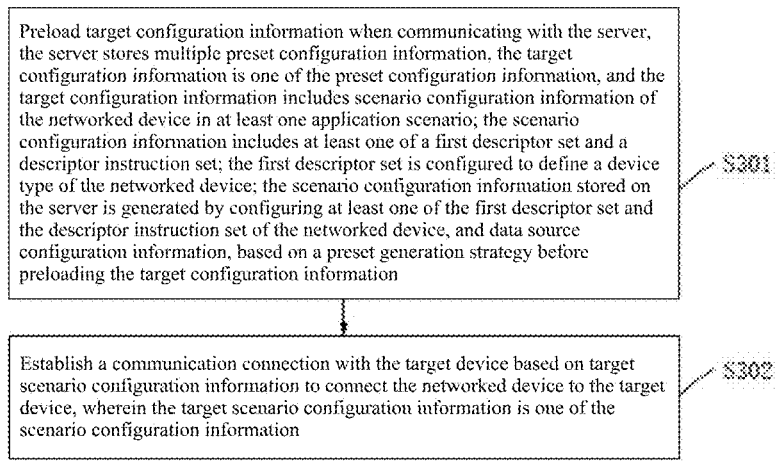
FIG. 8 is a schematic view of a flow chart of an equipment access method according to another embodiment of the present disclosure.

Referring to FIG. 8, a flowchart of an equipment access method provided in an embodiment of the present disclosure is shown. The method of the present embodiment can be applied to the networked device, which stores scenario configuration information for at least one application scenario. The networked device includes but not limited to a device such as a microcontroller or an embedded system with networking functions, a vehicle terminal, a smartphone, a tablet computer or a laptop, a network USB key device (such as a bank U-shield, a digital certificate, an encryption dog, and etc.), a network proxy control device (such as a multi-port repeater), a remote controller (including but not limited to a network read and write control device, a network controller (such as a router and a smart gateway), a communication device class (CDC, such as a network card, a modem, an ISDN (Integrated Services Digital Network) terminals), a human interface device (HID, such as a keyboard or mice), a Mass Storage Device Class (MSC), a Printer device (such as a USB interface printer), a Still Imaging device, a Video device, an Audio/Video device, a Smart card device, a USB hub device (Universal Serial Bus Hub) and a customized device.

As shown in FIG. 8, the equipment access method of this embodiment includes:

Step S301, preloading the target configuration information when communicating and connecting with the server. The server stores multiple preset configuration information, and the target configuration information is one of multiple preset configuration information. The target configuration information includes scenario configuration information of the networked device in at least one application scenario, and the scenario configuration information includes at least one of the first descriptor set and the descriptor instruction set, The first descriptor set is used to define the device type of the networked device.

Step S302, establishing a communication connection with the target device to connect the networked device to the target device based on the target scenario configuration information, and the target scenario configuration information is one of the scenario configuration information.

In an embodiment of the present disclosure, the scenario configuration information is generated by configuring at least one of the first descriptor set and the descriptor instruction set according to a preset generation strategy of the networked device. The data source configuration information is then generated, and the preset generation strategy includes at least one of a customized generation strategy, a template generation strategy, or an externally imported generation strategy.

Figure 9:
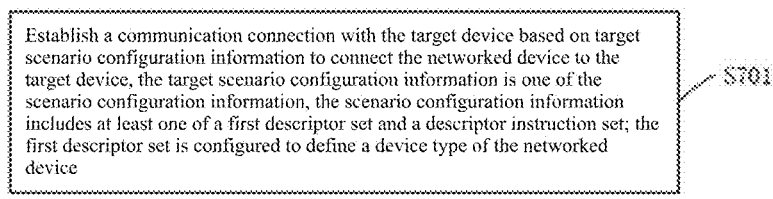
FIG. 9 is a schematic view of a flow chart of an equipment access method according to another embodiment of the present disclosure.

Referring to FIG. 9, a flowchart of an equipment access method provided in an embodiment of the present disclosure is shown. As shown in FIG. 9, the equipment access method of this embodiment includes:

Step S701, establishing a communication connection with the target device to connect the networked device to the target device based on the target scenario configuration information. The target scenario configuration information is one of the scenario configuration information, which includes at least one of the first descriptor set and the descriptor instruction set. The first descriptor set is used to define the device type of the networked device.

In this embodiment, the equipment access process similar to the embodiment shown in FIG. 1 can be explained by referring to relevant description of the embodiment in FIG. 1, which will not be repeated here. It should be noted that the target scenario configuration information of this embodiment is stored in the local storage space of the networked device, without the need to obtain it from the server to further improve equipment access efficiency or limit a functional range of the networked device.

Figure 10:
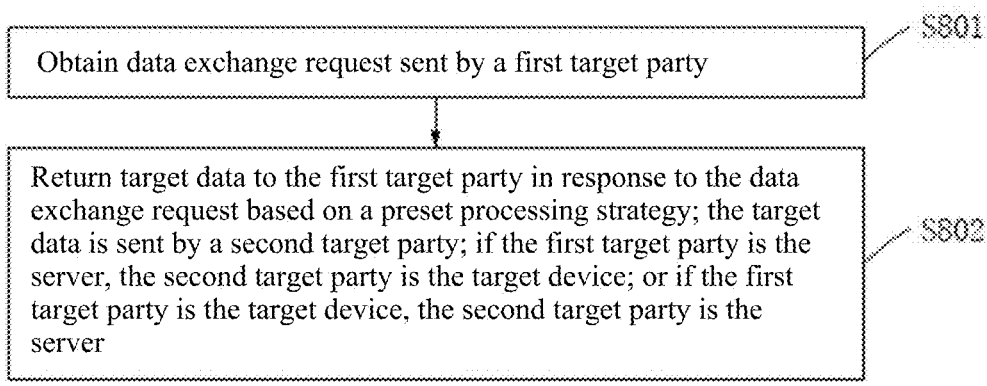
FIG. 10 is a schematic view of a flow chart of a data exchange method according to an embodiment of the present disclosure.

Referring to FIG. 10, a flowchart of a data exchange method provided in the embodiment of the present disclosure is shown. The method of the present disclosure embodiment can be applied to the networked device, which establishes communication connections with the server and the target device through above-mentioned equipment access method. The networked device includes but are not limited to a microcontroller or an embedded device with networking functions, a terminal device such as a smartphone or a laptop, a network USB key device (such as a bank U-shield, a digital certificate, an encryption dog, and etc.), a network proxy control device (such as a multi-port repeater, and etc.), a remote controller (including but not limited to a network read and write control device, a network controller (such as a router and an intelligent gateway, and etc.), a communication device class (CDC, such as a network card, a modem, an ISDN (Integrated Services Digital Network) terminal), a human interface device (HIDs, such as a keyboard or mice), a Mass Storage Device Class (MSC, such as USB flash drive, network USB flash drive, card reader, network card reader), a Printer device (such as USB interface printer), a Still Imaging device, a Video device, an Audio/Video devices, a Smart card device, a USB hub device (Universal SerialBus Hub) and a customized device.

As shown in FIG. 10, the data exchange method of this embodiment includes steps S801 to S802, as detailed below.

Step S801, obtaining a data exchange request sent by the first target party.

Step S802, responding to the data exchange request and returns target data to the first target party based on a preset processing strategy. The target data is sent by a second target party, where if the first target party is the server, the second target party is the target device. If the first target party is the target device, the second target party is the server.

In an embodiment of the present disclosure, a data exchange request is a request for data interaction between a networked device and a target device, including a first exchange request initiated by the networked device and a second exchange request initiated by the target device. The preset processing strategy is a strategy for processing data exchange requests, which includes but not limited to a first strategy based on processing locally on the networked device and a second strategy based on forwarding data exchange requests to the server.

In an embodiment of the present disclosure, when the networked device serves as a master device, it supports connection with multiple slave devices and exchanging data with the multiple slave devices; When the networked device serves as a slave device, it can also support connecting with multiple master devices and supporting data exchange with the multiple master devices. This embodiment connects the networked device, the server, and the target device through the equipment access method shown in FIG. 1, FIG. 8, or FIG. 9, in order to allow the networked device to serve as different interaction roles and to perform data exchange processes in different data exchange scenarios, thereby achieving data exchange of the networked device in multiple application scenarios and improving applicability of the networked device in various scenarios.

In an embodiment of the present disclosure, the networked device serves as the master mode and gets endpoint information of the target device (USB slave device) by getting descriptor instructions, such as endpoint 1 being IN and endpoint 2 being OUT. The networked device sends a command query operation instruction request to the server through network interfaces, waiting for the server to issue interactive commands. When interactive instructions are found, the networked device downloads an interactive instruction set for interactive operations. For example, it is necessary to send data A1 to the target device and receive returned data from the target device. The networked device sends data A1 to endpoint 2 (OUT) of the target device and sends an IN token packet to endpoint 1 (IN) for query data to return. After receiving the DATA packet A2 from endpoint 1, the networked device uploads it to the server.

In an embodiment of the present disclosure, the networked device serves as a slave mode, enabling corresponding endpoint number, transmission direction, and transmission method (such as endpoint 1 being an IN endpoint, batch transmission method; endpoint 2 being an OUT endpoint, batch transmission method, and etc.) based on endpoint related information (such as interface descriptors, endpoint descriptors, etc.) in the scenario configuration, and waiting for the computer host to send interactive instruction data to the two endpoints mentioned above. The networked device receives data A1 sent by the computer host to endpoint 2 (OUT). The networked device uploads data A1 to the server through a network interface. The server parses data A1 and waits for the networked device to download data A2. The networked device downloads data A2 through the network interface. When the computer host sends an IN token packet to endpoint 1 (IN) of the networked device, the networked device returns the DATA packet A2 to the computer host.

In an embodiment of the present disclosure, the networked device has both slave mode and host mode. The target device includes at least one first target device and at least one second target device, wherein the networked device serves as a master device in communication with the first target device and a slave device in communication with the second target device. If the first target party is the server, then the second target party is the first target device or the second target device, If the first target party is the second target device, then the second target party is the server or the first target device.

Specifically, on one hand, the networked device as the slave mode (such as interface 1), enables the first endpoint (such as endpoint 1) to be IN and the second endpoint (such as endpoint 2) to be OUT based on endpoint related information (such as interface descriptors, endpoint descriptors, etc.) in the scenario configuration, and waits for the target device 1 (computer host) to send interactive instruction data to the two endpoints mentioned above through interface 1. On the other hand, the networked device as a master mode (such as interface 2), sends descriptor acquisition instruction through interface 2 to get endpoint information of target device 2 (USB device), such as endpoint 1 being IN and endpoint 2 being OUT. Interface 1 of the networked device receives data A1 sent by the target device 1 to the endpoint 2 (OUT) of the networked device. The networked device sends data A1 through interface 2 to endpoint 2 (OUT) of the target device 2, and sends an IN token packet to endpoint 1 (IN) for query data to return. When interface 2 of the networked device receives the DATA packet A2 from endpoint 1 of the target device 2, it returns the DATA packet A2 to the target device 1 through endpoint 1 of interface 1 of the networked device. The networked device can download preset rules from the server through network interfaces to detect interaction data A1 and A2, uploads data to the server, downloads data to the server to replace or modify A1 or A2 data, or block communication between the target device 1 or the target device 2.

It should be noted that the embodiments of the present disclosure can at least solve following problems.

Capacity issue: For the networked device, taking the network USB drive scenario (slave) as an example, the existing data exchange involves downloading all server files (such as the test.avi file size of 4 GB) to the USB drive, and then the computer reads the test.avi data from the USB drive.

The data exchange method of the present disclosure directly forwards requests or corresponding data packets during the download process, only requiring a small amount of data buffer storage space for the data packets. For example, in a case where each sector is 512 bytes, set a 512 byte memory buffer. If the computer host wants to read a first sector address data of the test.avi file, the networked device will forward the read instruction to the server, download the response first sector address data from the server, and store it in the memory buffer. Then, the networked device forwards the data from the memory buffer back to the computer host. Then, when the computer host continues to read a second sector address and even the last sector address of the test.avi file, it continuously updates it to the memory buffer. The server and the computer host exchange data, achieving transfer of 4 GB files with a storage capacity of 512 bytes, and the size of the transferred file is not limited by the storage space of the networked device itself. On the contrary, if the networked device takes the example of a network read and write control device to read and write test.avi on a USB drive, it can upload test.avi to the server through a 512 byte memory buffer.

The above embodiments are only exemplary, and different file systems may have different read and write methods, or multiple sectors may be merged into a cluster for management, but they can all be applied to this basic data exchange principle. In actual exchange process, in order to accelerate transmission efficiency, requests from multiple sectors can also be merged and processed, such as a cache space of 128×512 bytes, with 128 sectors for data exchange, and etc., which will not be elaborated here.

Function expansion issue: Taking a network read and write control device (master) as an example, the existing technology is that a device as a master device can only first install program software with interactive instructions (such as drivers, parsers, and etc.) in the device. Only when there is a local driver in the device, control of an access device can be achieved. Therefore, it is necessary to install the driver locally in advance to control the target device, which makes it difficult to expand the device's functions.

By using the data exchange technology of the networked device in the present disclosure, interactive instructions can be downloaded in real-time on the server. For example, taking a scenario that the networked device is connected to a standard USB drive (with software installed) and a special camera (without software installed) as an example, in the case of connecting the USB drive, since the USB drive itself has installed a read and write program (functional instruction set) for the USB drive, the networked device can directly read and write to the USB drive; In the case of connecting the camera, due to a lack of a special camera's functional instruction set, the got descriptor cannot be recognized and enumeration cannot be completed. Therefore, the got descriptor is sent to the server. After being set by the server, a relevant functional instruction set (such as getting descriptors and verifying instructions) is issued, and the networked device re enumerates the camera according to the functional instruction set to establish a connection. The server directly sends instructions to the networked device to read data from the special camera, and the networked device forwards the instructions to the special camera. After the camera returns data, the networked device can directly display images from the camera or forward the image data to the server, which can store or share it.

Security issue: The data buffer and downloaded functional instruction data of the networked device can be stored in memory, and the networked device itself cannot store data. After the networked device is powered off, the data disappears. It can protect important data from theft.

In some embodiments, based on the embodiment shown in FIG. 10, the step S802 includes:

Forwarding the data exchange request to the second target party in response to the data exchange request; and Receiving target data returned by the second target party in response to the data exchange request, and forwarding the target data to the first target party.

In an embodiment of the present disclosure, based on the second strategy of forwarding data exchange requests to the server, the networked device forwards and processes the data exchange request.

In an embodiment of the present disclosure, when the networked device receives a data exchange request initiated by the target device, the networked device forwards the data exchange request to the server, the server analyzes and processes the data exchange request and returns the target data to the networked device. The networked device then returns the target data to the target device.

In an embodiment of the present disclosure, the networked device is a network USBkey device, and the target device is a computer host. Said forwarding the data exchange request to the second target party in response to the data exchange request includes: forwarding the data exchange request to the server in response to the data exchange request sent by the computer host. The data exchange request carries credential information of the USBkey device (the credential information can be got by user input or sensor acquisition and conversion) to enable the server to verify the credential information. The credential information includes but not limited to PIN text password and biometric information, while the biometric information includes but not limited to fingerprint information, iris information, facial information, and voiceprint information. It can be understood that relevant implementation principles of the network USBkey device can be referred to relevant description of the network USBkey device in the equipment access method mentioned above, which will not be repeated here.

In an embodiment of the present disclosure, when a user operates on a networked device and initiates a data exchange request, the data exchange request is first sent to the server for analysis and processing, and then the server returns target data to the networked device, which returns the target data to the target device. For example, the networked device serves as a keyboard device, and the keyboard device is connected to the computer host as a slave device. When a user clicks a key (such as key A) on the keyboard device at a front end of the computer or the server to input "A" on the computer host, the data exchange request triggered by clicking key A is sent to the server. The server recognizes the key value "A" corresponding to key A and returns the key value "A" to the keyboard device, When the target device (computer) scans for keyboard input, the keyboard device then sends the key value "A" to the computer host. This can serve as a remote keyboard input scenario, where users can remotely input sensitive strings (such as passwords, etc.) to the computer host without the need to inform on-site personnel for input, improving security. It should be understood that the above key value is only used as examples rather than limitations, and the keyboard device is also suitable for scenarios that use preset processing scripts for processing, which will not be repeated here.

In an embodiment of the present disclosure, the networked device serves as a network proxy control device in a master role, connected to a printer, receives data to be printed sent by the computer host. When optimization processing is needed for the data to be printed (such as enhancing image data to improve printing quality), the networked device sends the data to be printed to the server for optimization processing, receives optimized data returned by the server, and sends the optimized data to the printer for printing. It should be understood that the above image data is only used as an example and not limited, and may also be other data in other embodiments.

In an embodiment of the present disclosure, data processing is carried out on the server through request forwarding to reduce hardware pressure on the networked device, thereby enabling high computing power data processing for some networked devices with poor computing capability. This enables low-level functional networked devices to achieve high-level functions, improve advanced application expansion of networked devices, and protect programs with advanced functions from being reversed, cracked, and abused locally.

In an embodiment of the present disclosure, based on the embodiment shown in FIG. 10, the step S802 includes:

performing data processing on the data exchange request to get a data processing result based on a preset processing script;

sending a target data acquisition request to the second target party based on the data processing result; and Receiving target data corresponding to the data processing result returned by the second target party in response to the target data acquisition request, and returning the target data to the first target party.

In an embodiment of the present disclosure, the preset processing script is a script program that integrates data processing logic, which can enable the networked device to process data or run data logic locally without forwarding all data to the server for execution. The networked device only interacts with the server when certain conditions are triggered to improve data processing efficiency.

In an embodiment of the present disclosure, the networked device serves as a mass storage device (slave role) and processes data exchange requests based on preset processing scripts. For example, if the networked device recognizes that the data exchange request sent by the computer host indicates that a file name of a file to be read is test.txt (i.e. data processing result), it requests the server to read test.txt file data, downloads the test.txt file data sent by the server (i.e. target data), and returns the test.txt file data to the computer host. Similarly, for a data writing process, it is also possible to upload the test.txt file to the server for storage when the computer host writes it, while other files are normally stored locally.

In an embodiment of the present disclosure, the networked device serves as a network read and write control device (master role), which is equipped with a storage medium and stores processing logic of general or open source interactive instructions in a local storage medium for execution to improve data exchange speed. The networked device stores special instructions on the server, and then loads them remotely from the server according to actual needs to prevent interaction logic of the special instructions from being reversely analyzed locally, ensuring security of data exchange. Based on preset scripts, the networked device performs data retrieval on a connected large capacity storage device (such as USB flash drive), such as searching for a file with a file name test.txt, searching for a file with the first byte of the first sector being 0xFF, etc., and automatically uploading searched file data to the server. In an embodiment of the present disclosure, when the networked device acts as a network proxy control device in the master role, based on a preset script, identifies the vendor ID, product ID, or device type (used class, subclass, interface command set, endpoint transmission mode) of the connected device by reading descriptors. Remote mapping is only allowed when the vendor ID, the device ID, or the device type meets conditions of the connected target device, to protect security of the server or the control end.

In an embodiment of the present disclosure, when the networked device acts as a network intermediate control device in the master role, it is based on a preset script or a download script, which is composed of multiple A1 models or algorithms. When the networked device is connected to an audio device and a computer host, it switches audio optimization enhancement algorithm to optimize the audio data sent by the computer host to the audio device, in order to enhance a sound playback effect of the audio device; When the networked device is connected to a camera and the computer host, it switches to an A1 image recognition model to process image data sent by the camera to the computer host, thereby achieve item labeling.

In an embodiment of the present disclosure, above-mentioned large capacity storage devices, network read/write control devices, network proxy control devices, and network intermediate control devices are also suitable for request forwarding scenarios, without using local preset processing scripts for processing. For data exchange of other device types, please refer to relevant embodiment descriptions of equipment access methods mentioned above, which will not be elaborated here.

Figure 11:
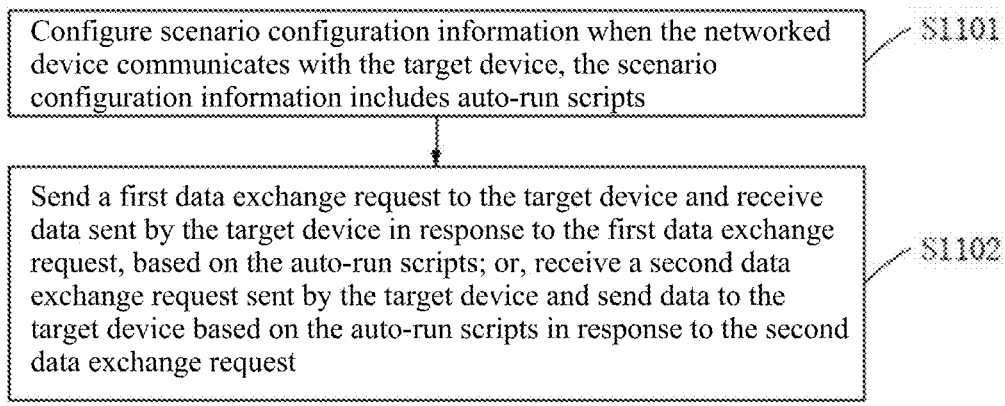
FIG. 11 is a schematic view of a flow chart of a data exchange method according to another embodiment of the present disclosure.

Referring to FIG. 11, it is a flowchart of a data exchange method in another embodiment of the present disclosure. The data interaction method comprises the following steps:

Step S1101, configuring scenario configuration information when the networked device communicates with the target device, which includes auto-run scripts.

Step S1102, sending a first data exchange request to the target device and receiving data sent by the target device in response to the first data exchange request, based on the auto-run scripts; alternatively, receiving a second data exchange request sent by the target device and sending data to the target device based on the auto-run scripts in response to the second data exchange request.

In an embodiment of the present disclosure, when receiving data sent by the target device in response to the first data exchange request, the networked device sends the data sent by the target device to the server.

In an embodiment of the present disclosure, during the data exchange process between the networked device and the target device, according to preset configuration of the data exchange configuration information, the networked device can exchange data with the target device based on its local data module (such as storage chip module and camera module), or exchange data with the target device based on data sources provided by the client or the server.

The following taking the networked device as the master mode to illustrate the data exchange method in this embodiment.

After the networked device is started and the scenario is selected, the networked device configures the networked device based on the data exchange configuration information in the scenario configuration information. If the data exchange configuration information includes automatic execution instruction scripts (such as automatically sending data interaction instruction scripts), the networked device will automatically send instructions to the target device based on content of the automatic execution instruction script. If the data exchange configuration information includes a data source instruction set and a data exchange instruction set, the networked device sends instructions to the target device based on the data source instruction set and the data exchange instruction set. After sending instructions to the target device, the target device waits to receive data from the target device's response.

In an embodiment of the present disclosure, the data responded by the target device can be a data packet requested by the instruction or a status packet of an execution result of the instruction. After receiving the responded data from the target device, if it is determined that the instructions have not been fully executed and are high-level instructions, such as a combination of multiple low-level instructions or automatic execution of instruction scripts (such as automatic sending data interaction instruction scripts), the networked device identifies the responded data and continue to send preset instructions in the high-level instructions according to the rules of the high-level instruction; if it is determined that the instructions have been executed, according to preset rules of the instructions, the responded data can be saved on local storage media of the networked device (such as storage chips, hard disks, etc.), or be sent to the server and client by the target device.

In an embodiment of the present disclosure, based on at least one of the data source instruction set and the data exchange instruction set in the data exchange configuration information, the networked device binds an interaction system or a data source, and returns data to the server or the client. The data returned by the networked device can be either raw data responded by the target device (such as raw data packets), or data processed by instructions and preset rules in the data exchange configuration information (such as converting state packets into specific flags).

In an embodiment of the present disclosure, according to the permission/prohibition data exchange strategy in the data exchange configuration information, the networked device can identify parameter content of instructions sent by the client and the server, such as identifying an operation type (such as read/write type) and an operation target (such as specific sector address) in the instructions sent by the client and the server to the networked device, and limiting the instructions of specific parameter content. For example, instructions that prohibit write operations, or instructions that prohibit operation with sector address 0x00, etc.

In an embodiment of the present disclosure, according to the policy of permission/prohibition data exchange, the networked device can identify content of received instructions or the data packet in response to the instructions. For example, for write data packets in write instructions sent by the client or the server, or data packets returned in response to the read instruction, judgment and recognition are based on a hash value of the data packets or a byte value at a specific address.

In another embodiment of the present disclosure, recognition and judgment can be made based on data of the peripheral module combined with instruction parameters or packet content. For example, the data of the peripheral module can be the specific location area of the GPS positioning module or the IP address of the networking module. When the instructions or response data comply with preset rules, networked devices operate on the instructions or response data based on allowed/prohibited exchange policies, such as forwarding or not forwarding instructions sent by the client or the server, or forwarding or not forwarding data packets responded by the target device to the client or the server.

In an embodiment of the present disclosure, recognition and judgment can be made based on data of the peripheral module combined with instruction parameters or packet content. For example, only when a GPS position of the GPS positioning module is at a specific position, it is allowed to execute instructions to read a specific position sector to the target device.

The following is an example of the data exchange method in this embodiment, using a scenario where the networked device (master mode) reads and writes to a USB drive.

Step S1101 further includes configuring the data exchange configuration information in a reading a USB flash drive scenario. Specifically, when configuring data exchange configuration information, configuring one or more of following data source instruction set: getting maximum number of logical units, getting the number of formattable blocks; getting last logical block address; getting block capacity size; getting read and write status, and etc.; configuring one or more instructions in following data exchange instruction set: USB communication protocol instructions; SCSI transparent command set instructions; file operation instructions; configuring one or more instructions in the binding interaction system or data source strategy: binding relationship between operation instructions of the server, the client, and preset instructions of the networked device. Said configuring one or more instructions in the binding interaction system or data source strategy: for example, when location data in the positioning module is not located in a specific location area, it is prohibited for the client and the server to send the "file operation instruction" to the target device to delete the "test.txt" file in the root directory.

In an embodiment of the present disclosure, after enumeration between the networked device and the target device is successful, step S1102 includes: the networked device executes a "read file directory script" to automatically read boot sector data of the target device (usually sector address 0x00), and analyzes boot sector address of the file system; reads data in the boot sector address of the file system, analyzes root folder (or first directory) sector address and cluster (block) size and other related parameters; and reads out address data of the root folder sector and analyze file information. The networked device processes file information data according to rules of "binding interaction systems/or data sources", and sends processing results to the client or the server to allow the corresponding file information to be displayed on the interaction interface of the client or the server (similar to display of the root directory when a USB drive is connected to a computer).

Figure 12:
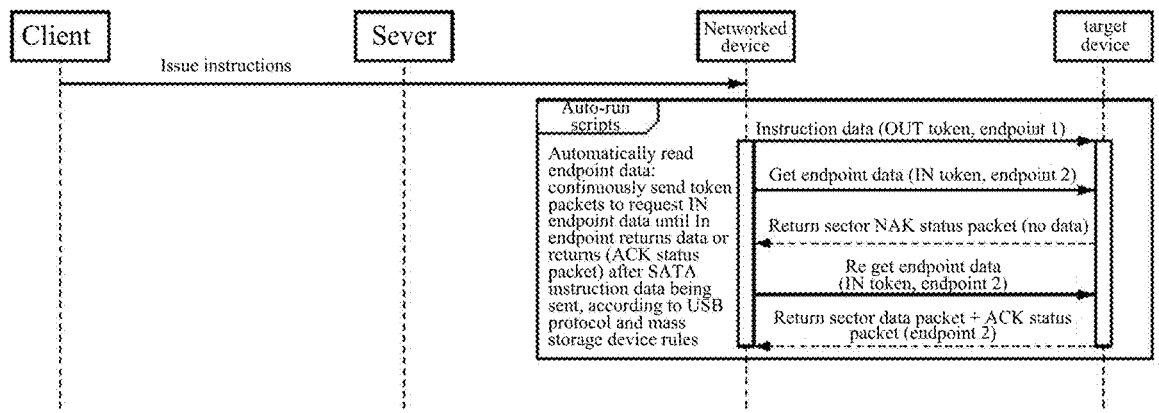
FIG. 12 is a schematic view of a flow chart of a data exchange method according to another embodiment of the present disclosure.
Figure 13:
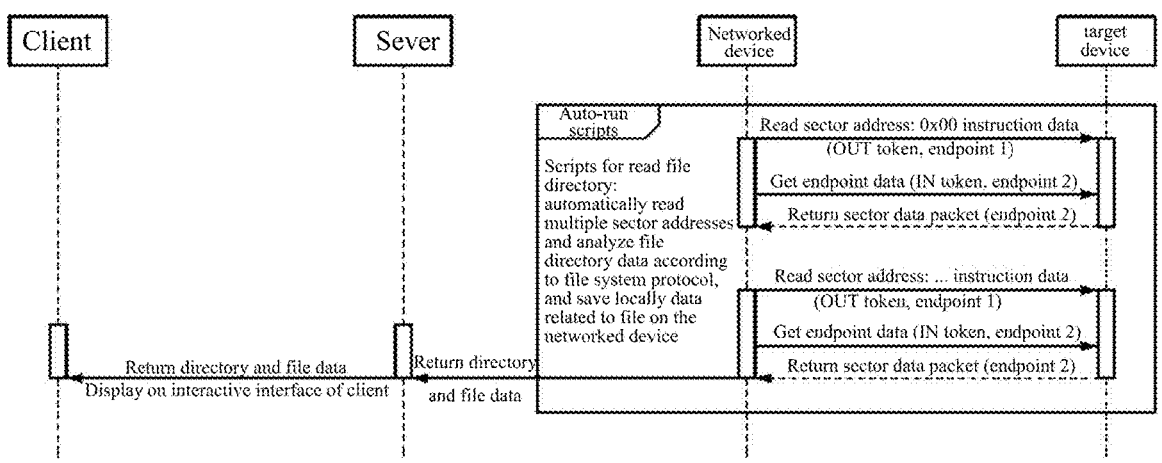
FIG. 13 is a schematic view of a flow chart of a data exchange method according to another embodiment of the present disclosure.

In an embodiment of the present disclosure, the networked device reads addresses of multiple sectors based on automatic execution of instruction scripts in the interactive instruction set according to file system protocol rules, analyzes file directory and file data based on the read data, and saves the file directory and file data locally, on the server or on the client. For example, as shown in FIGS. 12 and 13, the networked device sends read sector address instruction data to a specific endpoint of the target device and sends an instruction to get specific endpoint data. For example, the networked device sends read sector address instruction data (such as SCSI, SATA CBW packets, etc.) to endpoint 1 of the target device through an OUT token packet, and sends an instruction to get endpoint data to endpoint 2 of the target device through an IN token packet. The target device returns the data packet corresponding to the sector address to the networked device based on the read sector address instruction data and gets endpoint data based on the instruction to get endpoint data. The networked device analyzes file directory and file data based on data read from the target device, where the file directory includes at least one of file name, file attribute, and file start address. The networked device sends the file directory and the file data to the server. The server sends the file directory and the file data to the client, so that the client can display the file directory and the file data on the interactive interface.

In an embodiment of the present disclosure, the networked device is set to master mode based on scenario (access) configuration information, and interacts with the target device based on the automatic execution instruction script in the data exchange configuration information. The networked device gets data exchange endpoint information of the target device (USB device) by getting the descriptor instruction of the scenario (access) configuration information. The networked device sends an instruction query operation request to the server through the interface, waiting for the server to issue interactive instructions. When interactive instructions are found, the networked device downloads the interactive instructions set for interactive operations. After receiving the interactive instruction set, the networked device sends instruction data (within the timeout) to the target device based on the automatic execution instruction script in the interactive instruction set, in accordance with the USB communication protocol and mass storage device rules, and continuously sends token packets to request data from the IN endpoint until the IN endpoint returns data or ACK status packet.

For example, as shown in FIG. 12, the networked device sends instruction data to the target device and sends instructions to get endpoint data. For example, the networked device sends instruction data to endpoint 1 of the target device through an OUT token packet, and sends instructions to endpoint 2 of the target device through an IN token packet to get endpoint data. The target device returns a NAK status packet to the networked device based on the instruction data and the instructions to get endpoint data when there is no data returned or preparation for returning data has not been completed, where the NAK status packet indicates that there is no data. The networked device repeatedly sends endpoint data acquisition instructions to the target device based on the NAK status packet until it gets sector data and ACK status packet returned by the target device.

In an embodiment of the present disclosure, the networked device can interact with the target device for sector read and write operations.

Specifically, by sending sector read and write instructions (such as read or write instructions for specific sector addresses such as SCSI and SATA, such as CBW packets) to the networked device through the client and the server, the networked device parses the sector read/write instructions issued by the client and the server according to the instruction rules of "binding interactive systems or data sources", and sends sector read and write instructions to the target device according to preset instructions in the "Data Exchange Command Set" (such as the SCSI Transparent Command Set instructions). The sector read and write instructions include: enabling the target device to return data packets and status packets corresponding to a specific sector address of the data storage space if a read instruction is sent to the target device (such as reading data from a specific sector); enabling the target device to write data into the specific sector address of the data storage space of the target device and to return a status packet if a write instruction (write specific sector instruction and data packet) is sent to the target device. After receiving the data packet or the status packet, the networked device respond to the client and the server based on instruction rules of "binding interaction systems or data sources".

Figure 14A:
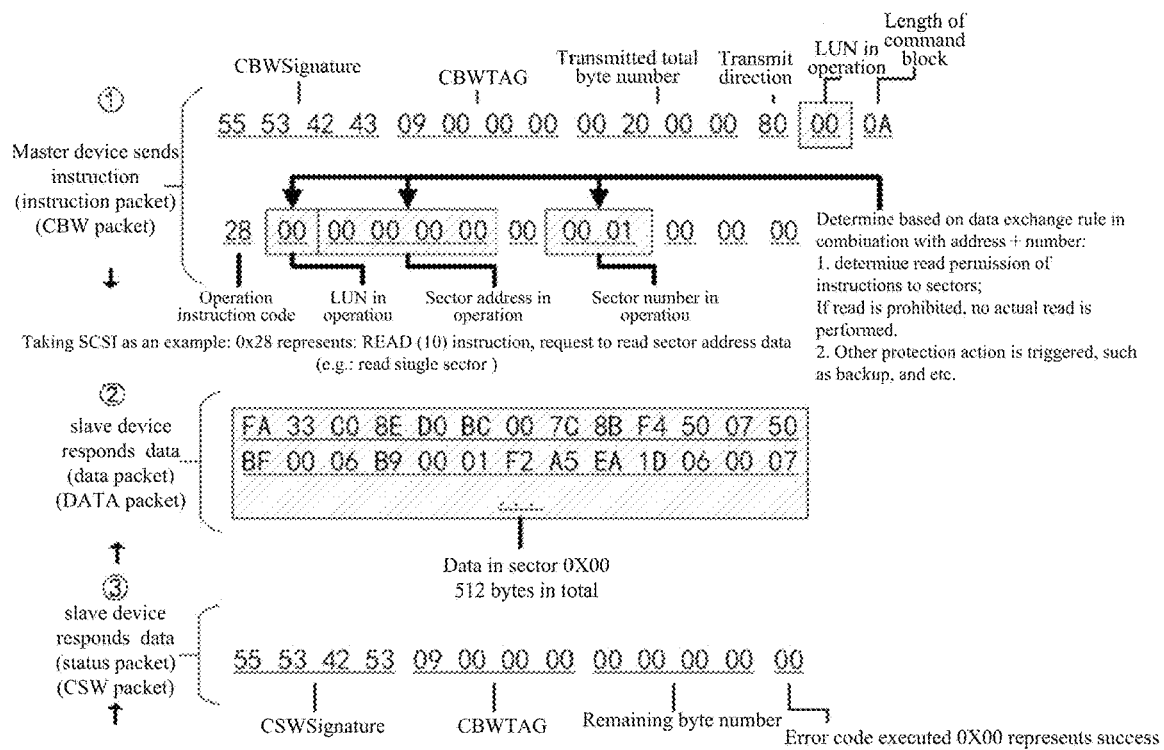
FIG. 14A is a schematic diagram of controlling "read instruction (single sector read)" sector address, data packet, or status from a perspective of a data exchange process in an embodiment of the present disclosure.
Figure 14B:
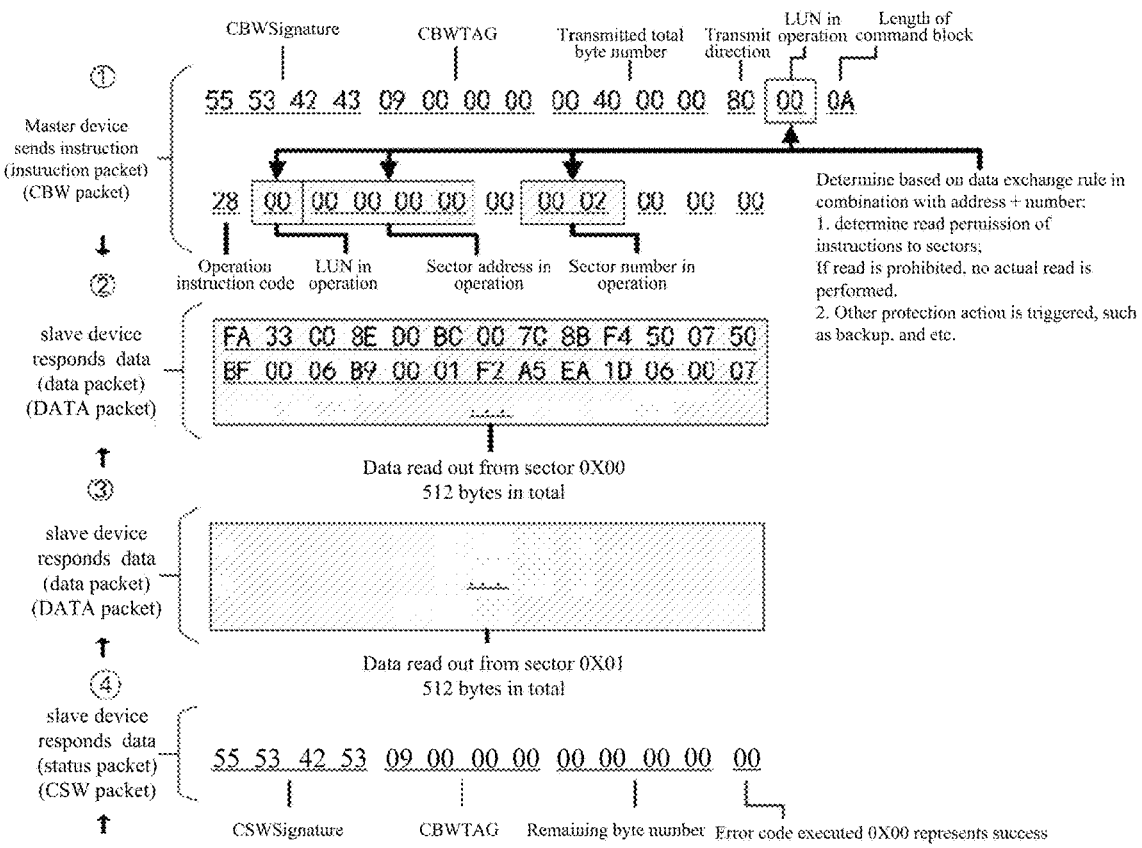
FIG. 14B is a schematic diagram of controlling "read instruction (multi-sector continuous read)" sector address, data packet, or status from a perspective of a data exchange process in an embodiment of the present disclosure.

Specifically, as shown in FIG. 14A, the instructions (including token packets and CBW packets) sent by the networked device (master device) to the target device (slave device, such as USB flash drive), taking SCSI protocol as an example, 0x28 represents READ (10) instruction, requesting to read sector address data. This instruction further includes sector address 0x00000000 to be operated and the number of sectors 0x0001 to be operated. After receiving instructions, the target device (slave device) responds to the master device with data packets (DATA packets) and status packets (CSW packets). As shown in FIG. 14B, it is a continuous read instruction for multiple sectors, and the number of operating sectors for the networked device (master device) is: 0x0002. After receiving instructions, the target device (slave device) responds to the master device with two data packets (DATA packets) and a status packet (CSW packet).

Figure 14C:
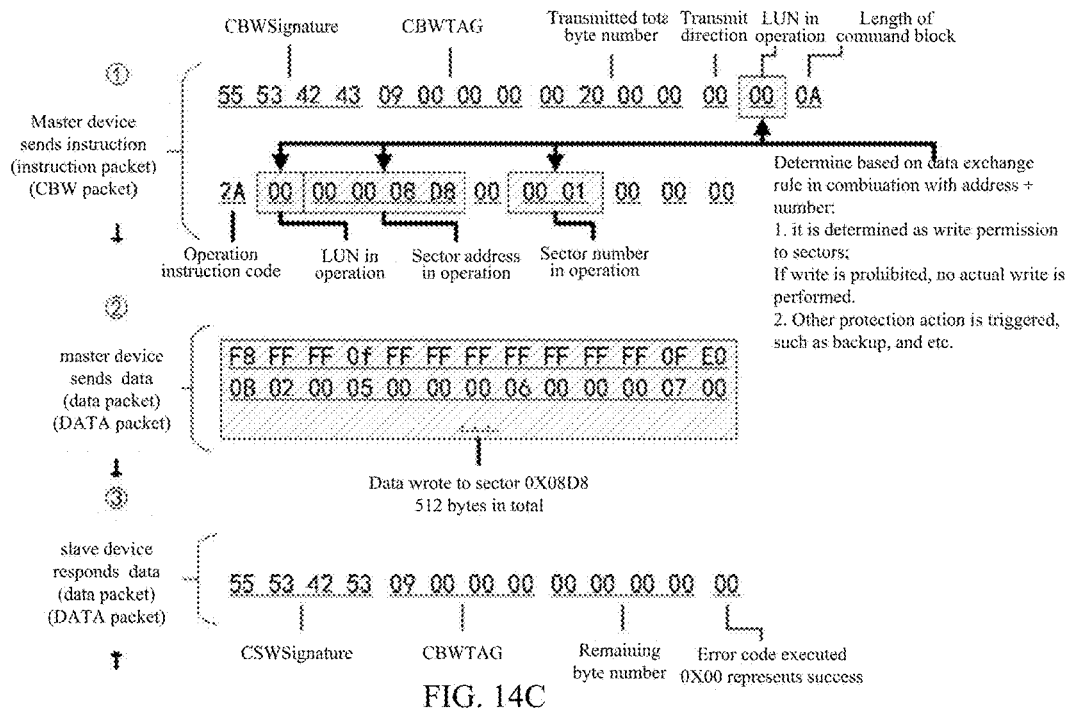
FIG. 14C is a schematic diagram of controlling "write instruction (single sector write)" sector address, data packet, or status from a perspective of a data exchange process in an embodiment of the present disclosure.
Figure 14D:
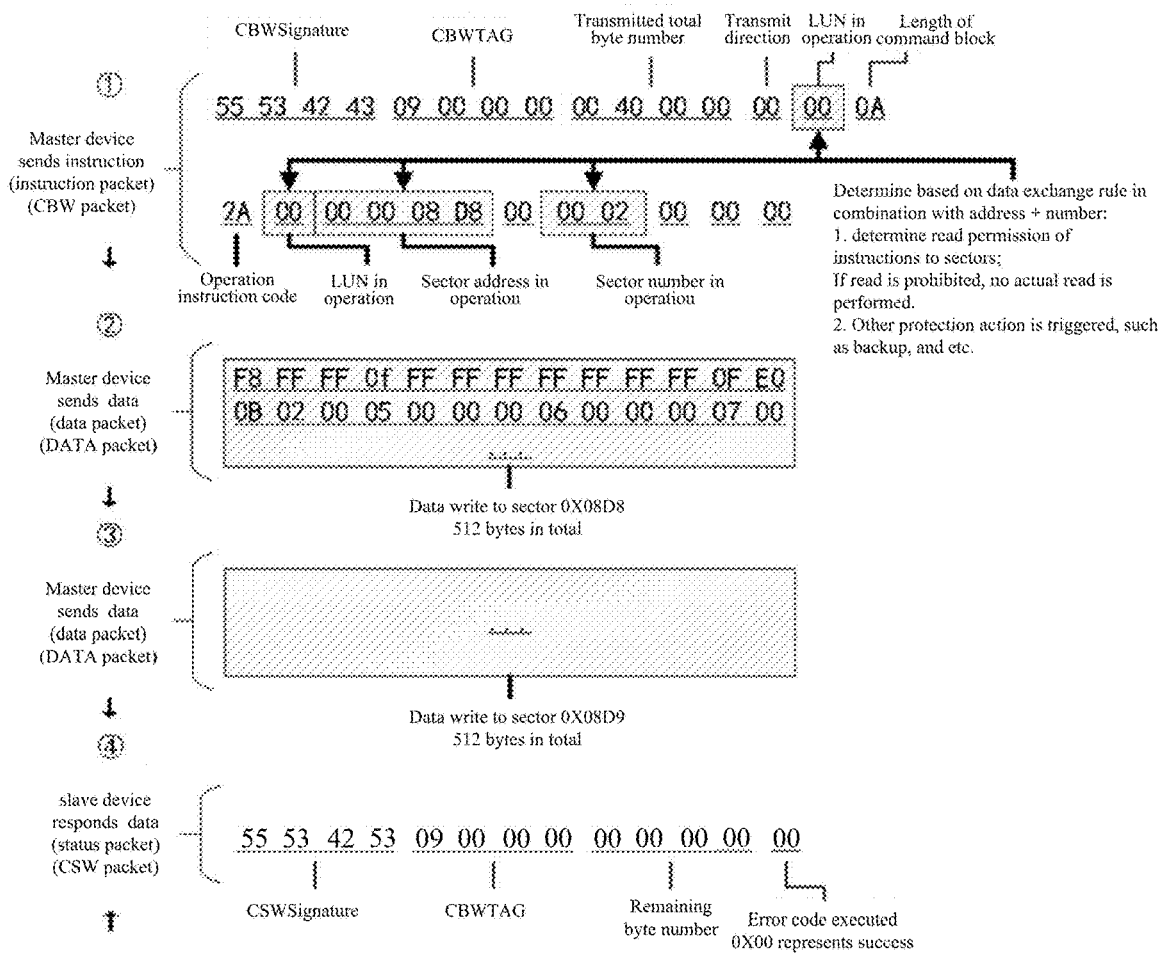
FIG. 14D is a schematic diagram of controlling "read instruction (multi-sector continuous write)" sector address, data packet, or status from a perspective of a data exchange process in an embodiment of the present disclosure.

Specifically, as shown in FIG. 14C, the instructions (including token packets and CBW packets) sent by the networked device (master device) to the target device (slave device, such as USB flash drive), taking the SCSI protocol as an example, 0x2A represents WRITE (10) instruction, requesting data to be written to the sector address. This instruction further includes data packets (DATA packets). After receiving the instruction and data packets, the target device (slave device) operates and responds to the master device with a status packet (CSW packet). As shown in FIG. 14D, it is a continuous write instruction for multiple sectors. The number of operating sectors for the networked device (master device) is 0x0002, and the instruction is further accompanied by two data packets (DATA packets). After receiving the instruction and two data packets, the target device (slave device) operates and responds to the master device with a status packet (CSW packet).

It should be noted that in order to avoid redundancy, relevant parameters of read and write instructions are simplified elsewhere in the present disclosure.

Figure 15:
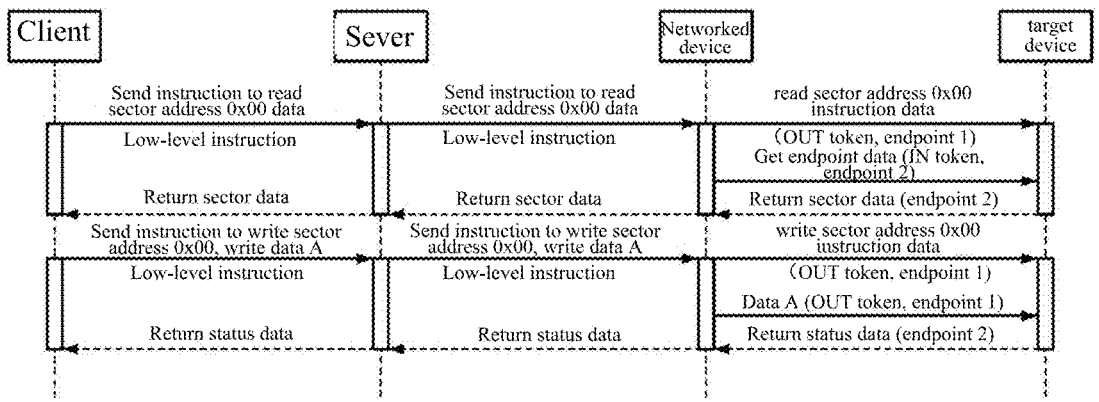
FIG. 15 is a schematic view of a flow chart of a data exchange method according to another embodiment of the present disclosure.

As shown in FIG. 15, in an embodiment of the present disclosure, the client sends read sector address instruction data to the server. The server sends received read sector address instruction data to the networked device. The networked device sends read sector address instruction data (such as an CBW packet in SCSI) to a specific OUT endpoint (such as endpoint 1) of the target device through an OUT token packet, and send an endpoint data acquisition instruction to a specific IN endpoint (such as endpoint 2) of the target device through an IN token packet. The target device returns a data packet corresponding to the sector address and the status packet executing instruction (such as the CSW packet in SCSI) to the networked device based on the read sector address instruction data and the IN token packet. The networked device sends the data packet and the status packet (or status data) to the server, and the server forwards the data packet and the status packet (or status data) to the client.

As shown in FIG. 15, in an embodiment of the present disclosure, the client (or control end) sends write sector address instruction data and data packets to the server. The server sends received write sector address instructions and the data packets to the networked device. The networked device sends the write sector address instruction (such as an CBW packet in SCSI) and the data packets to the specific OUT endpoint (such as endpoint 1) of the target device through the OUT token packet, and gets the IN token packet to the specific IN endpoint (such as endpoint 2) of the target device through the IN token packet. The target device performs operations based on the write sector address instruction and the data packets, and returns a status packet (such as the CSW packet in SCSI or ACK, NAK packet in USB, and etc.) to the networked device. The networked device sends the status packet (or data) to the server and the server forwards the status packet to the client.

In an embodiment of the present disclosure, the networked device can interact with the target device for file read and write operations. Specifically, the server or the client sends file operation instructions (such as a file creating instruction, a file deleting instruction, a file attribute modifying instructions, a file content reading instructions, a file content modifying instructions, and etc.) to the networked device, the networked device parses a file operation instruction issued by the client or the server according to instruction rules of "binding interaction system or data source", sends the file operation instruction to the target device according to preset instructions in the data exchange instruction set. If the file operation instruction is an instruction to write data to the target device, such as a file creating instruction, a file deleting instruction, file attributes modifying instruction, file content modifying instruction, and etc., the file operation instruction is a write instruction to write data packets, and the target device returns status packet data based on the file operation instruction. If the file operation instruction is an instruction to read data from the target device, such as read file content instruction, the file operation instruction is a read instruction, and the target device returns data packets and a status packet based on the file operation instruction. After receiving the data packets or the status packet, the networked device responds to the client and the server based on instruction rules of "binding interaction systems or data sources".

Figure 16:
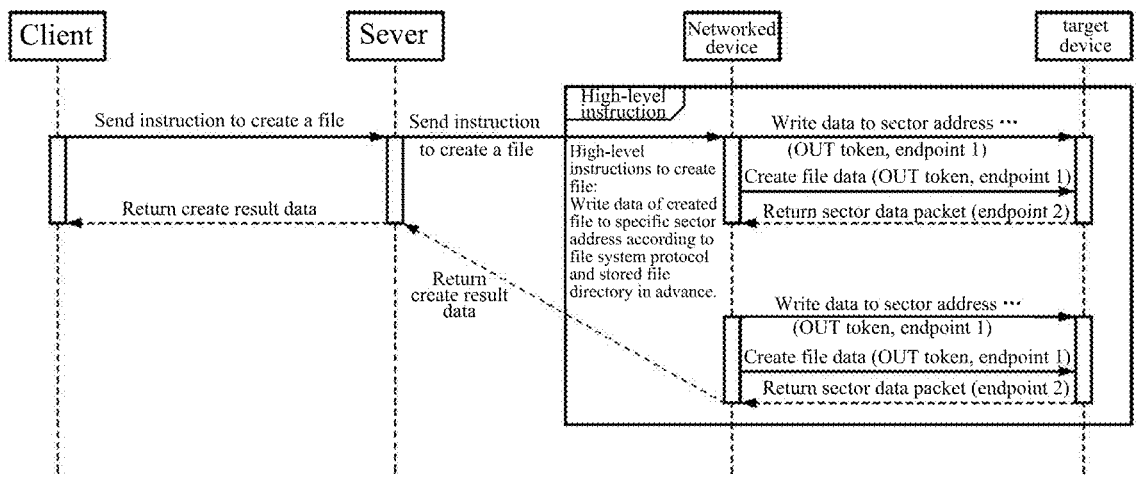
FIG. 16 is a schematic view of a flow chart of a data exchange method according to another embodiment of the present disclosure.

As shown in FIG. 16, in another embodiment of the present disclosure, the client sends a file creation instruction to the server. The server sends the file creation instruction to to the networked device, which writes data for creating the file to a specific sector address based on the file system protocol rules and the pre stored file directory. For example, the networked device sends write sector address instruction data and create file data to endpoint 1 of the target device through an OUT token packet based on the create file instruction. The target device writes the data for creating the file to a specific sector address based on the write sector address instruction data and the data for creating the file, and returns sector data packets to the networked device. For example, the target device returns sector data packets to the networked device through endpoint 2. The networked device determines creation result data from the sector data packet, and returns the creation result data to the server. The server will return the creation result data to the client.

In an embodiment of the present disclosure, when the client or the server issues instructions or executes automatic execution instruction scripts, the networked device executes according to rules of the "allow/prohibit exchange policy" when sending data interaction instructions to the target device. For example, according to the CBW packet instructions mentioned above, it is permitted/prohibited to read/write specific sector data. If it is prohibited, CBW instructions are not sent to the target device.

Figure 17:
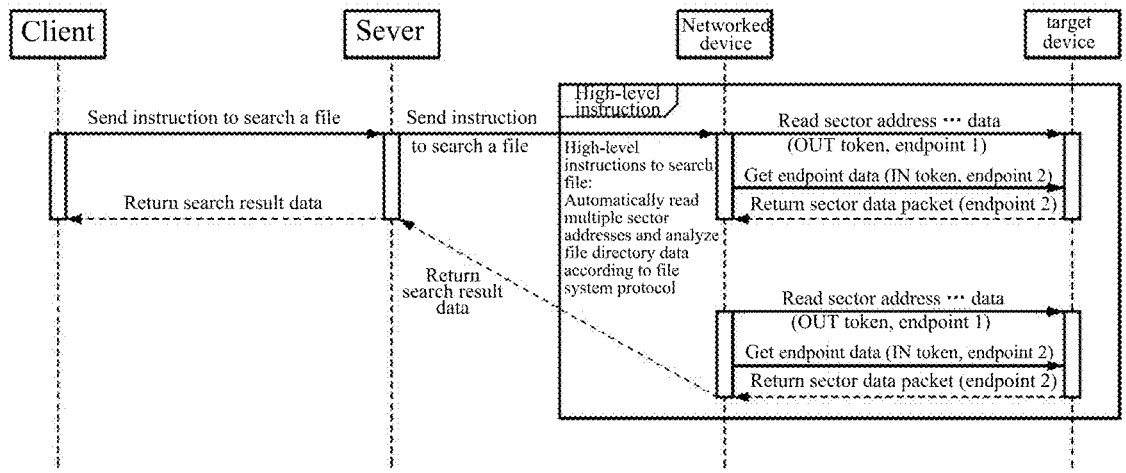
FIG. 17 is a schematic view of a flow chart of a data exchange method according to another embodiment of the present disclosure.

As shown in FIG. 17, in an embodiment of the present disclosure, the client sends a file search instruction to the server. The server sends the file search instruction to the networked device. The networked device automatically reads multiple addresses in the storage space (such as sector addresses) based on file system protocol rules, determines searched file data, and analyzes file directory. For example, the networked device sends read sector address instruction data to endpoint 1 of the target device through the OUT token packet based on the file search instruction, and sends endpoint data acquisition instruction to endpoint 2 of the target device through the IN token packet. The target device returns sector data packets (such as file content) or search results (such as file information) to the networked device based on the read sector address instruction data and the endpoint data acquisition instruction. For example, the target device returns sector data packets to the networked device through endpoint 2. The networked device determines the searched file data and analyzes the file directory from the sector data packet or search result data packet, and returns the search results or file data to the server. The server returns searched file data to the client.

It should be noted that according to different file system protocols, the methods of creating and searching for files vary. In addition, file operations such as deleting files, modifying file attributes, and modifying file content can also be configured in the scenario through scripts or high-level instructions according to different file system rules. This will not be repeated here.

The following introduces the data exchange method in this embodiment taking the networked device as slave mode.

After the networked device is started (or connected) and the scenario is selected, it is configured based on the data exchange configuration information in the scenario configuration information, such as configuring instruction response operations, auto-run scripts of the instruction response operation, second binding interaction system or data source policies, and second permission/prohibition exchange policies in the data exchange configuration information. The networked device receives, processes, and responds to instructions sent by the target device based on configured instruction response operations, auto-run scripts of the instruction response operations, the second binding interaction system or the data source policies, and second permission/prohibition exchange policies. The objects operated by the networked device based on received instructions include at least one of the following: 1. local storage chips, specific databases, folders, or files (such as mirror files) or storage spaces (such as sector area) in the networked device, the client, and the server; 2. local peripheral modules, such as a positioning module, a sensor module, an audio and video source module, and a human-machine interaction module.

In an embodiment of the present disclosure, the networked device responds to instructions or data sent by the target device based on the instruction response operations, second binding interaction systems, or data source strategies. For example, the networked device receives data packets from the OUT endpoint in response to USB token packets sent by the target device, writes data packets to the storage space, and uploads data from the storage space at the IN endpoint. It should be noted that said response of the networked device to the instructions or data sent by the target device is in an automatic manner. For example, according to the instructions of the target device, the networked device automatically reads and writes to the data source bound for reading, without manual intervention during the reading and writing process.

In another embodiment of the present disclosure, the networked device performs instruction response operations on an interactive interface of the client or the server based on the instruction response operations, the second binding interaction systems, or the data source policies. For example, when the networked device is a keyboard device and the target device sends a USB token packet for a request (such as an IN token), the user can input the character "A" on the client's interaction interface, and the networked device returns the data packet corresponding to the character "A" to the target device at the IN endpoint, achieving manual interaction with the target device.

The following is an example of the data exchange method in this embodiment taking a networked device (slave mode) as a USB drive.

Step S1101 further includes: configuring data exchange configuration information of the USB flash drive. Specifically, when configuring data exchange configuration information, configuring one or more of the following instruction response operations: maximum number of logical units, total number of formattable logical blocks; last logical block address; block capacity size; read and write status; USB communication protocol instructions; SCSI transparent command set instructions; file operation instructions, used to respond to instructions corresponding to the target device; configuring one or more instructions in the binding interaction system or data source strategy as follows: configuring a binding relationship of the data source. The data source can be located locally on the networked device, on the server, on the client, on the control end, and etc. For example, when binding the data source as a data source on the server, the read/write sector instructions sent by the target device are mapped to the storage space of the server (such as specific sector area or mirror files). The data used to perform read and write operations on the target device is the data source of the server. Configure the automatic execution command response operation script as a preset backup script for backing up the written data. Configuring one or more instructions in the binding interaction system or data source strategy as follows: when the location data in the positioning module is not located in a specific location area, it is prohibited for the client and the server to send data from the "sector read instruction" to the target device to read the sector address.

In an embodiment of the present disclosure, after enumeration between the networked device and the target device is performed, step S1102 includes: receiving sector read/write instructions (such as SATA and SCSI instructions) sent by the target device, converting the operation instructions into instructions (or original instructions) corresponding to the server's sector address based on the instruction rules bound to the interactive system or data source, and sending converted instructions (or original instructions) to the server to enable the server to perform operations on a sector address based on the converted instructions. For example, when the target device sends a read instruction, the networked device returns data packets and status packets corresponding to a specific sector address of the server's storage space to the target device. When the target device sends write instructions (write specific sector instructions, data packets), the networked device writes the data packet to the specific sector address of the server's data storage space and returns a status packet to the target device.

In an embodiment of the present disclosure, when the networked device executes instructions issued by the target device or responds data to the target device, it is executed according to the rules of the "permission/prohibition exchange policy". For example, based on parameters of CBW packets in SCSI and SATA instructions (such as read or write instructions, address of operating sector space, and etc.), and content of read or write data packets, determination of whether whether instructions and data (such as read or write instructions, address of operating sector space) are correct can be made.

In an embodiment of the present disclosure, the data exchange method determines a target data source based on the data source configuration information in the scenario configuration information. The target data source can be stored in the client, the server, or the networked device, and the data exchange method can achieve data interaction between the networked device and the target device based on the target data source.

Figure 18:
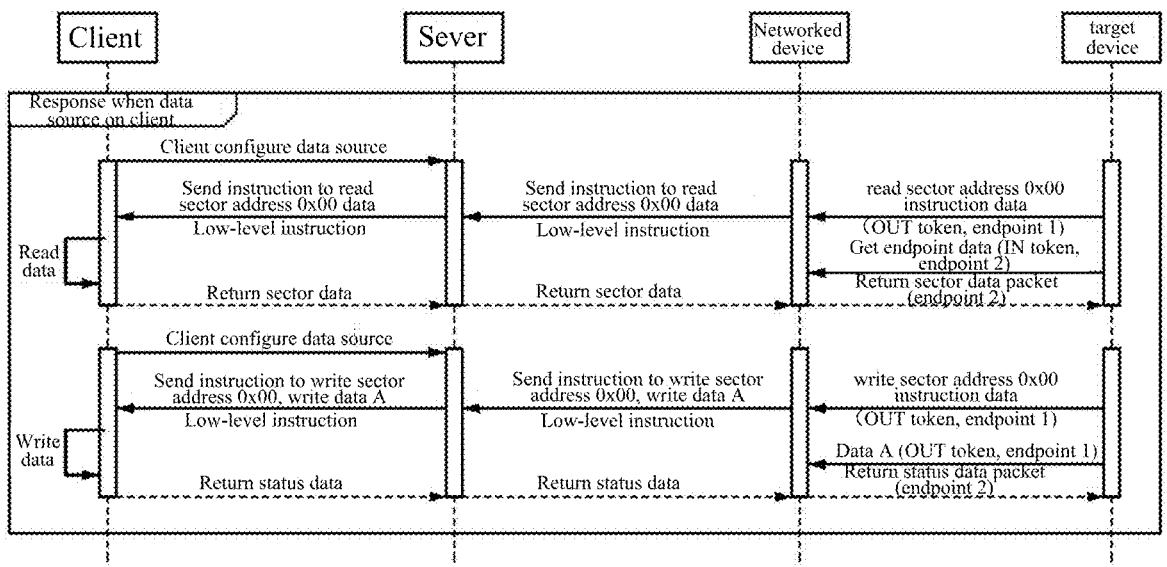
FIG. 18 is a schematic view of a flow chart of a data exchange method according to another embodiment of the present disclosure.

Referring to FIG. 18, it is a flowchart of a data interaction method in another embodiment of the present disclosure, taking a scenario where the data source for interaction between the networked device and the target device is stored on the client as an example.

The client configures the data source for the scenario on the client.

The target device sends a data read instruction (such as a SCSI instruction with a read sector address of 0x00) to a networked device (such as OUT endpoint 1). The networked device sends the data read instruction to the server, which forwards the data read instruction to the client. The client reads out corresponding data (such as sector data) from an address in the client's storage space (such as sector address) based on the data read instruction, and returns data (such as sector data) to the networked device through the server. The networked device returns the data (such as the sector data) received from the server to the target device (such as IN endpoint 2).

The target device sends a data write instruction (such as a SCSI instruction with a write sector address of 0x00) and data packets to the networked device (such as OUT endpoint 1). The networked device sends the data write instruction and data packets to the server, which forwards the data write instruction and data packets to the client. The client writes corresponding data (such as sector data) to the address in the client's storage space (such as sector address) based on the data write instruction and data packets, and returns the write status (such as a status packet) to the networked device through the server. The networked device returns the status data (such as packet) received from the server to the target device (such as IN endpoint 2).

It should be noted that the client can also be directly connected to the networked device through a peer-to-peer (P2P) connection without forwarding data through the server to improve transmission efficiency.

Figure 19:
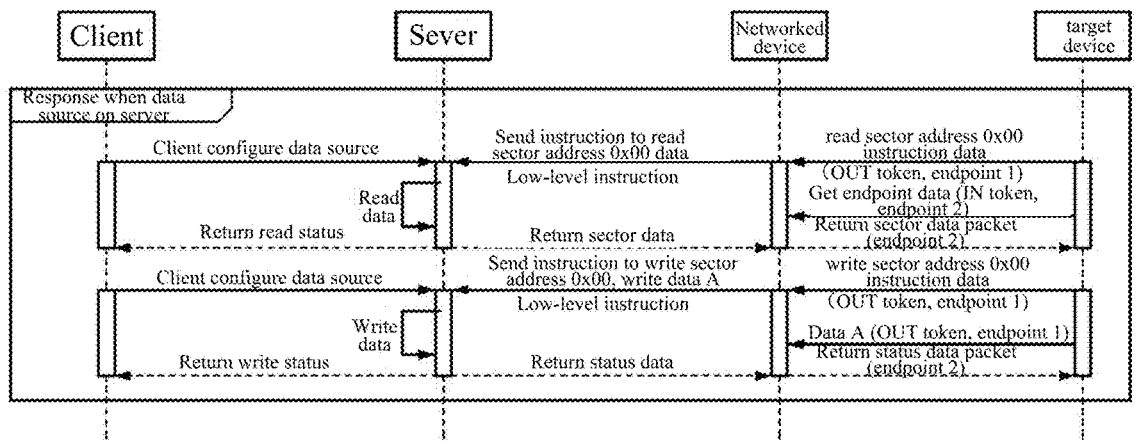
FIG. 19 is a schematic view of a flow chart of a data exchange method according to another embodiment of the present disclosure.

Referring to FIG. 19, it is a flowchart of a data interaction method in another embodiment of the present disclosure, taking a scenario where the data source for interaction between the networked device and the target device stored is on the server as an example.

A control end such as the client configure a data source for the scenario on the server.

The target device sends a data read instruction (such as a SCSI instruction with a read sector address of 0x00) to a networked device (such as OUT endpoint 1), and the networked device sends the data read instruction to the server. The server reads corresponding data (such as sector data) from an address in the storage space (such as sector address) of the server based on the data read instruction, and returns data (such as sector data) to the networked device. The networked device returns the data received from the server (such as sector data) to the target device (such as IN endpoint 2).

The target device sends a data write instruction (such as a SCSI instruction with a write sector address of 0x00) and data packets to the networked device (such as OUT endpoint 1). The networked device sends the data write instruction and data packets to the server, which writes corresponding data (such as sector data) to the address in the storage space (such as sector address) of the server based on the data write instruction and data packets, and returns a write status (such as a status packet) to the networked device. The networked device returns the status data (such as packets) received from the server to the target device (such as IN endpoint 2).

It should be noted that the server can also send data packets or status data to the client.

Figure 20:
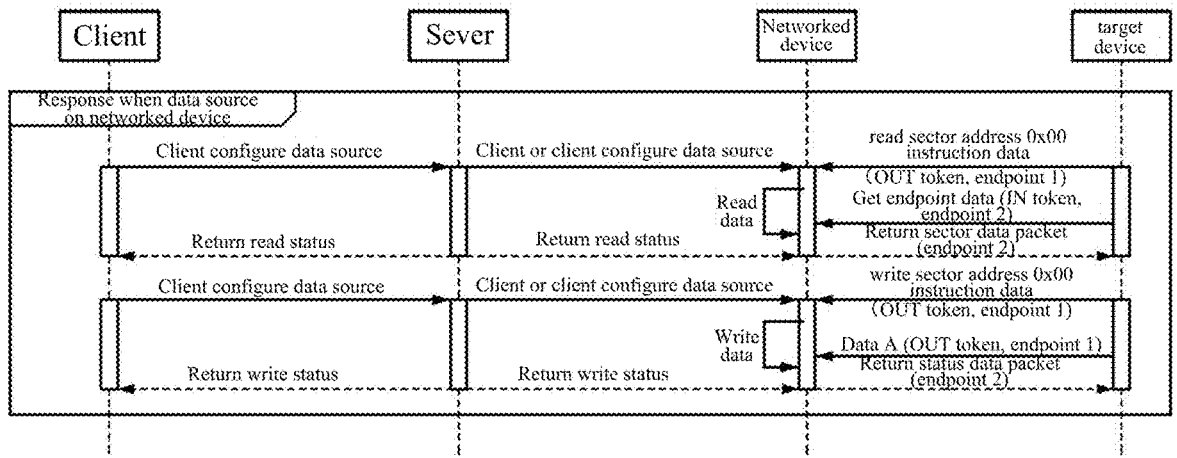
FIG. 20 is a schematic view of a flow chart of a data exchange method according to another embodiment of the present disclosure.

Referring to FIG. 20, it is a flowchart of a data interaction method in another embodiment of the present disclosure, taking a scenario where the data source for the interaction between the networked device and the target device is stored on the networked device as an example.

A control end such as the client configures a data source for the scenario on the target device locally.

The target device sends a data read instruction (such as a SCSI instruction with a read sector address of 0x00) to a networked device (such as OUT endpoint 1), and the networked device reads out corresponding data (such as sector data) from the read sector address in the local storage space (such as the sector address of the storage chip) based on the data read instruction, and returns the data (such as sector data) to the target device (such as IN endpoint 2).

The target device sends a data write instruction (such as a SCSI instruction with a write sector address of 0x00) and data packets to the networked device (such as OUT endpoint 1). The networked device writes corresponding data (such as sector data) to the write sector address in the local storage space (such as sector address) based on the data write instruction and data packets, and returns a write status (such as status packet) to the target device (such as IN endpoint 2).

It should be noted that the networked device can also send data packets or status data to the server or the client.

Figure 21:
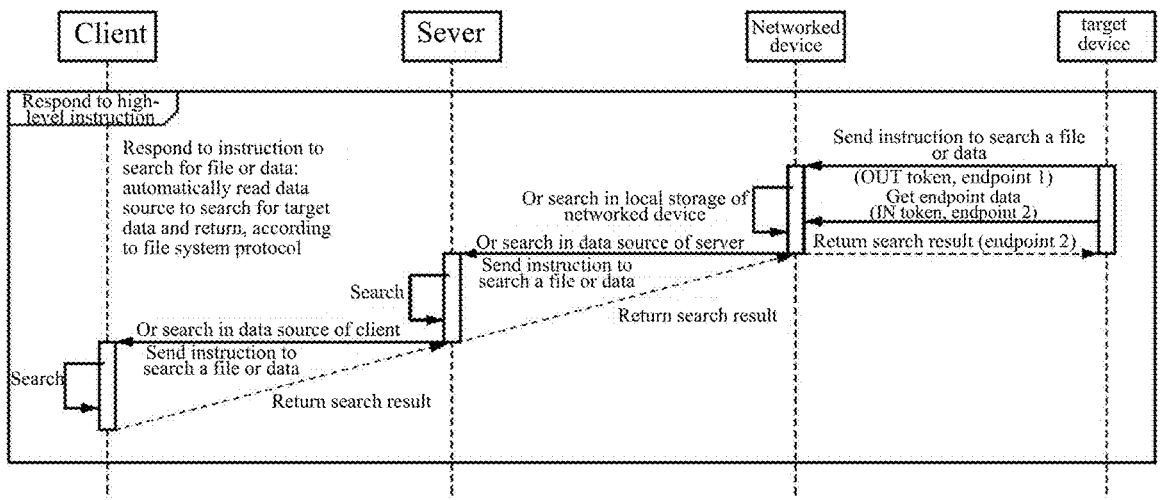
FIG. 21 is a schematic view of a flow chart of a data exchange method according to another embodiment of the present disclosure.

Referring to FIG. 21, it is a flowchart of a data exchange method in another embodiment of the present disclosure.

In an embodiment of the present disclosure, data interaction between the networked device and the target device is based on high-level instructions. The following is an example of using high-level instructions as instructions to search for file or data to introduce the data exchange method of the present disclosure. The target device sends instructions to search for file or data and instructions to get specific endpoint data to a specific endpoint of the networked device. For example, the target device sends instructions to search for file or data to endpoint 1 of the networked device through an OUT token packet, and sends instructions to get specific endpoint data to endpoint 2 of the networked device through an IN token packet. The instructions to search file or data is used to search for stored data. The networked device searches for corresponding stored data in the local storage or a data source of the networked device based on instructions to search file or data. If the networked device fails to search for the corresponding stored data, the instructions to search file or data are sent to the server; If the networked device searches for the corresponding stored data, the searched stored data will be returned to the target device. The server searches for corresponding stored data in a data source of the server based on the instructions to search file or data. If the server searches for the corresponding storage data, it returns the searched stored data to the networked device, and the networked device returns it to the target device; if the server fails to search for the corresponding stored data, sends the instructions to search file or data to the client. The client searches for corresponding stored data in the client's data source based on the instructions to search file or data, and sends searched stored data to the server, which then sends the stored data to the target device through the networked device.

It should be noted that the data source for performing the search can be specified in advance (such as only searching for data on the server) or not.

In an embodiment of the present disclosure, an equipment access method is also provided, which is applied in a server. The server is connected to the networked device through communication. The server configures the configuration information of the networked device based on a preset generation strategy, which includes scenario configuration information of the networked device in at least one application scenario. The scenario configuration information includes at least one of the first descriptor set and functional instruction set, data source configuration information, and the first descriptor set is used to define the device type of the networked device, The functional instruction set includes a descriptor instruction set. The server receives a scenario information acquisition request sent by the networked device and sends the scenario configuration information to the networked device. For example, when a networked device is started, it sends a scenario information acquisition request to the server, which includes the identity identification of the networked device. The server responds to the scenario information acquisition request, filters scenario configuration information that matches the identity identification of the networked device from the scenario configuration information, and sends the scenario configuration information to the networked device.

In an embodiment of the present disclosure, the server receives a descriptor set or a descriptor instruction of the target device sent by the networked device, where the descriptor set or the descriptor instruction is received by the networked device from the target device. The server determines new scenario configuration information based on the descriptor set or the descriptor instructions of the target device, and sends the new scenario configuration information to the networked device. The networked device establishes a communication connection between the networked device and the target device based on the new scenario configuration information.

In an embodiment of the present disclosure, the server is further used to receive a read operation instruction sent by the networked device, to determine data from the data source of the server based on the read operation instruction, and to send determined data to the networked device, enabling the networked device to read data out from the data source of the server.

In an embodiment of the present disclosure, the server is further used to receive a write operation instruction sent by the networked device and write data packets to the data source of the server based on the write operation instruction.

Figure 22:
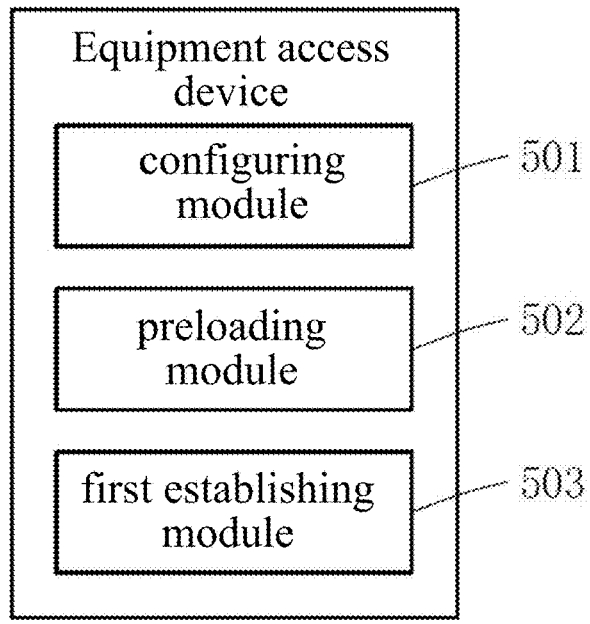
FIG. 22 is a structural diagram of an equipment access device according to an embodiment of the present disclosure.

In order to execute the method corresponding to the embodiment shown in FIG. 1 above, in order to achieve corresponding functions and technical effects. Refer to FIG. 22, which shows a structural block diagram of an equipment access device provided in the embodiment of the present disclosure. For ease of explanation, only relevant parts of the present embodiment are shown. The equipment access device provided in the present embodiment is applied to the networked device, and the device includes:

A configuring module 501, configured to configure target configuration information of the networked device, including scenario configuration information of the networked device in at least one application scenario. The scenario configuration information includes at least one of a first descriptor set and the descriptor instruction set, and the first descriptor set is used to define the device type of the networked device;

A preloading module 502, configured to preload the target configuration information; and a first establishing module 503, configured to establish a communication connection with the target device based on preloaded target scenario configuration information, in order to connect the networked device to the target device. The target scenario configuration information is one of the scenario configuration information.

In some embodiments, the configuring module 501 is specifically configured to:

send a configuration acquisition request to the server when the networked device communicates and connects with the server, the configuration acquisition request carries identification information of the networked device;

receive the target configuration information corresponding to the identification information returned by the server.

In some embodiments, the networked device serves as a master device that communicates with the target device, and the descriptor instruction set includes multiple functional instruction sets used to control data exchange between the networked device and the target device.

In some embodiments, the first establishing module 503 includes:
- a first enumeration unit for enumerating multiple descriptors in the second descriptor set of the target device based on the functional instruction set in the descriptor instruction set;
- a first configuration unit is used to configure the target data source for communication between the networked device and the target device if the enumeration is successful, and the target data source is set on the target device.

In some embodiments, the functional instruction set includes an acquisition instruction set and a verification instruction set, and the enumeration unit is specifically used to:
- read the second descriptor set of the target device based on the acquisition instruction set;
- verify multiple descriptors in the second descriptor set based on the verification instruction set;
- determine that the enumeration is successful if the multiple descriptors meet preset device requirements.

In some embodiments, the functional instruction set further includes a data source instruction set, and the target scenario configuration information further includes a data source configuration information. The configuration unit is specifically used to:
- determine the target data source of the networked device based on the data source configuration information based on the data source instruction set.

In some embodiments, the networked device is a network read and write control device, and the first establishing module 503 includes:
- a second enumeration unit for enumerating multiple descriptors in the second descriptor set of the target device based on the functional instruction set in the descriptor instruction set; and
- a request unit for requesting the server to send a driver instruction set corresponding to the target device if the enumeration is successful, in order to complete the communication connection. The driver instruction set is used for data exchange with the target device.

In some embodiments, the networked device is a network proxy control device, and the first establishing module 503 includes:
- a second configuration unit for configuring a target data source for communication between the networked device and the target device based on the functional instruction set in the descriptor instruction set, and enumerating multiple descriptors in the second descriptor set of the target device; and
- a sending unit for sending the second descriptor set to the server if the enumeration is successful, in order to virtualize the target device on the server, generate a virtual device corresponding to the target device, so as to establish a communication connection with the target device.

In some embodiments, the networked device serves as a slave device in communication with the target device, and the first establishing module 503 includes:
- a first receiving unit for receiving an enumeration request sent by the target device;
- a first return unit is used to respond to the enumeration request, return the first descriptor set to the target device, so that the target device can enumerate the first descriptor set, and after successful enumeration, configure the target data source for communication between the networked device and the target device based on the data source configuration information. The target data source is set on the server.

In some embodiments, the data source configuration information includes capacity information of the data source, which includes the last logical block address and block capacity of the data source.

In some embodiments, the descriptor set includes at least one of device descriptors, configuration descriptors, interface descriptors, endpoint descriptors, string descriptors, BOS descriptors, and preset customized descriptors.

In some embodiments, the target device includes at least one first target device and at least one second target device, the networked device serves as a master device in communication with the first target device and a slave device in communication with the second target device. The first establishing module 503 includes:
- a third enumeration unit for enumerating multiple descriptors in the second descriptor set of the first target device based on the functional instruction set in the descriptor instruction set;
- a third configuration unit is used to configure the first target data source when the networked device communicates with the first target device if the enumeration is successful, in order to complete the communication connection with the first target device. The first target data source is set on the first target device;
- a second receiving unit for receiving an enumeration request sent by the second target device; and
- a second return unit is used to return the first descriptor set to the second target device in response to the enumeration request, so that the second target device can enumerate the first descriptor set, and to configure the second target data source for communication between the networking device and the second target device based on the data source configuration information after successful enumeration, The second target data source is located on the server or on the first target device.

In some embodiments, the equipment access device further includes:
- a configuring module, used to configure the first descriptor set and data source configuration information of the networked device based on preset generation strategies to generate scenario configuration information. The preset generation strategies include customized creation strategies and template creation strategies.

Figure 23:
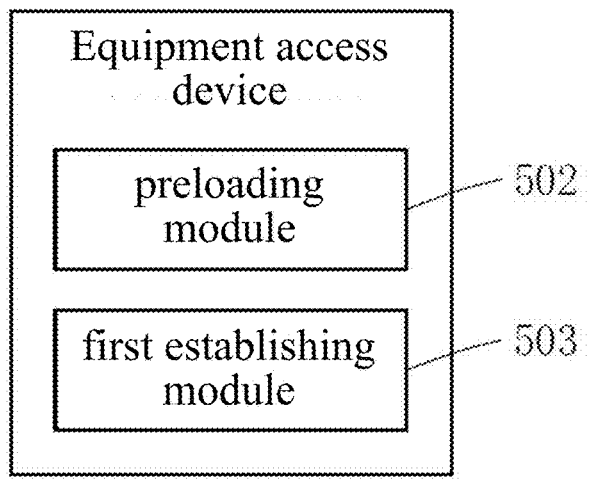
FIG. 23 is a schematic view of a flow chart of an equipment access method according to another embodiment of the present disclosure.

Referring to FIG. 23, in some embodiments, the equipment access device may only include a preloading module 502 and a first establishing module 503. Specific implementation functions of the preloading module 502 and the first establishing module 503 can be referred to above descriptions in FIG. 8.

Figure 24:
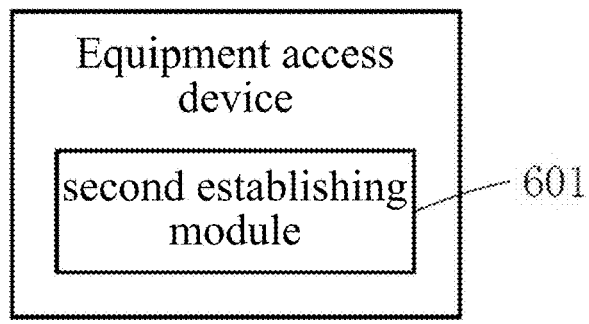
FIG. 24 is a structural diagram of an equipment access device according to another embodiment of the present disclosure.

In order to execute the method corresponding to the embodiment shown in FIG. 9 above, in order to achieve corresponding functions and technical effects. Refer to FIG. 24, which shows a structural block diagram of an equipment access device provided in the embodiment of the present disclosure. For ease of description, only relevant parts of the present embodiment are shown. The equipment access device provided in the present embodiment is applied to the networked device, which store scenario configuration information for at least one application scenario. The device includes:

a second establishing module 601 is used to establish a communication connection with the target device based on the target scenario configuration information, in order to connect the networked device to the target device. The target scenario configuration information is one of scenario configuration information, which includes at least one of the first descriptor set and the descriptor instruction set. The first descriptor set is used to define the device type of the networked device.

Figure 25:
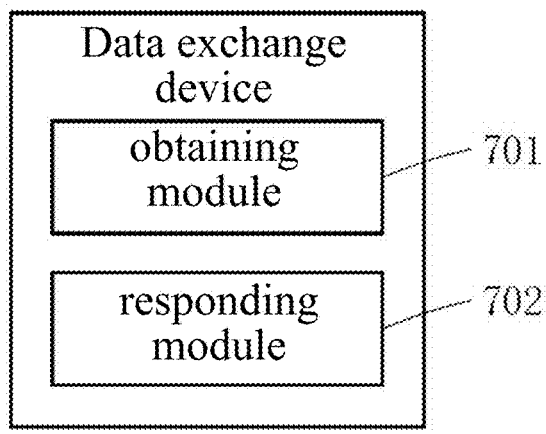
FIG. 25 is a structural diagram of a data exchange device according to an embodiment of the present disclosure.

In order to execute the method corresponding to the embodiment shown in FIG. 10 above, in order to achieve corresponding functions and technical effects. Refer to FIG. 25, which shows a structural block diagram of a data exchange device provided in the embodiment of the present disclosure. For ease of description, only relevant parts of the present embodiment are shown. The data exchange device provided in the present embodiment is applied to a networked device, which establishes a communication connection with the server and the target device based on the equipment access method shown in FIG. 1, FIG. 8, or FIG. 9. The device includes:

an obtaining module 701, configured to obtain a data exchange request sent by the first target party; and a responding module 702, configured to respond to the data exchange request based on preset processing strategies and to return target data to the first target party. The target data is the data sent by the second target party. If the first target party is a server, the second target party is the target device. If the first target party is a target device, the second target party is the server.

In some embodiments, the target device includes at least one first target device and at least one second target device, wherein the networked device serves as a master device in communication with the first target device and a slave device in communication with the second target device. If the first target party is the server, the second target party is the first target device or the second target device, If the first target party is the first target device, then the second target party is the server or the second target device.

In some embodiments, the responding module 702 includes:

a response unit, configured to forward the data exchange request to the second target party in response to the data exchange request; and a forwarding unit, configured to receive target data returned by the second target party in response to the data exchange request, and to forward the target data to the first target party.

In some embodiments, the networked device is a network USBkey device, and the target device is a computer host, the response unit is specifically used to:

forward the data exchange request to the server in response to the data exchange request sent by the computer host. The data exchange request carries credential information of the USBkey device to allow the server to verify the credential information.

In some embodiments, the responding module 702 includes:

a processing unit, configured to process the data exchange request based on preset processing scripts to get a data processing result;

a sending unit, configured to send a target data acquisition request to the second target party based on the data processing result; and a return unit, configured to receive target data corresponding to the data processing result returned by the second target party in response to the target data acquisition request, and to return the target data to the first target party.

Figure 26:
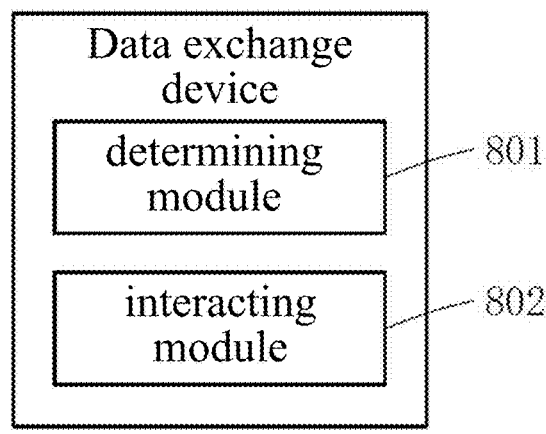
FIG. 26 is a structural diagram of an equipment access device according to another embodiment of the present disclosure.

Referring to FIG. 26, which shows a structural block diagram of an equipment access device provided in the embodiment of the present disclosure. For ease of description, only relevant parts of the present embodiment are shown. The data exchange device provided in the present embodiment is applied to a networked device, which establishes a communication connection with the server and the target device based on the equipment access method shown in FIG. 1, 8, or 9. The equipment access device includes:

a determining module 801, configured to determine the target data source based on the data source configuration information in the scenario configuration information; and an interacting module 802, configured to perform data interaction between the networked device and the target device based on the target data source.

In an embodiment of the present disclosure, the data source configuration information includes capacity information of the data source, storage medium, and read/write status. The capacity information includes at least one of the last logical block address of the data source, the total number of formattable logical blocks, or block capacity. The target data source is located in the target device, the server, or the client connected to the server, or any electronic device connected to the networked device through communication.

In an embodiment of the present disclosure, the interacting module 802 includes:

a configuration unit for configuring an auto-run script when the networked device communicates with the target device, and the scenario configuration information includes the auto-run script;

a first interaction unit for sending a first data exchange request to the target device based on the auto-run script, and receiving first data sent by the target device in response to the first data exchange request; or a second interaction unit for receiving a second data exchange request sent by the target device based on the auto-run script, and sending second data to the target device in response to the second data exchange request, wherein the first data or the second data is data from the target data source. The above device can implement methods of the above method embodiments. The optional features in the above method embodiments are also applicable to this embodiment, which will not be elaborated here. Remaining content of the embodiments of the present disclosure can refer to content of the above method embodiments, which will not be further elaborated in this embodiment.

Figure 27:
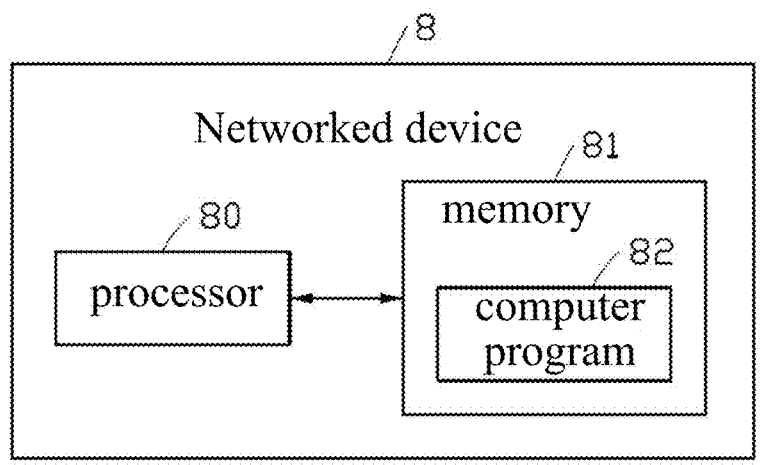
FIG. 27 is a structural diagram of a networked device according to another embodiment of the present disclosure.

Referring to FIG. 27, a schematic diagram of a structure of the networked device provided in an embodiment of the present disclosure is shown. As shown in FIG. 27, the networked device 8 of this embodiment includes at least one processor 80 (only one is shown in FIG. 27), a memory 81, and a computer program 82 stored in the memory 81 and capable of running on the at least one processor 80. The processor 80 performs steps of any of the above method embodiments when executing the computer program 82.

The networked device 8 may include, but not limited to, a device such as a microcontroller or an embedded system with networking functions, a terminal device such as a smartphone or a laptop, a network USB key device (such as a bank U-shield, a digital certificate, an encryption dog, and etc.), and a network proxy control device (such as a multiport transponder, and etc.), a remote controller (including but not limited to a network card reader, a network read/write control device, a network controller (such as a router and a smart gateway), a communication Device Class (CDC, such as a network card, a modem, an ISDN (Integrated Services Digital Network) terminal), a human interface device (HID, such as a keyboard or mice), a Mass Storage Device Class (MSC, such as a USB flash drive, a network USB flash drive, a card reader, a network card reader), a printer device (such as a USB interface printer), a Still Imaging device, a video device, an audio/video device, a Smart card device, a USB hub device (Universal SerialBus Hub) and a customized device. The networked device may include, but not limited to, a processor 80 and a memory 81. A person skilled in the art should understand that FIG. 27 is only an example of the networked device 8 and does not constitute a limitation on the networked device 8. It may include more or fewer components than that shown in the figures, or combinations of certain components, or different components, such as input/output devices, network access devices, etc.

The processor 80 can be a Central Processing Unit (CPU), which can also be other general-purpose processor, a Digital Signal Processor (DSP), an Application Specific Integrated Circuits (ASIC), a Field Programmable Gate Array (FPGA), or other programmable logic device, a discrete gate, or a transistor logic device, a discrete hardware component, and etc. A general-purpose processor can be a microprocessor or any conventional processor.

The memory 81 may, in some embodiments, be an internal storage unit of the networked device 8, such as a hard disk or memory of the networked device 8. The memory 81 can also be an external storage device of the networked device 8 in other embodiments, such as a plug-in hard disk, a Smart Media Card (SMC), a Secure Digital (SD) card, a Flash Card, and etc. provided on the networked device 8. Furthermore, the memory 81 can further include both an internal storage unit of the networked device 8 and an external storage device. The memory 81 is used to store operating systems, application programs, Boot Loaders, data, and other programs, such as program code of the computer program. The memory 81 can also be used to temporarily store data that has been or will be outputted.

In addition, the embodiment of the present disclosure further provides a computer-readable storage medium, wherein the computer-readable storage medium stores a computer program, and when the computer program is executed by a processor, the steps in any of the above method embodiments are implemented.

The embodiment of the present disclosure provides a computer program product that can run on a microcontroller, an embedded device, or an operating system such as Window, Linux, IOS, Android, Harmony OS, and etc. When the computer program product runs on a networked device, the steps in the above method embodiments are implemented when the networked device executes.

In several embodiments provided in present disclosure, it can be understood that each block in the flowchart or block diagram can represent a module, program segment, or part of code, which includes one or more executable instructions for implementing specified logical functions. It should also be noted that in some alternative embodiments, functions indicated in the block can also occur in a different order than those indicated in the accompanying drawings. For example, two consecutive blocks can actually be executed in parallel, and sometimes they can also be executed in an opposite order, depending on the function involved.

If the function is implemented in a form of a software functional module and sold or used as an independent product, it can be stored in a computer readable storage medium. Based on this understanding, the technical solution of the present disclosure, in essence, or the portion that contributes to existing technologies or the portion of the technical solution, can be reflected in a form of a software product, which is stored in a storage medium and includes several instructions to enable a networked device to perform all or part of steps of the methods described in various embodiments of the present disclosure. The aforementioned storage media include: USB flash drives, removable hard drives, Read Only Memory (ROM), Random Access Memory (RAM), Flash memory, magnetic disks or optical disks, and other media that can store program code.

The purpose, technical solutions and beneficial effect of the present disclosure are explained in detail by embodiments mentioned above. It should be understood that above descriptions only describe embodiments of the present disclosure, and are not intended to limit the present disclosure. Specifically, for an ordinary person skilled in the art, any modifications, equivalent substitutions, improvements, etc. made within the spirit and scope of the present disclosure are intended to be included within the scope of the present disclosure.

What is claimed is:

1. An equipment access method, applied to a networked device, the method comprising:
preloading, by the networked device, target configuration information when communicating and connecting with a server, wherein the server stores at least one preset configuration information, wherein the target configuration information is one of the at least one preset configuration information, and the target configuration information comprises scenario configuration information of the networked device in at least one application scenario; the scenario configuration information comprises at least one of a first descriptor set and a descriptor instruction set, wherein the first descriptor set is configured to define a device type of the networked device; the scenario configuration information is stored on the server and is generated by configuring at least one of the first descriptor set and the descriptor instruction set of the networked device, and data source configuration information, based on a preset generation strategy before preloading the target configuration information; and
establishing, by the networked device, a communication connection with a target device based on target scenario configuration information to connect the networked device to the target device, wherein the target scenario configuration information is one of the scenario configuration information.

2. The equipment access method as claimed in claim 1, wherein
said preloading target configuration information when communicating and connecting with the server comprises:
sending, by the networked device, a configuration acquisition request to the server when communicating and connecting with the server, wherein the configuration acquisition request carries identification information of the networked device; and receiving, by the networked device, target configuration information corresponding to the identification information returned by the server.

3. The equipment access method as claimed in claim 1, wherein the networked device serves as a master device in communication with the target device, and the descriptor instruction set comprises multiple functional instruction sets, which are configured to control data exchange between the networked device and the target device.

4. The equipment access method as claimed in claim 3, wherein
said establishing the communication connection with the target device based on the target scenario configuration information comprises:
enumerating, by the networked device, multiple descriptors in a second descriptor set of the target device based on the functional instruction sets in the descriptor instruction set; and
configuring, by the networked device, a target data source when the networked device communicates with the target device if enumeration is successful, wherein the target data source is set on the target device.

5. The equipment access method as claimed in claim 4, wherein the functional instruction sets comprise an acquisition instruction set and a verification instruction set, wherein said enumerating the multiple descriptors in the second descriptor set of the target device based on the functional instruction set in the descriptor instruction set comprises:
reading, by the networked device, the second descriptor set of the target device based on the acquisition instruction set;
verifying, by the networked device, the multiple descriptors in the second descriptor set based on the verification instruction set; and
determining, by the networked device, that the enumeration is successful if the multiple descriptors meet preset device requirement.

6. The equipment access method as claimed in claim 4, wherein the functional instruction sets further comprise a data source instruction set, the target scenario configuration information further comprises the data source configuration information, wherein said configuring the target data source when the networked device communicates with the target device comprises: determining, by the networked device, the target data source for communication between the networked device and the target device based on the data source instruction set, according to the data source configuration information.

7. The equipment access method as claimed in claim 6, wherein the data source configuration information comprises capacity information of a data source, and the capacity information comprises a last logical block address and block capacity of the data source.

8. The equipment access method as claimed in claim 4, wherein the first descriptor set includes at least one of device descriptors, configuration descriptors, interface descriptors, endpoint descriptors, string descriptors, and preset customized descriptors.

9. The equipment access method as claimed in claim 1, wherein the target device comprises at least one first target device and at least one second target device, wherein the networked device serves as a master device in communication with the at least one first target device and a slave device in communication with the at least one second target device, said establishing the communication connection with the target device based on target scenario configuration information comprises:
enumerating, by the networked device, multiple descriptors in a second descriptor set of each first target device based on a functional instruction set in the descriptor instruction set;
configuring, by the networked device, a first target data source when the networked device communicates with the first target device to complete the communication connection with the first target device, if enumeration is successful; wherein the first target data source is set on the first target device;
receiving, by the networked device, an enumeration request sent by one of the at least one second target device;
returning, by the networked device, the first descriptor set to the one of the at least one second target device in response to the enumeration request, to enable the one of the at least one second target device to enumerate the first descriptor set, and configuring, by the server or the first target device, a second target data source for communication between the networked device and the second target device based on data source configuration information after successful enumeration.

10. The equipment access method as claimed in claim 3, wherein the networked device is a network read/write control device, said establishing a communication connection with the target device based on target scenario configuration information comprises:
enumerating, by the networked device, multiple descriptors in a second descriptor set of the target device based on the functional instruction sets of the descriptor instruction set;
requesting, by the networked device, the server to issue a driver instruction set corresponding to the target device to complete the communication connection if enumeration is successful, wherein the driver instruction set is used for data exchange with the target device.

11. The equipment access method as claimed in claim 10, wherein the data source configuration information comprises capacity information of a data source, and the capacity information comprises a last logical block address and block capacity of the data source.

12. The equipment access method as claimed in claim 3, wherein the networked device is a network proxy control device, said establishing a communication connection with the target device based on target scenario configuration information comprises:
enumerating, by the networked device, multiple descriptors in a second descriptor set of the target device based on the functional instruction set in the descriptor instruction set;
sending, by the networked device, the second descriptor set to the server to virtualize the target device if the enumeration is successful, to generate a virtualized device corresponding to the target device, so as to establish the communication connection with the target device.

13. The equipment access method as claimed in claim 1, wherein the networked device serves as a slave device in communication with the target device, said establishing a communication connection with the target device based on target scenario configuration information comprises:
receiving, by the networked device, an enumeration request sent by the target device;

returning, by the networked device, the first descriptor set to the target device in response to the enumeration request, to enable the target device to enumerate the first descriptor set;

configuring, by the networked device, a target data source for communication between the networked device and the target device based on the data source configuration information after successful enumeration, wherein the target data source is set on the server.

14. The equipment access method as claimed in claim 13, wherein the first descriptor set includes at least one of device descriptors, configuration descriptors, interface descriptors, endpoint descriptors, string descriptors, and preset customized descriptors.

15. A data exchange method, wherein it is applied to a networked device, wherein the networked device establishes a communication connection with a server and a target device based on an equipment access method, wherein the equipment access method comprises:

preloading, by the networked device, target configuration information when communicating and connecting with the server, wherein the server stores at least one preset configuration information, wherein the target configuration information is one of the at least one preset configuration information, and the target configuration information comprises scenario configuration information of the networked device in at least one application scenario; the scenario configuration information comprises at least one of a first descriptor set and a descriptor instruction set, wherein the first descriptor set is configured to define a device type of the networked device; the scenario configuration information is stored on the server and is generated by configuring at least one of the first descriptor set and the descriptor instruction set of the networked device, and data source configuration information, based on a preset generation strategy before preloading the target configuration information; and establishing, by the networked device, the communication connection with the target device based on target scenario configuration information to connect the networked device to the target device, wherein the target scenario configuration information is one of the scenario configuration information;

wherein the data exchange method comprises:

obtaining, by the networked device, a data exchange request sent by a first target party;

returning, by the networked device, target data to the first target party in response to the data exchange request based on a preset processing strategy, wherein the target data is sent by a second target party, wherein if the first target party is the server, the second target party is the target device; or if the first target party is the target device, the second target party is the server.

16. The data exchange method as claimed in claim 15, wherein the target device comprises at least one first target device and at least one second target device, wherein the networked device serves as a master device in communication with the at least one first target device and serves as a slave device in communication with the at least one second target device, wherein if the first target party is the server, the second target party is one of the at least one first target device or one of the at least one second target device; or, if the first target party is one of the at least one second target device, the second target party is the server or one of the at least one first target device.

17. The data exchange method as claimed in claim 16, wherein said returning the target data to the first target party in response to the data exchange request based on the preset processing strategy comprises:

forwarding, by the networked device, the data exchange request to the second target party in response to the data exchange request;

receiving, by the networked device, the target data returned by the second target party in response to the data exchange request, and forwarding, by the networked device, the target data to the first target party.

18. The data exchange method as claimed in claim 16, wherein said returning the target data to the first target party in response to the data exchange request based on the preset processing strategy comprises:

processing, by the networked device, the data exchange request based on a preset processing script to get a data processing result;

sending, by the networked device, a target data acquisition request to the second target party based on the data processing result;

receiving, by the networked device, target data corresponding to the data processing result returned by the second target party in response to the target data acquisition request, and returning, by the networked device, the target data to the first target party.

19. The data exchange method as claimed in claim 15, wherein said returning the target data to the first target party in response to the data exchange request based on the preset processing strategy comprises:

forwarding, by the networked device, the data exchange request to the second target party in response to the data exchange request;

receiving, by the networked device, the target data returned by the second target party in response to the data exchange request, and forwarding, by the networked device, the target data to the first target party.

20. The data exchange method as claimed in claim 19, wherein the networked device is a network USBkey device, the target device is a computer host, wherein said forwarding the data exchange request to the second target party in response to the data exchange request comprises:

forwarding, by the networked device, the data exchange request to the server in response to the data exchange request sent by the computer host, wherein the data exchange request carries credential information of the network USBkey device to enable the server to verify the credential information.

21. The data exchange method as claimed in claim 15, wherein said returning the target data to the first target party in response to the data exchange request based on the preset processing strategy comprises:

processing, by the networked device, the data exchange request based on a preset processing script to get a data processing result;

sending, by the networked device, a target data acquisition request to the second target party based on the data processing result;

receiving, by the networked device, target data corresponding to the data processing result returned by the second target party in response to the target data acquisition request, and returning, by the networked device, the target data to the first target party.

22. An equipment access method, wherein it is applied to a server, wherein the method comprises:
    sending, by the server, target configuration information to a networked device when communicating and connecting with the networked device, wherein the target configuration information is configured for establishing a communication connection between the networked device and a target device; the server stores at least one preset configuration information, wherein the target configuration information is one of the at least one preset configuration information; the target configuration information comprises scenario configuration information of the networked device in at least one application scenario, the scenario configuration information comprises at least one of a first descriptor set and a descriptor instruction set, wherein the first descriptor set is configured to define a device type of the networked device; the scenario configuration information is stored on the server and is generated by configuring at least one of the first descriptor set and the descriptor instruction set of the networked device, and data source configuration information, based on a preset generation strategy before preloading the target configuration information; and
    establishing, by the server, a communication connection with the target device based on the target scenario configuration information, to connect the networked device to the target device, wherein the target scenario configuration information is one of the scenario configuration information.

23. A data exchange method, wherein it is applied to a server, which establishes a communication connection with a networked device based on an equipment access method, wherein the equipment access method comprises:
    sending, by the server, target configuration information to a networked device when communicating and connecting with the networked device, wherein the target configuration information is configured for establishing a communication connection between the networked device and a target device; the server stores at least one preset configuration information, wherein the target configuration information is one of the at least one preset configuration information; the target configuration information comprises scenario configuration information of the networked device in at least one application scenario, the scenario configuration information comprises at least one of a first descriptor set and a descriptor instruction set, wherein the first descriptor set is configured to define a device type of the networked device; the scenario configuration information is stored on the server and is generated by configuring at least one of the first descriptor set and the descriptor instruction set of the networked device, and data source configuration information, based on a preset generation strategy before preloading the target configuration information; and
    establishing, by the server, a communication connection with the target device based on the target scenario configuration information, to connect the networked device to the target device, wherein the target scenario configuration information is one of the scenario configuration information;
    wherein the data exchange method comprises:
    sending, by the server, a first data exchange request to the networked device and receiving target data returned by the networked device, wherein the first data exchange request is configured for the networked device to respond to the first data exchange request based on a preset processing strategy, and the target data is data sent by a target device; and/or,
    sending, by the server, target data to the networked device based on a second data exchange request responded by the networked device based on a predetermined processing strategy, wherein the target data is then returned to the target device by the networked device, and the second data exchange request is initiated by the target device.

24. An equipment access device, wherein it is applied to a networked device, wherein the device comprises:
    a preloading module for preloading target configuration information when the networked device communicates with a server, wherein the server stores at least one preset configuration information, and the target configuration information is one of the at least one preset configuration information, the target configuration information includes scenario configuration information of the networked device in at least one application scenario, the scenario configuration information comprises at least one of a first descriptor set and a descriptor instruction set, and the first descriptor set is used to define a device type of the networked device; the scenario configuration information is stored on the server and is generated by configuring at least one of the first descriptor set and the descriptor instruction set of the networked device, and data source configuration information, based on a preset generation strategy before preloading the target configuration information; and
    a first establishing module, configured to establish a communication connection with a target device based on the target scenario configuration information, so that the networked device can be connected to the target device, wherein the target scenario configuration information is one of the scenario configuration information.

25. A networked device, wherein it comprises a processor and a memory for storing computer programs, wherein the computer programs are configured to be executed by the processor to cause the processor to perform an equipment access method, the equipment access method comprising:
    preloading, by the networked device, target configuration information when communicating and connecting with a server, wherein the server stores at least one preset configuration information, wherein the target configuration information is one of the at least one preset configuration information, and the target configuration information comprises scenario configuration information of the networked device in at least one application scenario; the scenario configuration information comprises at least one of a first descriptor set and a descriptor instruction set, wherein the first descriptor set is configured to define a device type of the networked device; the scenario configuration information is stored on the server and is generated by configuring at least one of the first descriptor set and the descriptor instruction set of the networked device, and data source configuration information, based on a preset generation strategy before preloading the target configuration information; and
    establishing, by the networked device, a communication connection with a target device based on target scenario configuration information to connect the networked device to the target device, wherein the target scenario configuration information is one of the scenario configuration information.

26. The networked device as claimed in claim 25, wherein said preloading target configuration information when communicating and connecting with the server comprises:
sending, by the networked device, a configuration acquisition request to the server when communicating and connecting with the server, wherein the configuration acquisition request carries identification information of the networked device; and
receiving, by the networked device, target configuration information corresponding to the identification information returned by the server.

27. The networked device as claimed in claim 25, wherein the networked device serves as a master device in communication with the target device, and the descriptor instruction set comprises multiple functional instruction sets, which are configured to control data exchange between the networked device and the target device.

28. The networked device as claimed in claim 27, wherein said establishing the communication connection with the target device based on the target scenario configuration information comprises:
enumerating, by the networked device, multiple descriptors in a second descriptor set of the target device based on the functional instruction sets in the descriptor instruction set; and
configuring, by the networked device, a target data source when the networked device communicates with the target device if enumeration is successful.

29. The networked device as claimed in claim 28, wherein the functional instruction sets comprise an acquisition instruction set and a verification instruction set, wherein said enumerating the multiple descriptors in the second descriptor set of the target device based on the functional instruction set in the descriptor instruction set comprises:
reading, by the networked device, the second descriptor set of the target device based on the acquisition instruction set;
verifying, by the networked device, the multiple descriptors in the second descriptor set based on the verification instruction set; and
determining, by the networked device, that the enumeration is successful if the multiple descriptors meet preset device requirement.

30. The networked device as claimed in claim 28, wherein the functional instruction sets further comprise a data source instruction set, the target scenario configuration information further comprises the data source configuration information, wherein said configuring the target data source when the networked device communicates with the target device comprises: determining, by the networked device, the target data source for communication between the networked device and the target device based on the data source instruction set, according to the data source configuration information.

31. The networked device as claimed in claim 30, wherein the data source configuration information comprises capacity information of a data source, and the capacity information comprises a last logical block address and block capacity of the data source.

32. The networked device as claimed in claim 28, wherein the first descriptor set includes at least one of device descriptors, configuration descriptors, interface descriptors, endpoint descriptors, string descriptors, and preset customized descriptors.

33. The networked device as claimed in claim 27, wherein the networked device is a network read/write control device, said establishing a communication connection with the target device based on target scenario configuration information comprises:
enumerating, by the networked device, multiple descriptors in a second descriptor set of the target device based on the functional instruction sets of the descriptor instruction set;
requesting, by the networked device, the server to issue a driver instruction set corresponding to the target device to complete the communication connection if enumeration is successful, wherein the driver instruction set is used for data exchange with the target device.

34. The networked device as claimed in claim 27, wherein the networked device is a network proxy control device, said establishing a communication connection with the target device based on target scenario configuration information comprises:
enumerating, by the networked device, multiple descriptors in a second descriptor set of the target device based on the functional instruction set in the descriptor instruction set;
sending, by the networked device, the second descriptor set to the server to virtualize the target device if the enumeration is successful, to generate a virtualized device corresponding to the target device, so as to establish the communication connection with the target device.

35. The networked device as claimed in claim 25, wherein the networked device serves as a slave device in communication with the target device, said establishing a communication connection with the target device based on target scenario configuration information comprises:
receiving, by the networked device, an enumeration request sent by the target device;
returning, by the networked device, the first descriptor set to the target device in response to the enumeration request, to enable the target device to enumerate the first descriptor set;
configuring, by the networked device, a target data source for communication between the networked device and the target device based on the data source configuration information after successful enumeration, wherein the target data source is set on the server.

36. The networked device as claimed in claim 25, wherein the target device comprises at least one first target device and at least one second target device, wherein the networked device serves as a master device in communication with the at least one first target device and a slave device in communication with the at least one second target device, said establishing the communication connection with the target device based on target scenario configuration information comprises:
enumerating, by the networked device, multiple descriptors in a second descriptor set of each first target device based on a functional instruction set in the descriptor instruction set;
configuring, by the first target device, a first target data source when the networked device communicates with the first target device to complete the communication connection with the first target device, if enumeration is successful;

receiving, by the networked device, an enumeration request sent by one of the at least one second target device;

returning, by the networked device, the first descriptor set to the one of the at least one second target device in response to the enumeration request, to enable the one of the at least one second target device to enumerate the first descriptor set, and configuring, by the server or the first target device, a second target data source for communication between the networked device and the second target device based on data source configuration information after successful enumeration.

37. A server, wherein the server comprises a processor and a memory, and the server can implement an equipment access method, the equipment access method comprising:

sending, by the server, target configuration information to a networked device when communicating and connecting with the networked device, wherein the target configuration information is configured for establishing a communication connection between the networked device and a target device; the server stores at least one preset configuration information, wherein the target configuration information is one of the at least one preset configuration information; the target configuration information comprises scenario configuration information of the networked device in at least one application scenario, the scenario configuration information comprises at least one of a first descriptor set and a descriptor instruction set, wherein the first descriptor set is configured to define a device type of the networked device; the scenario configuration information is stored on the server and is generated by configuring at least one of the first descriptor set and the descriptor instruction set of the networked device, and data source configuration information, based on a preset generation strategy before preloading the target configuration information; and establishing, by the server, a communication connection with the target device based on the target scenario configuration information, to connect the networked device to the target device, wherein the target scenario configuration information is one of the scenario configuration information.

38. A networked device, comprising a processor and a memory for storing computer programs, wherein the networked device establishes a communication connection with a server and a target device based on an equipment access method;

wherein the equipment access method comprises:
preloading, by the networked device, target configuration information when communicating and connecting with the server, wherein the server stores at least one preset configuration information, wherein the target configuration information is one of the at least one preset configuration information, and the target configuration information comprises scenario configuration information of the networked device in at least one application scenario; the scenario configuration information comprises at least one of a first descriptor set and a descriptor instruction set, wherein the first descriptor set is configured to define a device type of the networked device; the scenario configuration information is stored on the server and is generated by configuring at least one of the first descriptor set and the descriptor instruction set of the networked device, and data source configuration information, based on a preset generation strategy before preloading the target configuration information; and establishing, by the networked device, the communication connection with the target device based on target scenario configuration information to connect the networked device to the target device, wherein the target scenario configuration information is one of the scenario configuration information;

wherein the computer programs are configured to be executed by the processor to cause the processor to perform a data exchange method, the data exchange method comprising:

obtaining, by the networked device, a data exchange request sent by a first target party;

returning, by the networked device, target data to the first target party in response to the data exchange request based on a preset processing strategy, wherein the target data is sent by a second target party, wherein if the first target party is the server, the second target party is the target device; or if the first target party is the target device, the second target party is the server.

39. The networked device as claimed in claim 38, wherein the target device comprises at least one first target device and at least one second target device, wherein the networked device serves as a master device in communication with the at least one first target device and serves as a slave device in communication with the at least one second target device, wherein if the first target party is the server, the second target party is one of the at least one first target device or one of the at least one second target device; or, if the first target party is one of the at least one second target device, the second target party is the server or one of the at least one first target device.

40. The networked device as claimed in claim 38, wherein said returning the target data to the first target party in response to the data exchange request based on the preset processing strategy comprises:

forwarding, by the networked device, the data exchange request to the second target party in response to the data exchange request;

receiving, by the networked device, the target data returned by the second target party in response to the data exchange request, and forwarding, by the networked device, the target data to the first target party.

41. The networked device as claimed in claim 40, wherein the networked device is a network USBkey device, the target device is a computer host, wherein said forwarding the data exchange request to the second target party in response to the data exchange request comprises:

forwarding, by the networked device, the data exchange request to the server in response to the data exchange request sent by the computer host, wherein the data exchange request carries credential information of the network USBkey device to enable the server to verify the credential information.

42. The networked device as claimed in claim 40, wherein said returning the target data to the first target party in response to the data exchange request based on the preset processing strategy comprises:

processing, by the networked device, the data exchange request based on a preset processing script to get a data processing result;

sending, by the networked device, a target data acquisition request to the second target party based on the data processing result;

receiving, by the networked device, target data corresponding to the data processing result returned by the second target party in response to the target data acquisition request, and returning, by the networked device, the target data to the first target party.

43. A server, comprising a processor and a memory, wherein the server establishes a communication with a networked device based on an equipment access method, wherein the equipment access method comprises:

sending, by the server, target configuration information to a networked device when communicating and connecting with the networked device, wherein the target configuration information is configured for establishing a communication connection between the networked device and a target device; the server stores at least one preset configuration information, wherein the target configuration information is one of the at least one preset configuration information; the target configuration information comprises scenario configuration information of the networked device in at least one application scenario, the scenario configuration information comprises at least one of a first descriptor set and a descriptor instruction set, wherein the first descriptor set is configured to define a device type of the networked device; the scenario configuration information is stored on the server and is generated by configuring at least one of the first descriptor set and the descriptor instruction set of the networked device, and data source configuration information, based on a preset generation strategy before preloading the target configuration information; and establishing, by the server, a communication connection with the target device based on the target scenario configuration information, to connect the networked device to the target device, wherein the target scenario configuration information is one of the scenario configuration information;

wherein the computer programs are configured to be executed by the processor to cause the processor to perform a data exchange method, the data exchange method comprising:

sending, by the server, a first data exchange request to the networked device and receiving target data returned by the networked device, wherein the first data exchange request is configured for the networked device to respond to the first data exchange request based on a preset processing strategy, and the target data is data sent by a target device; and/or, sending, by the server, target data to the networked device based on a second data exchange request responded by the networked device based on a predetermined processing strategy, wherein the target data is then returned to the target device by the networked device, and the second data exchange request is initiated by the target device.

* * * * *